US008565459B2

(12) United States Patent
Rasmussen

(10) Patent No.: US 8,565,459 B2
(45) Date of Patent: Oct. 22, 2013

(54) SIGNAL PROCESSING USING SPATIAL FILTER

(75) Inventor: Erik Witthøfft Rasmussen, Charlottenlund (DK)

(73) Assignee: Rasmussen Digital APS, Charlottenlund (DK)

( * ) Notice: Subject to any disclaimer, the term of this patent is extended or adjusted under 35 U.S.C. 154(b) by 1127 days.

(21) Appl. No.: 12/515,358

(22) PCT Filed: Oct. 5, 2007

(86) PCT No.: PCT/DK2007/050142
§ 371 (c)(1),
(2), (4) Date: May 18, 2009

(87) PCT Pub. No.: WO2008/061534
PCT Pub. Date: May 29, 2008

(65) Prior Publication Data

US 2010/0061568 A1 Mar. 11, 2010

(30) Foreign Application Priority Data

Nov. 24, 2006 (EP) .................................... 06124745

(51) Int. Cl.
*H04R 25/00* (2006.01)
*H04B 15/00* (2006.01)

(52) U.S. Cl.
USPC ......... 381/317; 381/94.1; 381/94.2; 381/94.3

(58) Field of Classification Search
USPC ........................................ 381/317, 94.1–94.3
See application file for complete search history.

(56) References Cited

U.S. PATENT DOCUMENTS 6,947,570 B2 9/2005 Maisano

FOREIGN PATENT DOCUMENTS

| | | | |
|---|---|---|---|
| EP | 1 065 909 | A2 | 1/2001 |
| WO | WO 99/04598 | A1 | 1/1999 |
| WO | WO 99/09786 | A1 | 2/1999 |
| WO | WO 00/33634 | A2 | 6/2000 |
| WO | WO 03/015457 | A2 | 2/2003 |
| WO | WO 03/015458 | A2 | 2/2003 |

OTHER PUBLICATIONS

Saruwatari, Hiroshi et al., "Speech Enhancement Using Nonlinear Microphone Array With Complementary Beamforming" Acoustics, Speech and Signal Processing, Mar. 15, 1999, pp. 69-72, vol. 1.

(Continued)

*Primary Examiner* — Phat X Cao
*Assistant Examiner* — Diana C Vieira
(74) *Attorney, Agent, or Firm* — Knobbe, Martens, Olson & Bear LLP

(57) ABSTRACT

A device and method processing microphone signals from at least two microphones is presented. A first beamformer processes the signals from the microphones and provides a first beamformed signal. A power estimator processes the signals from the microphones and the first beamformed signal from the first beamformer in order to generate, in frequency bands, a first statistical estimate of the energy of a first part of an incident sound field. A gain controller processes said first statistical estimate in order to generate in frequency bands a first gain signal, and an audio processor for processing an input to the signal processing device in dependence of said generated first gain signal. The invention provides a new and improved noise reduction device and noise reduction method for use in the signal processing in devices processing acoustic signals, e.g. microphone devices.

25 Claims, 32 Drawing Sheets

(56) References Cited

OTHER PUBLICATIONS

Saruwatari, Hiroshi et al., "Speech Enhancement Using Nonlinear Microphone Array With Noise Adaptive Complementary Beamforming" 2000, pp. 1049-1052.
Kolossa, Dorothea et al., "Nonlinear Postprocessing for Blind Speech Separation" Independent Component Analysis and Blind Signal Separation, Fifth International Conference, ICA, 2004, pp. 832-839, vol. 3195.
Veen, Barry D. Van et al., "Beamforming: A Versatile Approach to Spatial Filtering" Acoustics, Speech and Signal Processing Magazine, Apr. 1988, pp. 4-24, vol. 5, No. 2.
International Search Report dated Mar. 9, 2001 for PCT/CH00/00190.
International Search Report dated Feb. 25, 2008 for PCT/DK2007/050142.

SIGNAL PROCESSING USING SPATIAL FILTER

CROSS REFERENCE TO RELATED APPLICATION

This application claims the benefit and priority to and is a U.S. National Phase of PCT International Application Number PCT/DK2007/050142, filed on Oct. 5, 2007, designating the United States of America and published in the English language, which is an International Application of and claims the benefit of priority to European Patent Application No. EP 06124745.8, filed on Nov. 24, 2006. The disclosures of the above-referenced applications are hereby expressly incorporated by reference in their entireties.

FIELD OF THE INVENTION

The present invention is related to the processing of signals from microphone devices, and in particular to noise reduction techniques in such devices. The invention is concerned with identification of a desired signal in a mix of an undesired noise signal and a desired signal, and the improvement of the signal quality by reducing the influence on the desired signal by the undesired noise levels. The new invention is a method and corresponding devices that are capable of attenuating noise components in microphone signals.

BACKGROUND OF THE INVENTION

The masking properties of the human ear as well as the statistical properties of speech makes it possible to reduce the subjective level of noise in microphone signals by the way of time-variant filtering. When the statistics of the noise signal is stationary it is possible to perform noise reduction by the way of time-variant filtering in devices that encompasses a single microphone only. One of the earliest to describe such a method for noise reduction was Boll, [1]. Boll called his method “Spectral Subtraction” as he measured the power spectrum of the noise and reduced the spectral power of the output signal by an amount equal to the measured noise power. Many have later treated the subject of single microphone noise reduction, for example Ephraim and Malah, [2].

Single microphone noise reduction techniques suffer from two limitations, the first being the need for stationary noise statistics and the second being that they require the signal to noise ratio of the microphone input to exceed a certain minimal value. If a device includes two or more microphones it is possible to use the increased amount of information at hand to improve noise reduction performance. Past work, for example [3], [4], [5], [6], [7], [8] has shown that a relief from the need for stationary noise statistics is possible.

Known techniques include the use of a time delay signal [5], a measurement of angle of incidence [7] and a measurement of microphone level difference [3], [6], [7] to control the frequency response of the device. A method has been described [8] where the frequency is controlled by the quotient of the absolute values of the outputs of two different linear beamformers.

Current methods for noise reduction by the way of time-variant filtering using one or two microphones suffer from the limitation that a certain signal to noise ratio is required of the acoustic signal in order for the methods to work.

Hence it is an object of the present invention to provide a new and improved signal processing technique for filtering signals from microphone devices which is not subject to the above mentioned limitation, but which can provide noise filtering and noise reduction at low signal to noise ratios.

SUMMARY OF THE INVENTION

The above mentioned object is achieved in a first aspect of the present invention by providing a signal processing device for processing microphone signals from at least two microphones. The processing device comprises a combination of a first beamformer for processing the microphone signals and providing a first beamformed signal, and a power estimator for processing the microphone signals and the first beamformed signal from the first beamformer in order to generate in frequency bands a first statistical estimate of the energy of a first part of an incident sound field. A gain controller processes the first statistical estimate in order to generate in frequency bands a first gain signal, and an audio processor processes an input to the signal processing device in dependence of said generated first gain signal.

The new invention enables noise reduction at signal to noise ratios much lower than methods known to this inventor can do. It enables noise reduction under severe conditions for which current methods fails. Furthermore the new invention is able to apply a more accurate gain than current methods, whence it will exhibit an improved audio quality. The new invention is applicable to devices such as hearing aids, headsets, mobile telephones etc.

In one embodiment of signal processing device according to the invention a signal multiplier device is included for multiplying, in frequency bands, the first beamformed signal with a second signal generated on the basis of said microphone signals. The power estimator is adapted to process the result of the multiplication in order to generate said first statistical estimate of the energy of said first part of an incident sound field.

In a further embodiment of the signal processing device according to the invention a second beamformer is included for processing the microphone signals, the output of which is the second signal. The second beamformer could in some embodiments be an adaptive beamformer.

In yet another embodiment of the signal processing device according to the invention a non-linear element is included and arranged to perform a nonlinear operation on said first beamformed signal. The power estimator is then arranged to process the output of the non-linear element in order to generate the first statistical estimate of the energy of said first part of an incident sound field.

In still another embodiment of the signal processing device according to the invention a signal filter is provided which is arranged to perform signal filtering in dependence of said generated first statistical estimate.

In a further embodiment of the signal processing device according to the invention the power estimator is adapted to generate, in frequency bands, a second statistical energy estimate related to the total energy of the incident sound field. The first gain signal is generated in function of said first and second statistical estimates.

In a still further embodiment of the signal processing device according to the invention a second beamformer is provided for processing the signals from the microphones, and the power estimator is adapted to generate, in frequency bands, a second statistical estimate of the energy of the output of the second beamformer. The first gain signal is generated in function of said first and second statistical estimates.

In yet a further embodiment of the signal processing device according to the invention the power estimator is adapted to generate, in frequency bands, a second statistical estimate of the energy of an input received through a transmission channel and wherein said first gain signal is generated in function of said first and second statistical estimates.

In a still further embodiment of the signal processing device according to the invention the power estimator is adapted to generate, in frequency bands, a second statistical estimate of the energy of a second part of the incident sound field. The first gain signal is generated in function of a weighted sum of first and second statistical estimates.

In a further embodiment of the signal processing device according to the invention a multiplier device is used which operates in the logarithmic domain.

An embodiment of the signal processing device according to the invention transforms the first statistical estimate to a lower frequency resolution prior to generating said first gain signal.

In a further embodiment of the signal processing device according to the invention the power estimator is adapted to generate, in frequency bands, a second statistical estimate of the energy of a second part of the sound field. In some situations the main contributor to the first part of the sound field is a wind generated noise source, while in some situations a wind generated noise source is the main contributor to the second part of the sound field.

In yet an embodiment of the signal processing device according to the invention the first gain signal is generated in function of a weighted sum of first and second statistical energy estimates.

In yet still another embodiment of the signal processing device according to the invention wherein the main contribution to said first part of the sound field is a wind generated noise, at least one further beamformer is provided for processing the signals from the microphones for providing a second beamformed signal. The power estimator may thus process the second beamformed signal in addition to the first beamformed signal and the microphone signals in order to generate, in frequency bands, a second statistical estimate of the energy of the energy of a second part of the sound field.

In some embodiments of the signal processing device according to the invention the power estimator is adapted to generate, in frequency bands, a second statistical estimate of the total energy of the sound field, while the first gain signal is generated as a function of said first and second statistical estimates.

In further example embodiments of the signal processing device according to the invention a multitude of beamformers is provided for processing the signals from the microphones. The power estimator then can utilize the output signals from several beamformers when generating, in frequency bands, a statistical estimate of energy.

In further example embodiments of the signal processing device according to the invention a non-linear element is provided for performing a non-linear operation on the first beamformed signal. The non-linear operation can be approximated with raising to a power smaller than two. The power estimator analyzes the result of the non-linear operation and when in addition utilizing a microphone signal input, it produces, in frequency bands, the first statistical estimate of the energy of the first part of an incident sound field.

In yet further example embodiments of the signal processing device according to the invention a signal multiplier device is included for multiplying, in frequency bands, the result of said non-linear operation with a second signal generated on the basis of said signal from the microphones. The power estimator processes the results of the multiplication and the non-linear operation in order to generate, in frequency bands, the first statistical estimate of the energy of the first part of an incident sound field.

In still further example embodiments of the signal processing device according to the invention an absolute value extracting device is included for estimating the absolute value of said first beamformed signal. The power estimator analyzes the result of the absolute value extraction in order to produce, in frequency bands, the first statistical estimate of the energy of the first part of an incident sound field.

In yet still further example embodiments of the signal processing device according to the invention the first statistical estimate of energy is an estimate the energy of the sound waves that are impinging to the device that have angles of incidence within a limited region of the incidence space.

In further example embodiments of the signal processing device according to the invention the first statistical estimate of energy is an estimate the energy of the sound waves that are impinging to the device with wave gradients within a limited region of the incidence space.

The above mentioned object is also achieved in a second aspect of the present invention by providing a method for processing signals from at least two microphones in dependence of a first sound field. The method includes processing of the microphone signals to provide a first beamformed signal and the processing the microphone signals together with the beamformed signal in order to generate in frequency bands a first statistical estimate of the energy of a first part of said sound field. The method also includes processing the generated first statistical estimate in order to generate in frequency bands a first gain signal in dependence of said first statistical estimate. Then, an input signal to the signal processing device is processed in dependence of said generated first gain signal.

In further embodiments of the method according to the second aspect of the invention the first beamformed signal is multiplied with another signal generated on the basis of the microphone signals, and the microphone signals are processed together with the beamformed signal in order to generate, in frequency bands, a first statistical estimate of the energy of a first part of an incident sound field. The multiplied signal is then processed further.

In further embodiments of the method according to the second aspect of the invention a non-linear operation which can be approximated with raising to a power smaller than two on said first beamformed signal is performed, and the result of said non-linear operation is processed together with the microphone signals in order to produce, in frequency bands, the first statistical estimate of the energy of the first part of an incident sound field.

The above mentioned object is also achieved in a third aspect of the invention by providing a method for processing signals from at least two microphones in dependence on a first sound field including processing the microphone signals to provide at least two beamformed signals. The microphone signals are processed together with the beamformed signals in order to generate in frequency bands at least two statistical estimates of the energy of sources of wind noise in said first sound field. The generated statistical estimates are processed in order to generate in frequency bands a first gain signal, whereby the gain signal thus depending on said statistical estimates. Subsequently an input signal to the signal processing device is processed in dependence of said generated first gain signal.

In further embodiments of the method according to the third aspect of the invention the microphone signals are processed together with the beamformed signals in order to generate, in frequency bands, a statistical estimate of the total energy of the sound field. The generated statistical estimates of energy of sources of wind noise and of the total sound field are processed in order to generate, in frequency bands, the first gain signal in dependence of said statistical estimates of energy of sources of wind noise and of the total sound field.

The invention is below described in further detail with references to the appended drawings, briefly described in the following:

a) is a possible target response for extracting the power of the target or utility signal, and b) is a possible target response for extracting the noise power.

Figure 12:
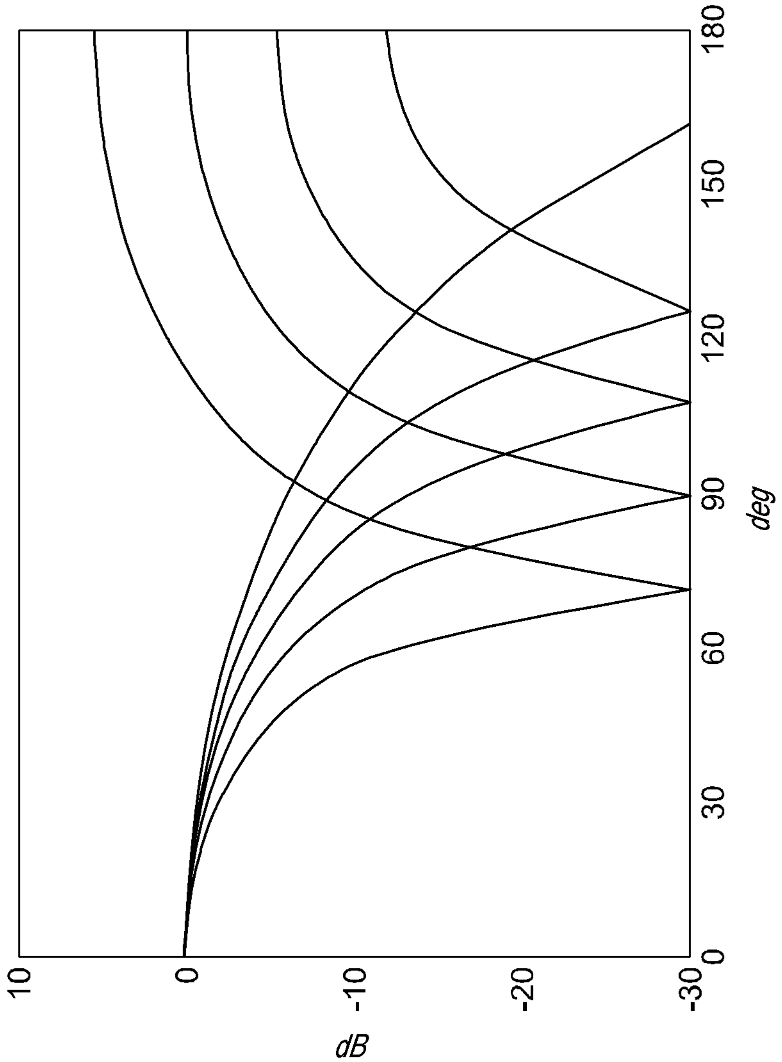

FIG. 12 shows typical example characteristics for two-microphone implementations based on a first-order beamformer, in dBs versus degrees.

Figure 13:
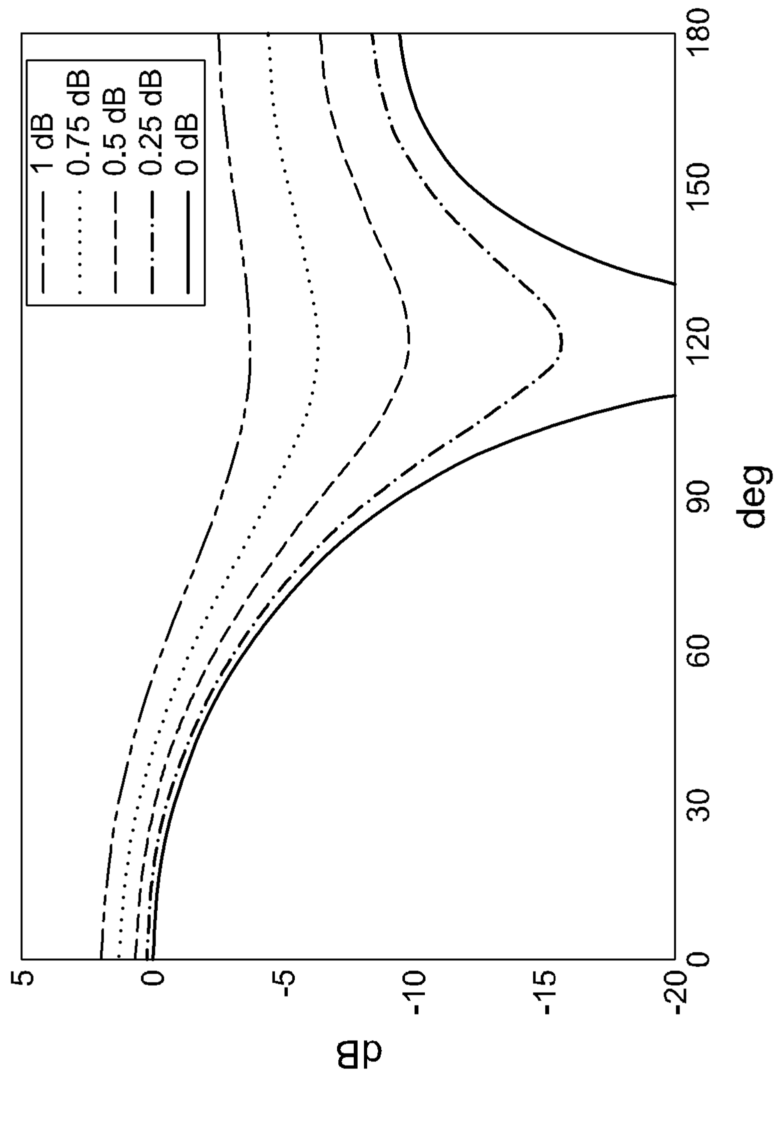

FIG. 13 shows typical example characteristics for two-microphone implementations using a first-order beamformer of the supercardioid type, in dB versus degrees, for various degrees of gradient mismatch.

Figure 14:
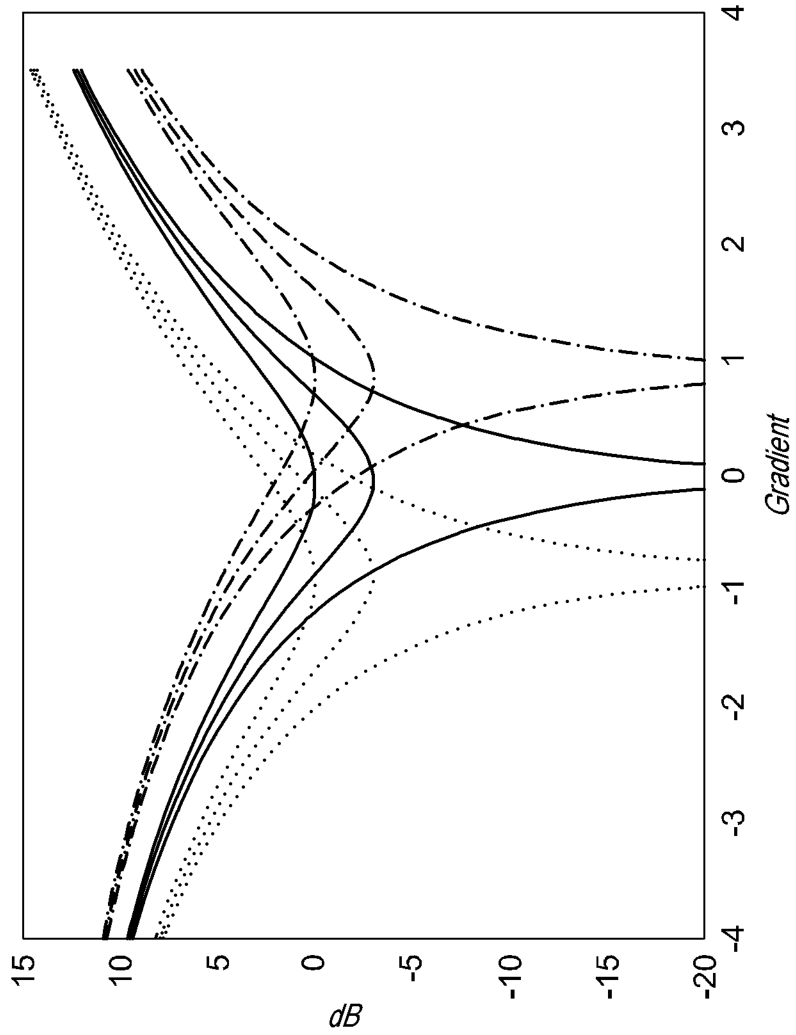

FIG. 14 shows typical example characteristics for two-microphone implementations using a first order beamformer, in dB versus the gradient in dB of the incoming wave. Characteristics for 3 different beamformers are shown, all dipoles but having their directional zeros placed at 3 different gradient values.

Figure 15:
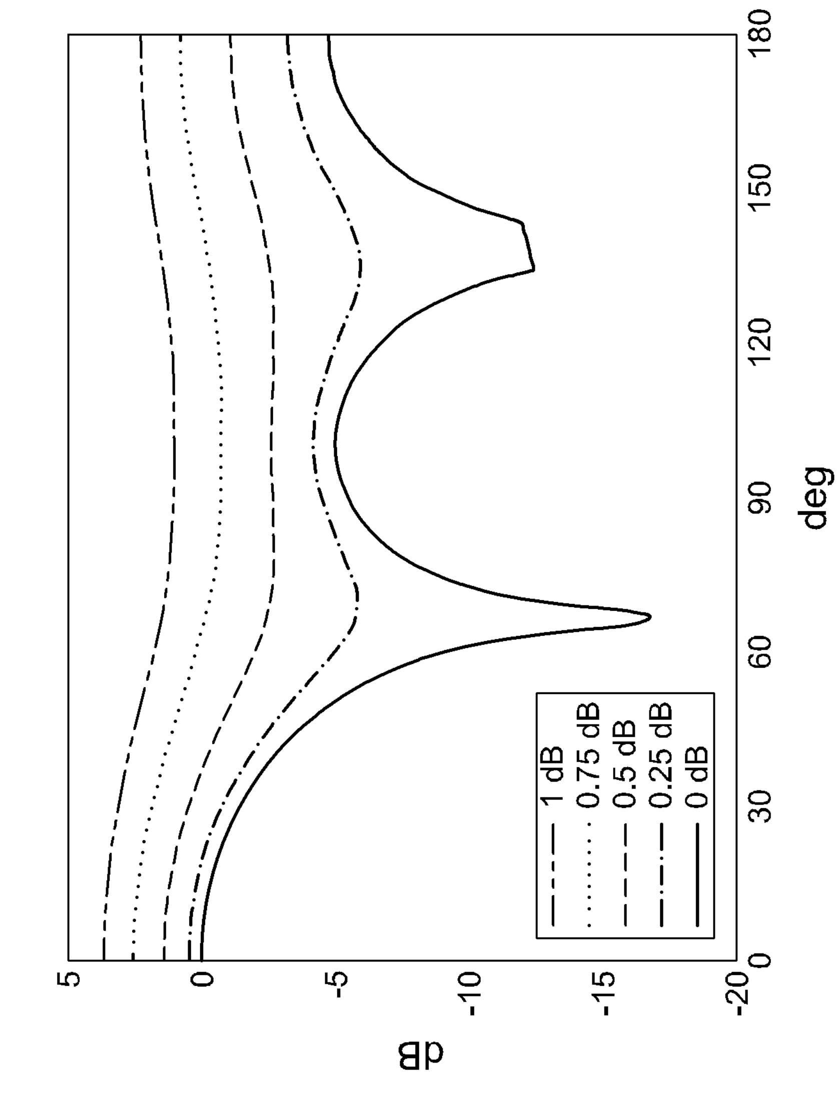

FIG. 15 shows typical example characteristics for two-microphone implementations using a second order non-linear spatial filter, in dB versus degrees, for various gradients of the incoming wave.

Figure 16:
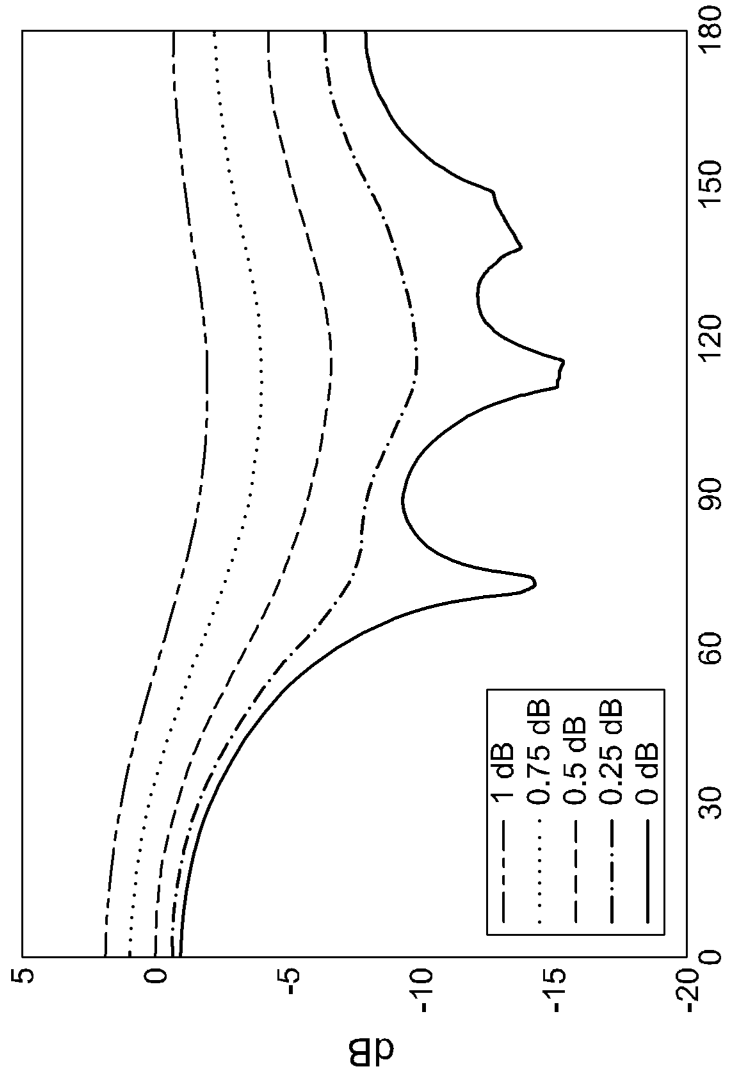

FIG. 16 shows typical example characteristics for a two-microphone third order non-linear spatial filter, in dB versus degrees, for various gradients of the incoming wave.

Figure 17:
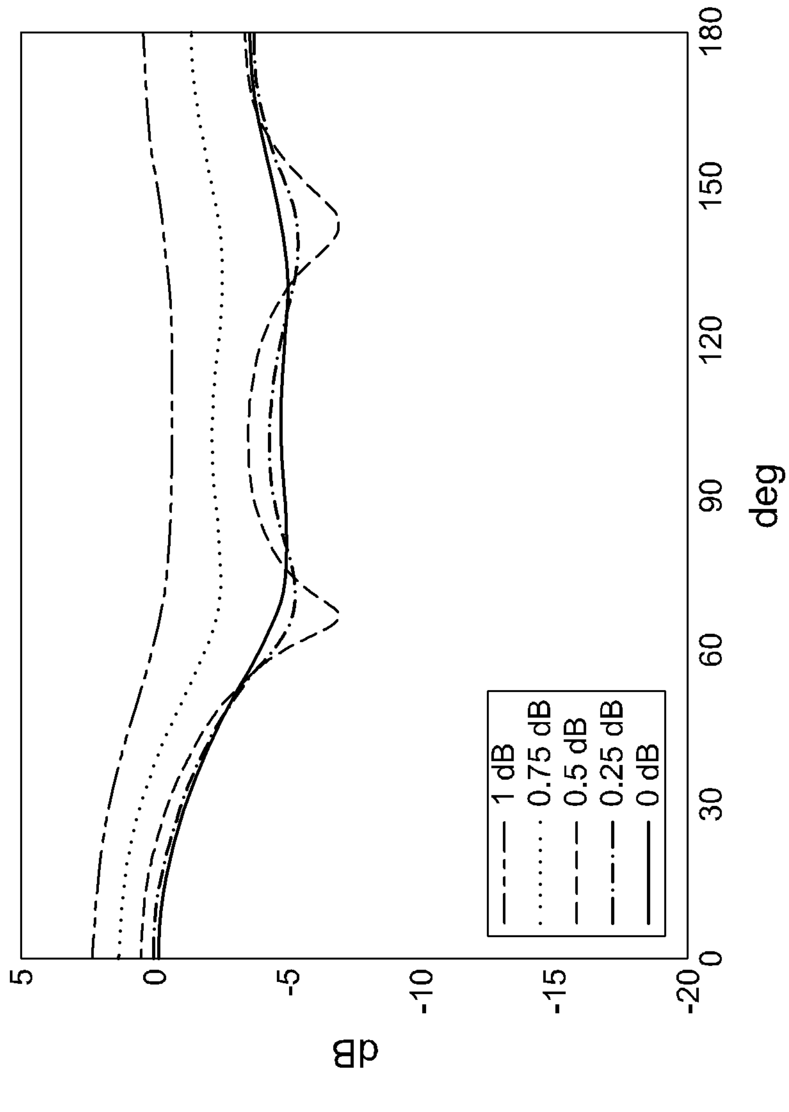

FIG. 17 shows typical example characteristics for a two-microphone fourth order non-linear spatial filter, in dB versus degrees, for various gradients of the incoming wave.

Figure 18:
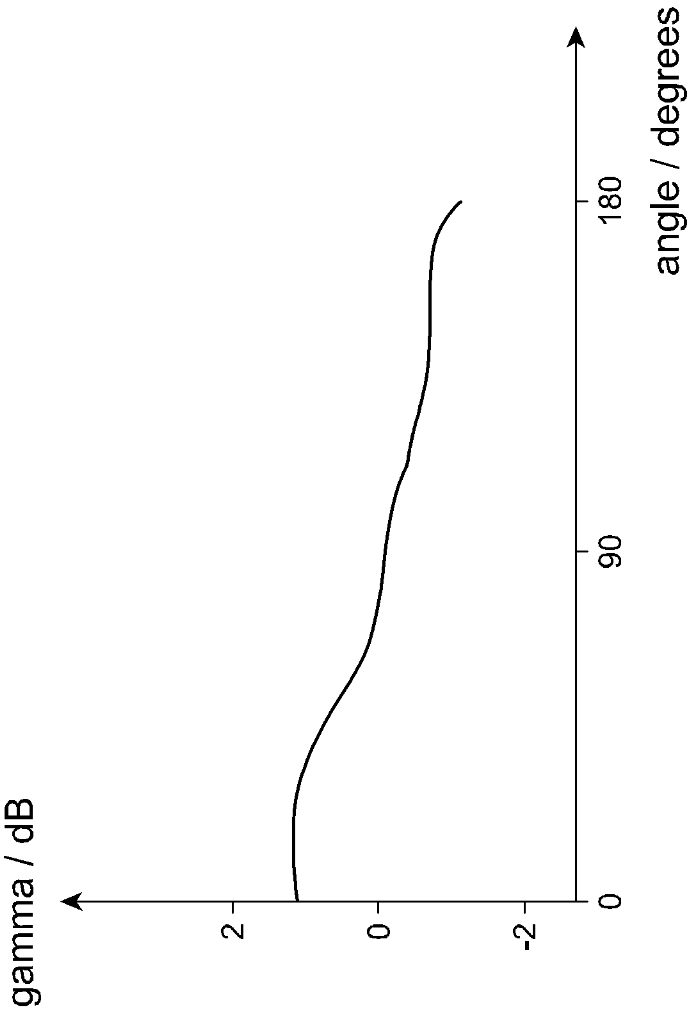

FIG. 18 shows an example of a plane wave γ trajectory of a headworn device.

Figure 19:
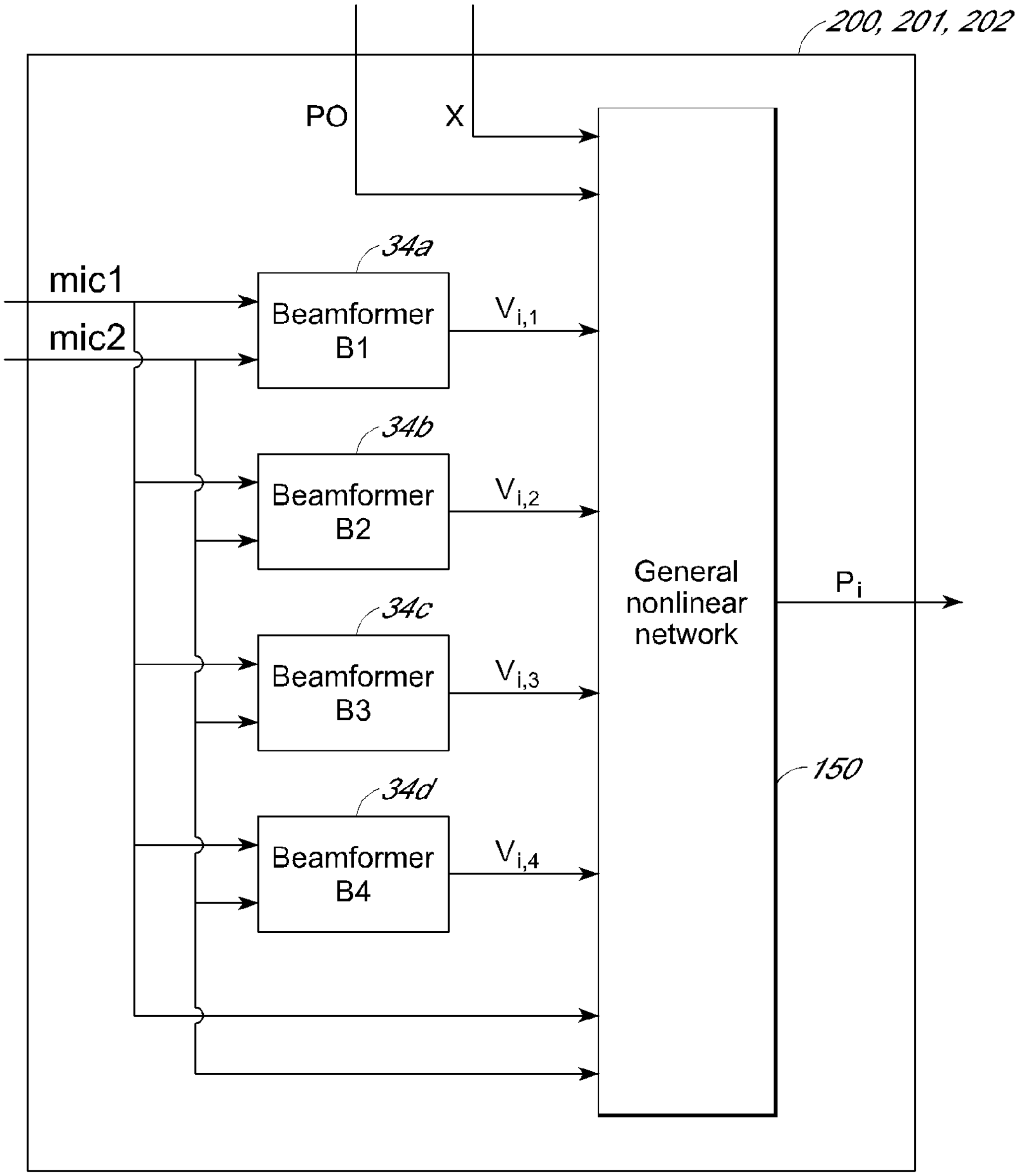

FIG. 19 illustrates an example of a nonlinear spatial filter using a general nonlinear network as used in various embodiments of the invention.

Figure 20:
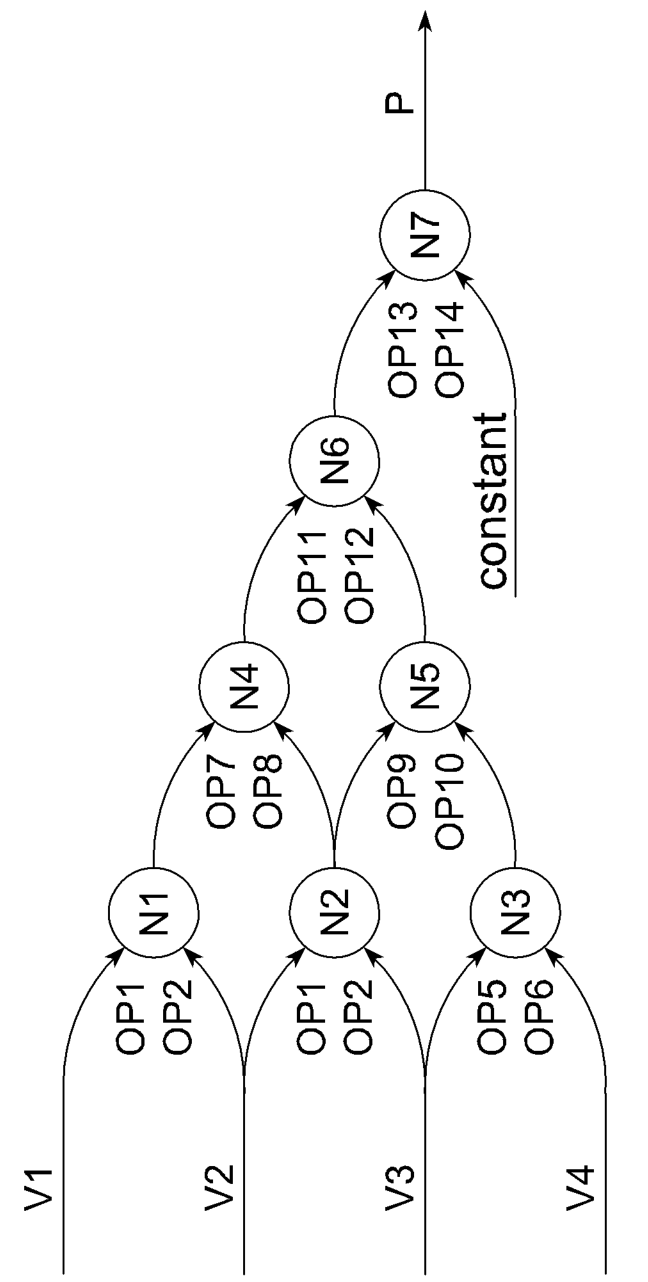

FIG. 20 illustrates an example of a general non-linear network used in some embodiments of the various aspects of the invention.

Figure 21:
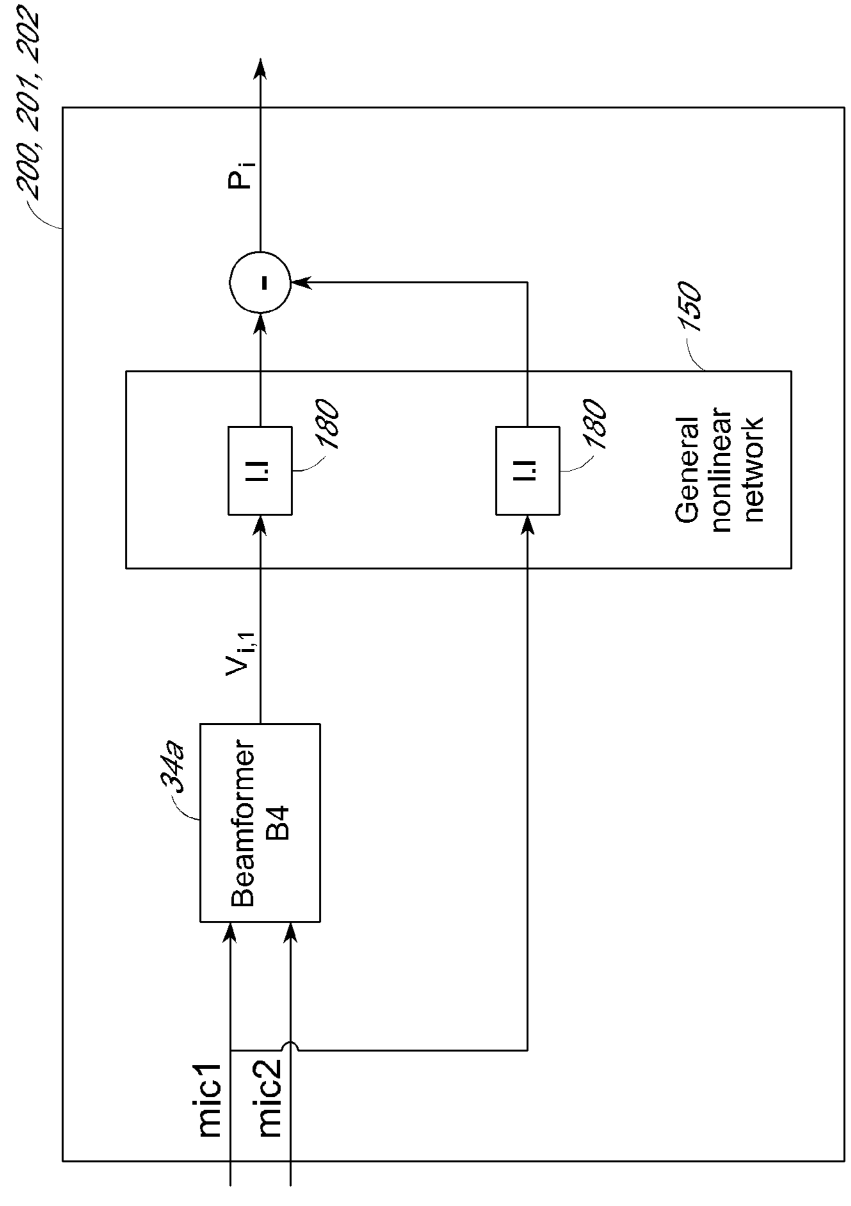

FIG. 21 illustrates an example of a nonlinear spatial filter implementing an "inverted beamformer".

Figure 22:
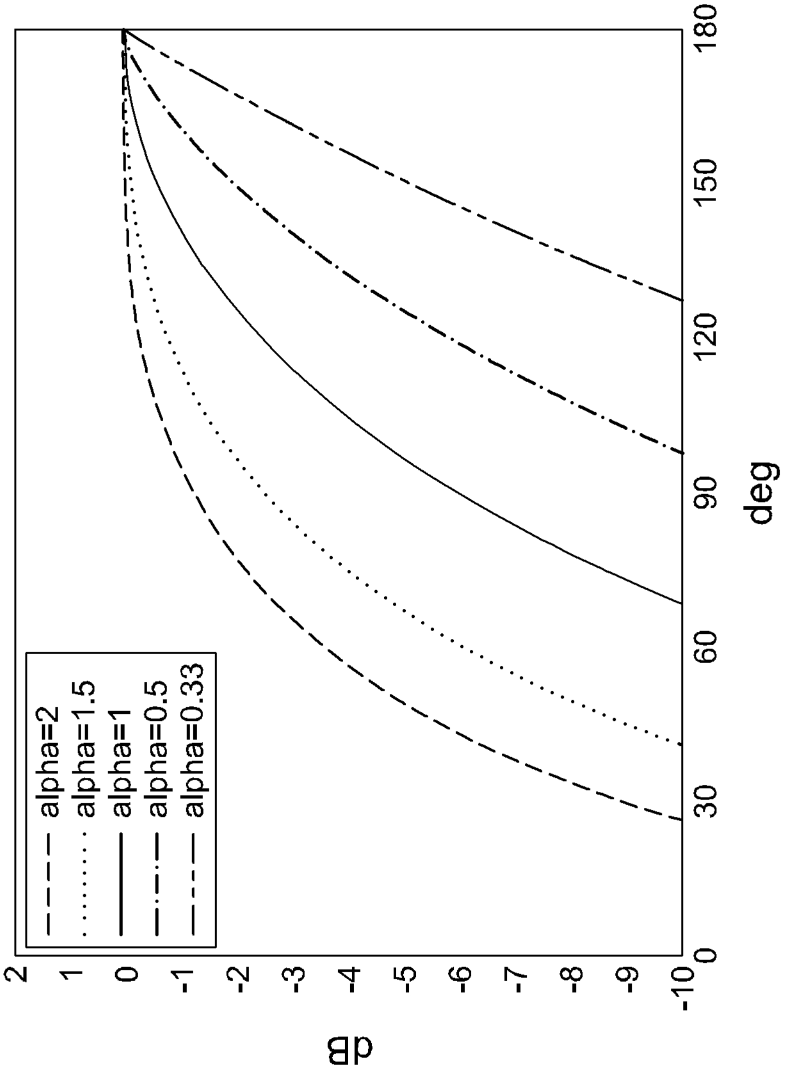

FIG. 22 illustrates typical example characteristics of a non-linear spatial filter implementing an "inverted beamformer" for various gradients of incoming wave, in units of db versus degrees. The frequency is 1 kHz, and the microphone spacing is 10 mm.

Figure 23:
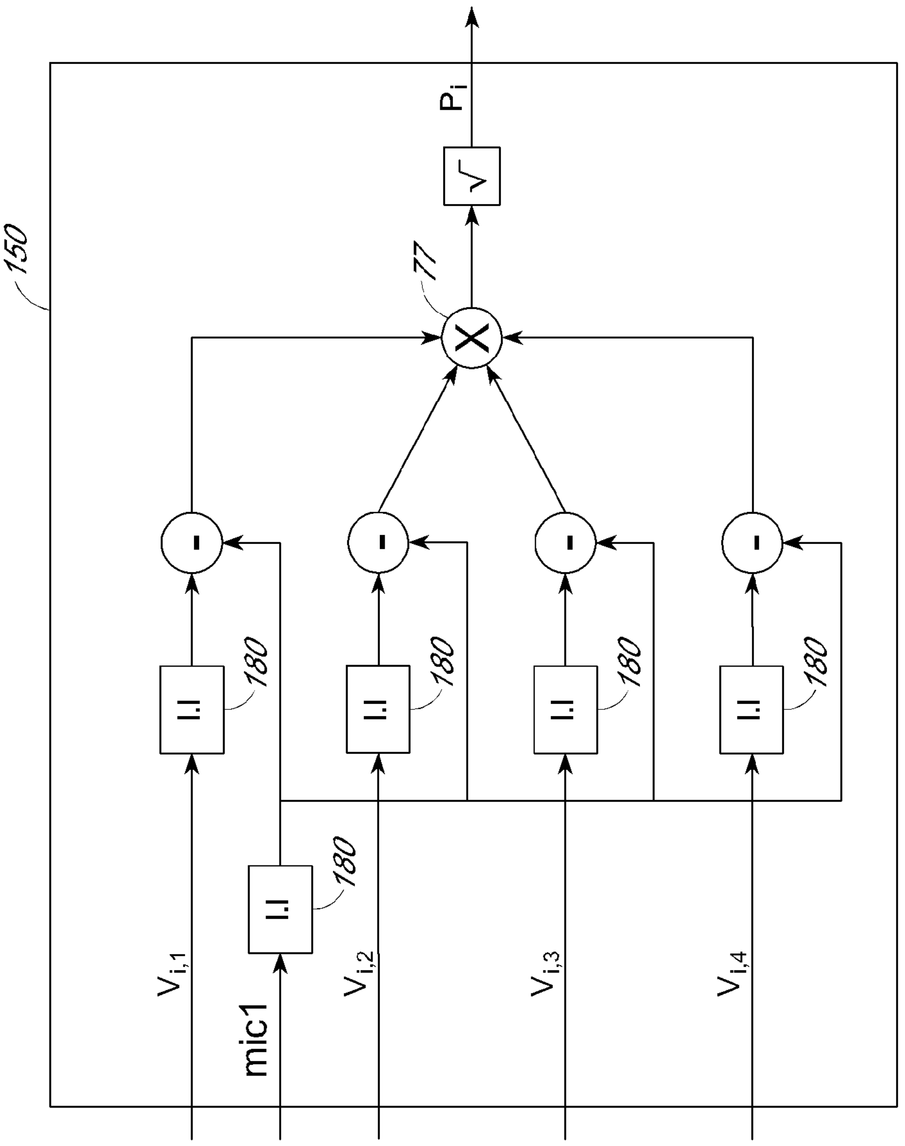

FIG. 23 illustrates an implementation of a general nonlinear network implementing and combining four "inverted beamformers".

Figure 24:
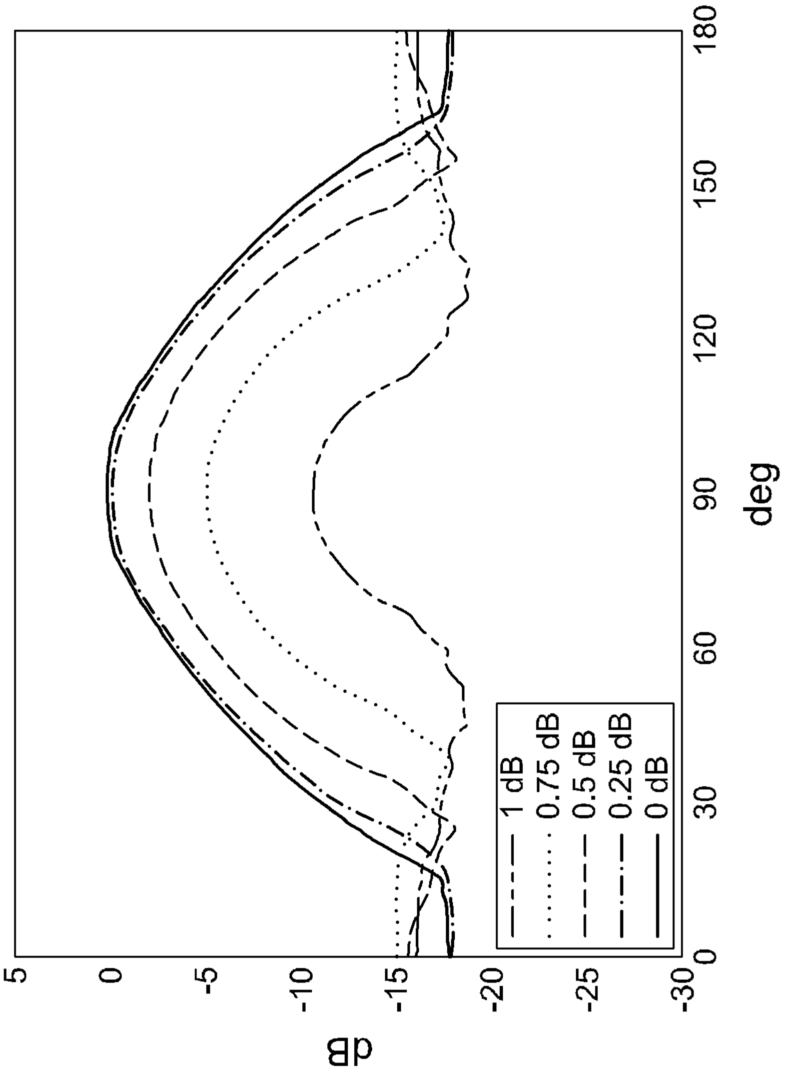

FIG. 24 illustrates typical example characteristics of an implementation using two-microphones and a non-linear spatial filter including four beamformers in "inverted beamformer" configuration in dB versus degrees, for various gradients of incoming wave. The frequency is 1 kHz, and the microphone spacing is 10 mm.

Figure 25:
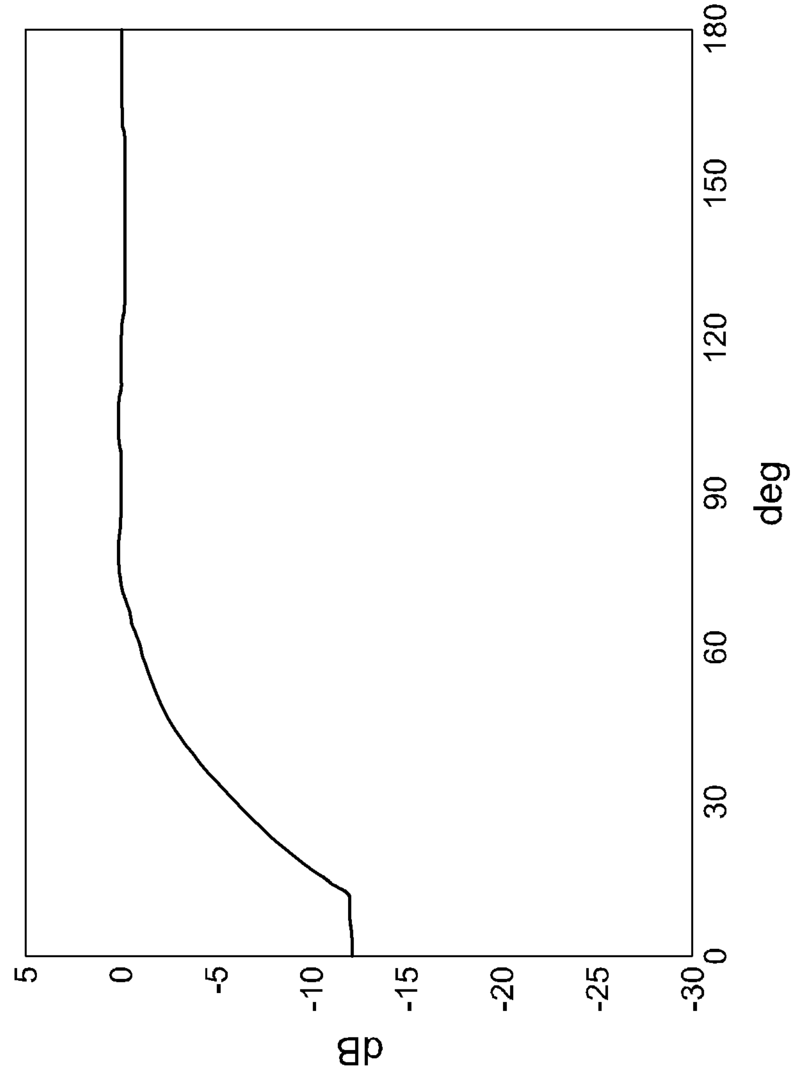

FIG. 25 shows a typical example curve of noise extraction directional plane wave response of an example embodiment of a device according to the invention incorporating eight linear beamformers in "inverted beamformer" configuration, in dB versus degrees.

Figure 26:
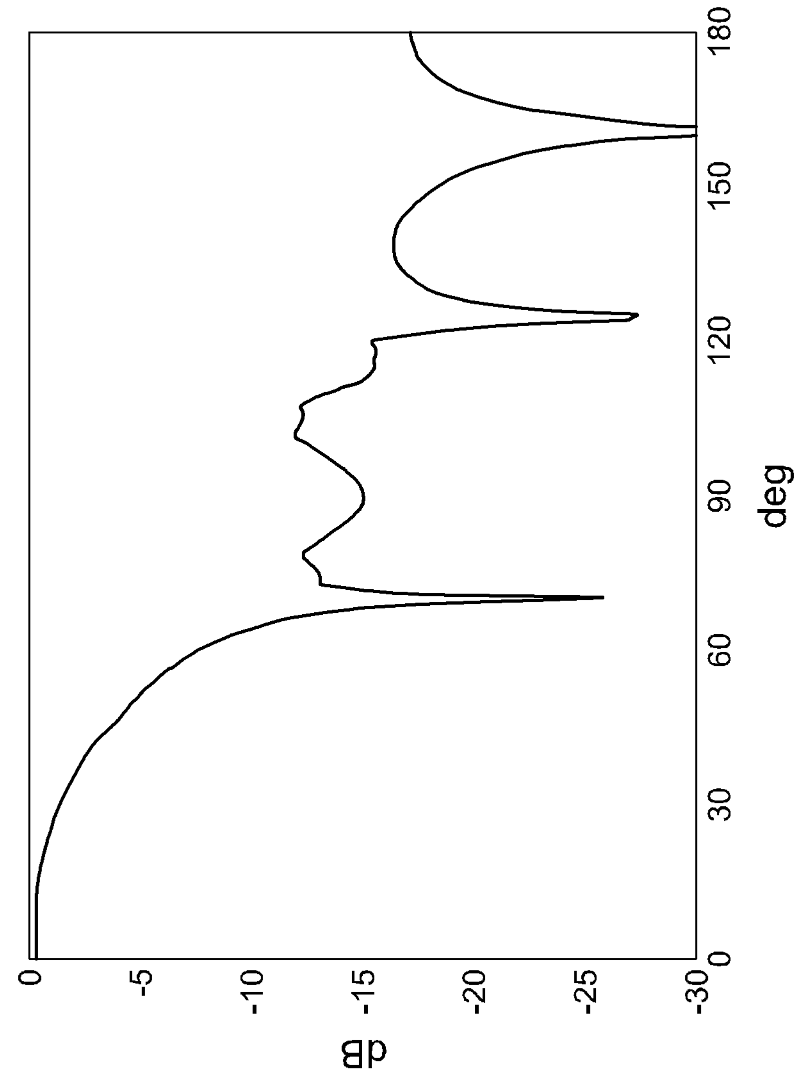

FIG. 26 shows a typical example curve of a target signal extraction directional plane wave response of two-microphone, 10 mm spaced, with a nonlinear spatial filter based on eight linear beamformers in "inverted beamformer" configuration, in dB versus degrees.

Figure 27:
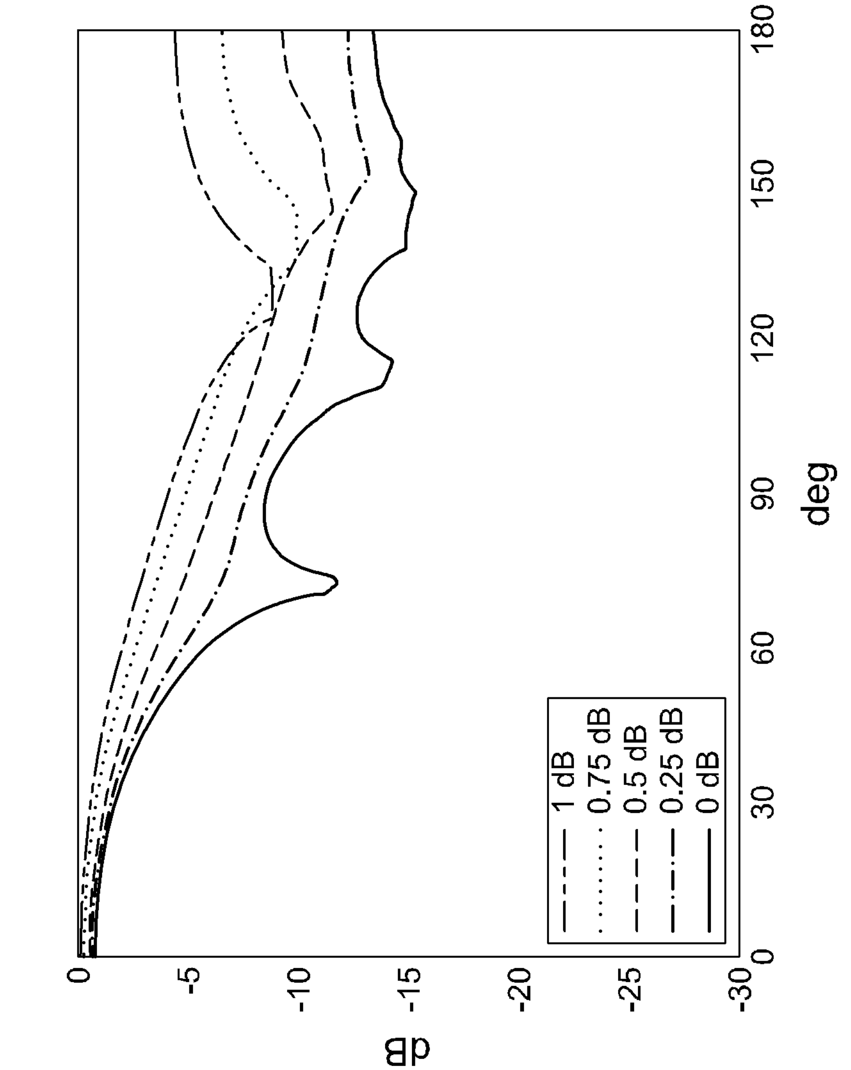

FIG. 27 shows example characteristics where the spatial filter of FIG. 16 is augmented with a "inverted beamformer" with zero at (180, 0), in dB versus degrees, for various gradients of the incoming wave.

Figure 28:
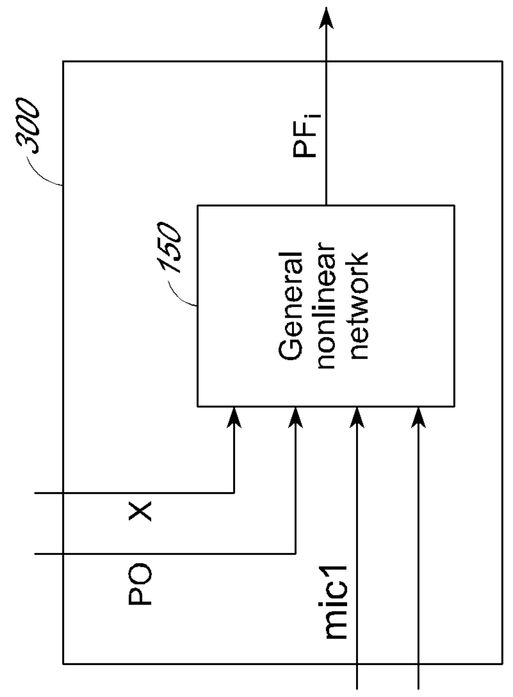

FIG. 28 illustrates an example implementation of a full range extractor.

Figure 29:
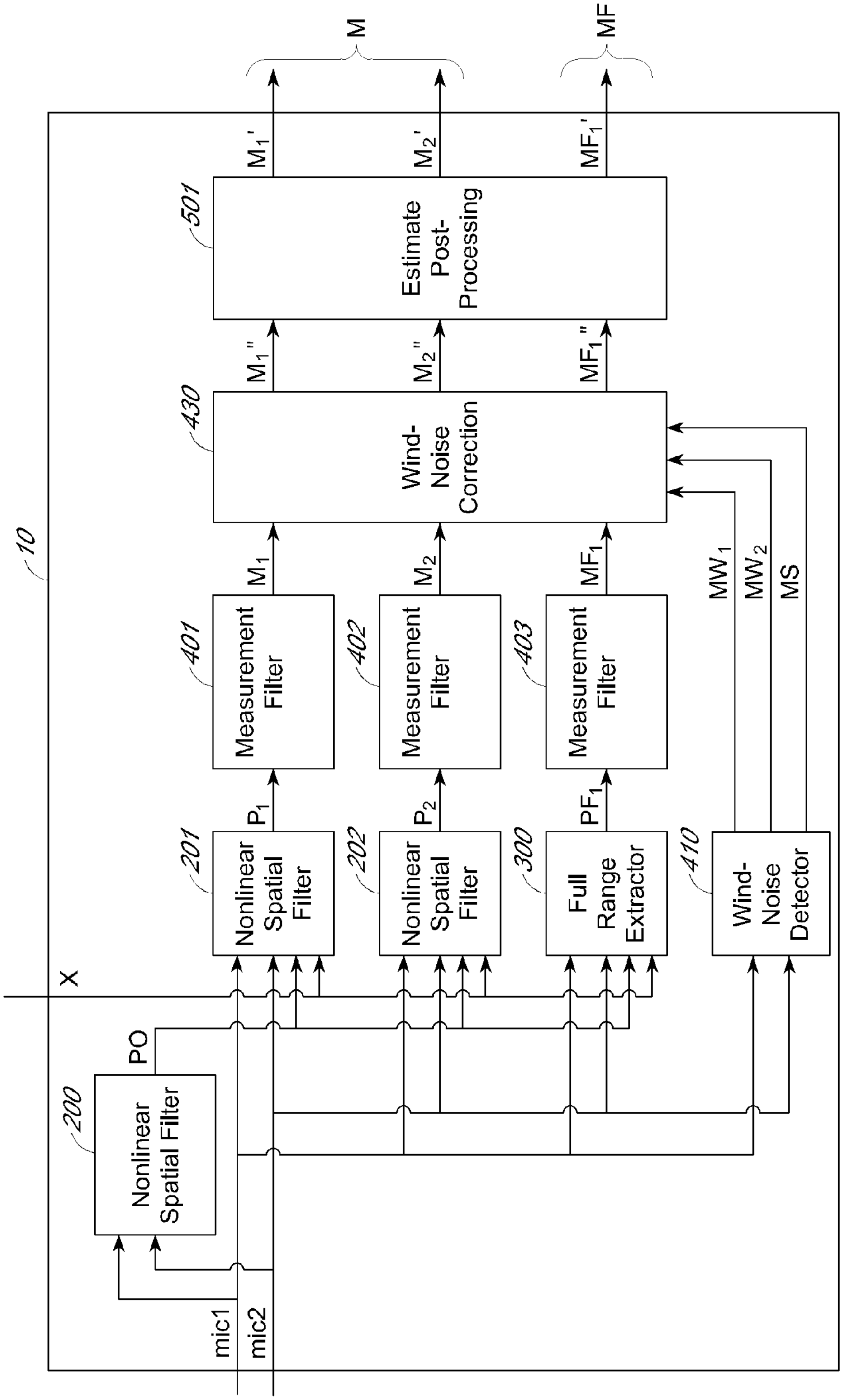

FIG. 29 illustrates an example of a power estimator block which has been enhanced with a wind-noise detector block and an optional wind-noise correction block.

Figure 30:
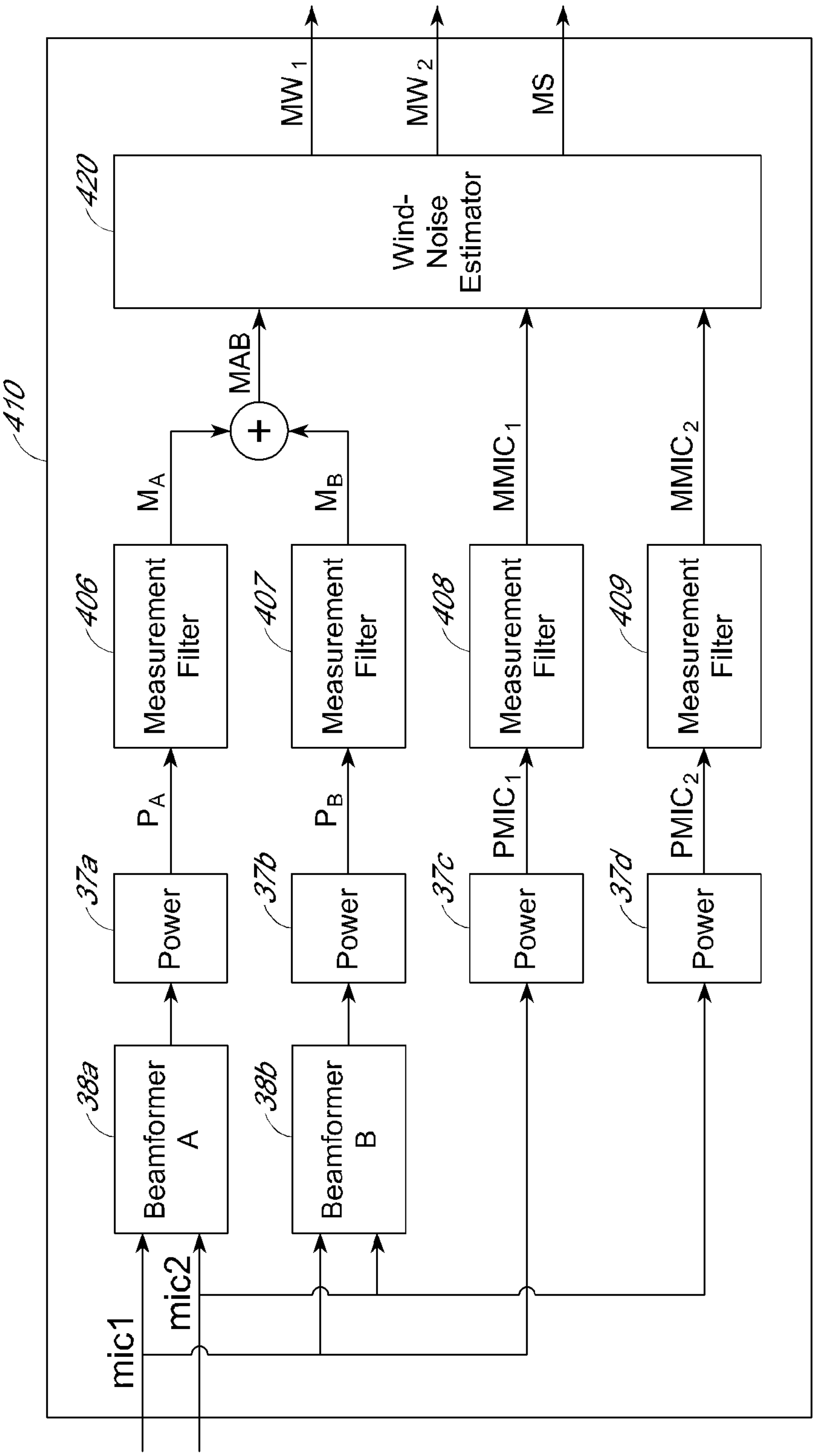

FIG. 30 illustrates an example of a wind-noise detector used in some embodiments of the various aspects of the invention.

Figure 31:
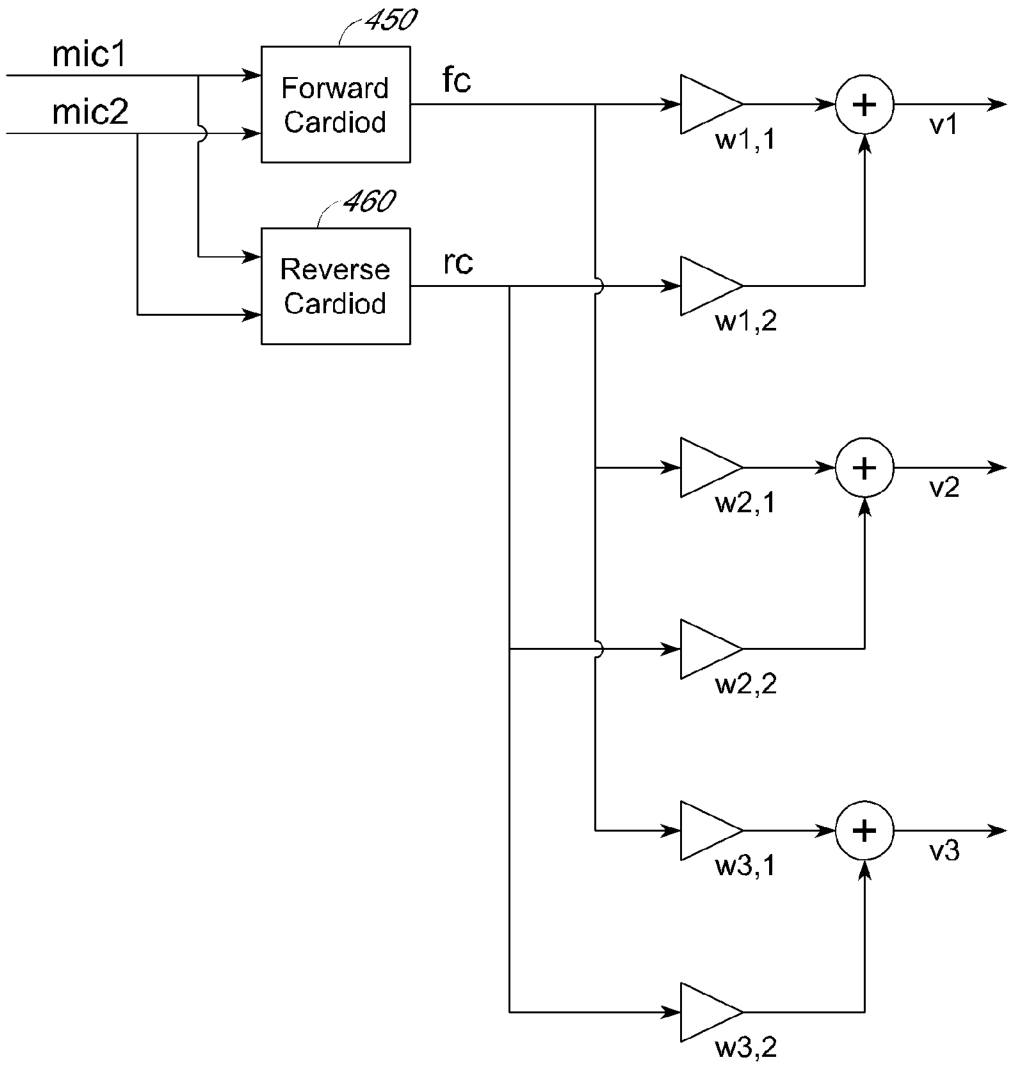

FIG. 31 illustrates the use of "orthogonal" cardiods to produce a number of different beamformed signals.

Figure 32:
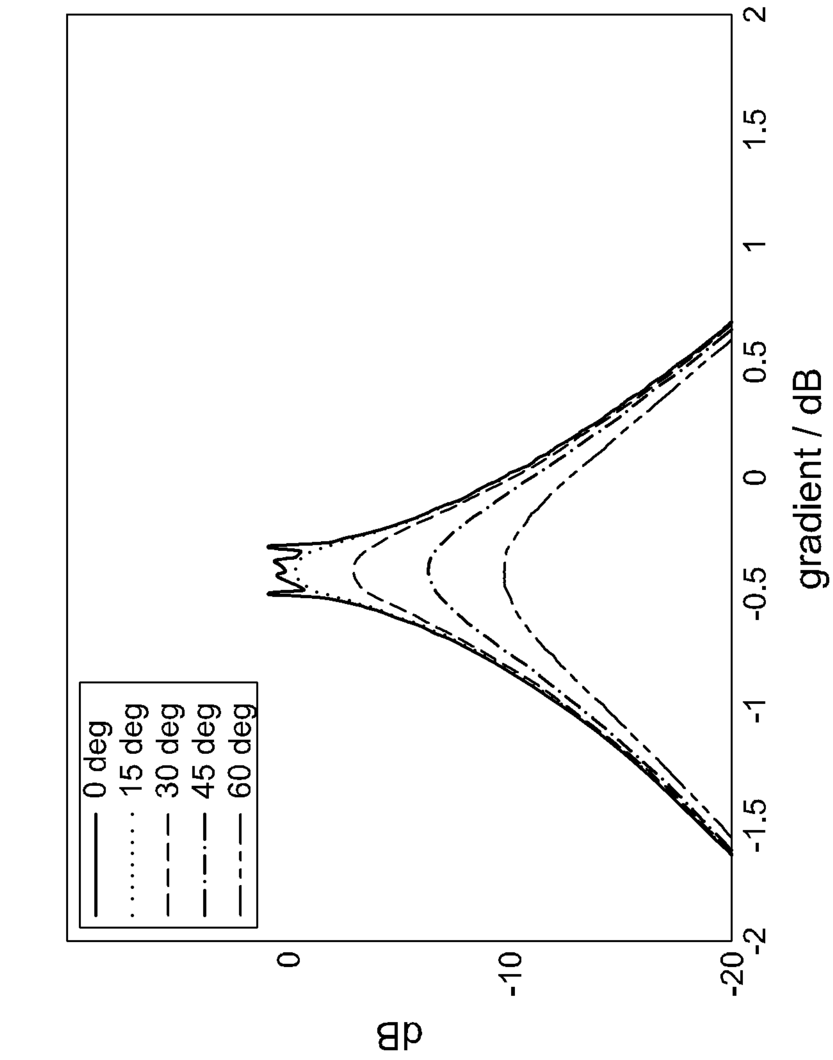

FIG. 32 shows typical example characteristics for two-microphone implementations 4 beamformers in "inverted beamformer" configuration, in dB versus the gradient of the incoming wave in dB.

DETAILED DESCRIPTION OF THE INVENTION

Initially, it will be useful to define a few conventions used throughout the following description. The description will use single letters, letter combination or words to name signals, variables and constants. The description will use the name in lower case to refer the time domain representation of a signal while it will use the name in upper case to refer to a frequency domain representation of the same signal. The notation x* signifies the complex conjugate of x.

Most of the signal processing described in this document is assumed to be performed on blocks of samples. The document though does not go in detail with regard to block sizes, rates, principles etc. The notation SIG(f,t) is used to refer to a signal processed block-wise and in frequency bands.

The notation SIG(f,t) may refer to a frequency domain (or narrowband filter bank) analysis of the time domain signal sig(t), but it may also indicate that the signal SIG is present in the device as a frequency domain (or narrowband filterbank) signal. If the latter is the case the time domain equivalent sig(t) may or may not be present in the device also.

Gradient: Throughout the document the word gradient is used to designate the numerical value of the gradient of a wave. The numerical value of the gradient is the projection of the vector wave gradient onto the direction of incidence of the wave or the microphone axis.

Figure 1:
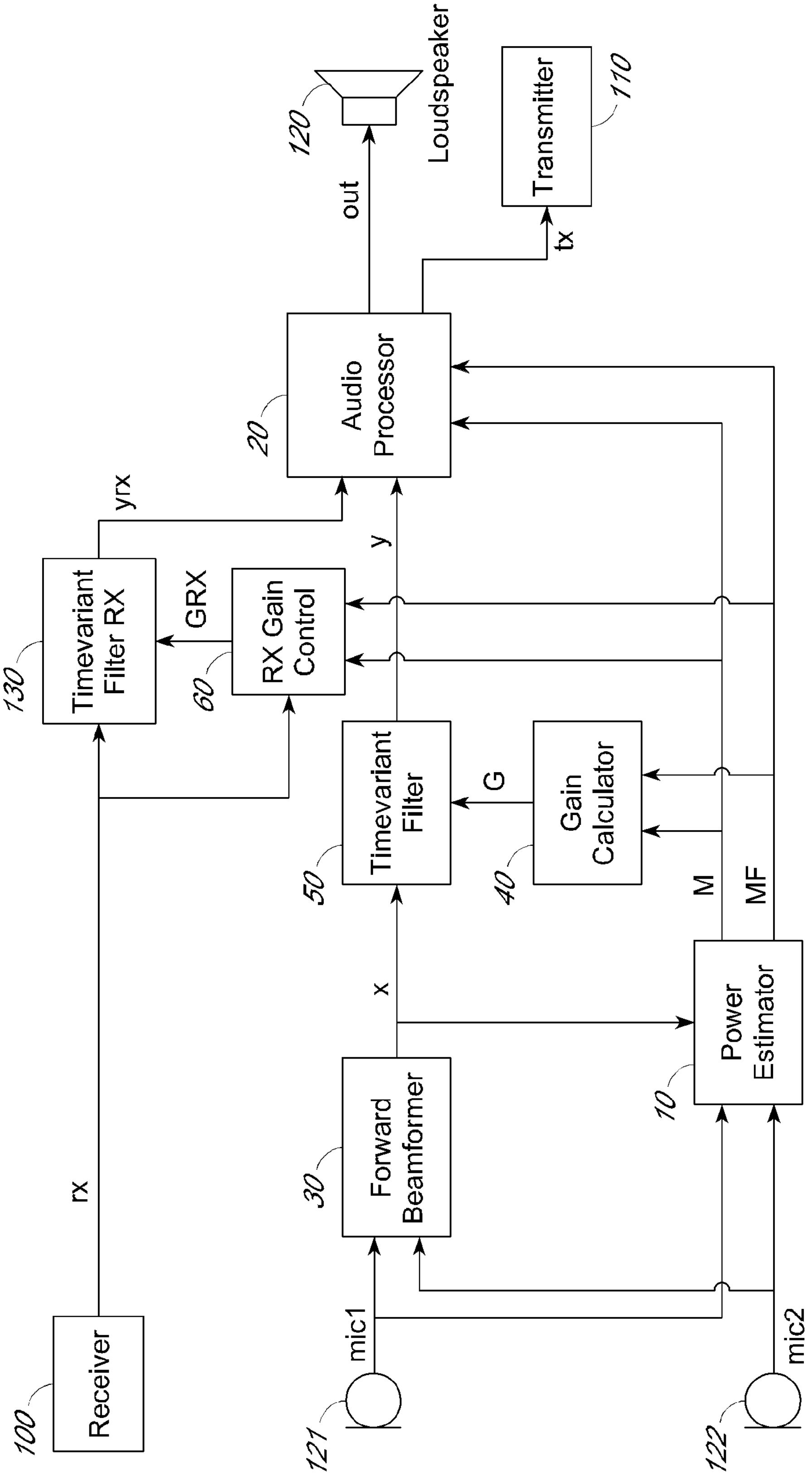
FIG. 1 illustrates a first example embodiment of a signal processing device according to the invention for processing audio signals using linear time-variant filtering.

FIG. 1 shows an overview of an example embodiment of a signal processing device according to the invention for processing audio signals implementing the new invention. There is shown a basic block diagram of an audio device incorporating the new invention. An important feature of the new invention is the power estimator block 10.

In the forward signal path the signals from two (or more) microphones 121,122 are passed through an optional beamformer 30 that may provide noise reduction in addition to the reduction that is provided by the time-variant filter 50. The beamformer 30 could also be called a forward beamformer. Following the forward beamformer 30 the forward signal is passed to the time-variant filter 50. In some embodiments the signal from the microphones 121,122 may be passed directly from the microphones 121,122 to the time-variant filter 50. The output signal of the time-variant filter 50 is passed to an audio processor 20 that is responsible for the main audio processing. The output of the audio processor 20 can be provided as an output either to a loudspeaker 120 or to a transmitter 110 for transmission to external devices (not shown).

The signals from the microphones 121,122 are also transferred to a power estimator 10. The power estimator 10 is arranged in the control path for the time-variant filter 50. The signals from the microphones 121,122 analyzed in the power estimator block 10 in order to generate statistical estimates M and MF. In some preferred embodiments the statistical estimates M and MF are estimatetes of power, whence the name power estimator, but in other preferred embodiments they will be other statistical estimates of energy such as estimates of the mean of the absolute value, $1^{st}$, $2^{nd}$ or $3^{rd}$ order moments or cumulants, etc. The statistical estimates M are estimates of the energy of parts of the sound field. M will contain at least a first component signal but may in embodiments contain any number of component signals equal to or larger than 1, each component signal divided in frequency bands. Each component signal will be a statistical estimate of the energy of the group of waves that impinges to the device with incidence characteristics confined to a given limited range of the incidence space. The incidence characteristics that are used to partition or group the waves may include angle of incidence, wave gradient, wave curvature or wave dispersion or a combination of those characteristics. 2 different component signals of M may be estimates of energy of different parts of the sound where the parts may or may not be overlapping but they may also be different estimates of energy of the same part of the sound field.

The estimates MF are statistical estimates of the total energy of the sound field as can be observed at the output of one of the microphones or at the output of the forward beamformer 30. There may be any number of estimates MF each divided into frequency bands. Two different component signals of MF may be different estimates of energy of the sound field as seen at the same microphone or beamformer output but they may also be estimates of energy of different microphone or beamformer outputs.

The said power estimates M and MF being output from the power estimator 10 is passed on to a gain calculator 40 that generates a frequency and time dependent gain G which in the embodiment on FIG. 1 is transferred to the time-variant filter for controlling the gain of the time-variant filter 50. In some embodiments the frequency and time dependent gain signal G may be provided to the audio processor 20, whereby the input to the audio processor may be processed in dependence of the generated gain signal G. In some embodiments, the time-variant filter 50 could be an integrated part of the audio processor 20. The said power estimates M and MF being output of the power estimator 10 may also be transferred to the audio processor 20 for being used there to define the processing of signals.

The time-variant filter 50 may be implemented in various ways. It could be straight IIR (Infinite Impulse Response) or FIR (Finite Impulse Response) implementations or combinations thereof, it could be implemented via uniform filter-banks, FFT (Fast Fourier Transform) based convolution, windowed-FFT/IFFT (Fast Fourier Transform/Inverse Fast Fourier Transform)or wavelet filter-banks among others. FIG. 1 illustrates how the time-variant filter 50 may receive a frequency domain (gain versus frequency band) representation of the desired filter response. The task of converting this representation into the set of coefficients needed to implement a corresponding filter response is thus embedded within the time-variant filter itself.

FIG. 1 shows the individual schematic blocks autonomously. Indeed that constitutes one possible implementation. The schematic blocks may also share parts of their implementation, for example they may share filter banks, FFT/IFFT processing etc.

The new invention may be used in a variety of applications such as hearing aids, headsets, directional microphone devices, telephone handsets, mobile telephones, video cameras etc. FIG. 1 shows optional blocks loudspeaker 120, receiver 100 and transmitter 110. Some applications, such as for example hearing aids, telephone devices and headsets typically contain a loudspeaker 120. Some applications, such as stage microphones, telephone devices and headsets will contain a transmitter 110. The transmitter 110 may be a wireless transmitter but it may also drive an electrical cable. Some applications, such as telephone devices and headsets will contain a receiver 100 which may be wireless or it may be connected via an electrical cable.

The receiver/transmitter 100,110 may operate as part of a transmission channel with audio-processing functions 20 included. In addition, the output of the power estimator 10 may also be connected to an RX-gain control unit 60. The RX gain control unit 60 uses the input from the power estimator 10 and a signal input rx from the receiver 100 to calculate a gain function GRX for a RX-time-variant filter 130 arranged to process the receiver signal rx before passing a processed signal yrx to the audio processor 20. The purpose of the blocks 60 and 130 could include adapting the output level of the rx signal as presented to the loudspeaker 120 in function of the level of energy of a part of the incoming sound wave. One or both of the RX gain control 60 and the RX time variant filter 130 may in some embodiments be embedded within the audio processor 20.

Signals shown on FIG. 1 and the other figures are drawn as single lines. In actual implementations the signals may be single time domain signals but they could also be filter bank or frequency domain signals. A filter bank or frequency domain signal would be divided into bands such that the line on the figure would correspond to a vector of signal values. The signal G in particular is divided into frequency bands. The signals M and MF are also divided into frequency bands, furthermore each may contain more than one component signal, each component signal being divided into frequency bands. Some embodiments of the invention may contain provisions for the conversion of time domain signals into frequency domain, for example FFT or filter banks. Likewise implementations may contain provision for the conversion from signals split in frequency bands to time domain signal. The figures and the description does not explicitly show these provisions and no restriction is placed upon their placement. They may or may not be present in each block of the figures.

Some implementations may contain provisions for analog to digital conversion and possibly for digital to analog conversion. Such conversions are not shown explicitly on the figures, but their application will be apparent for a person skilled in the art.

Figure 2:
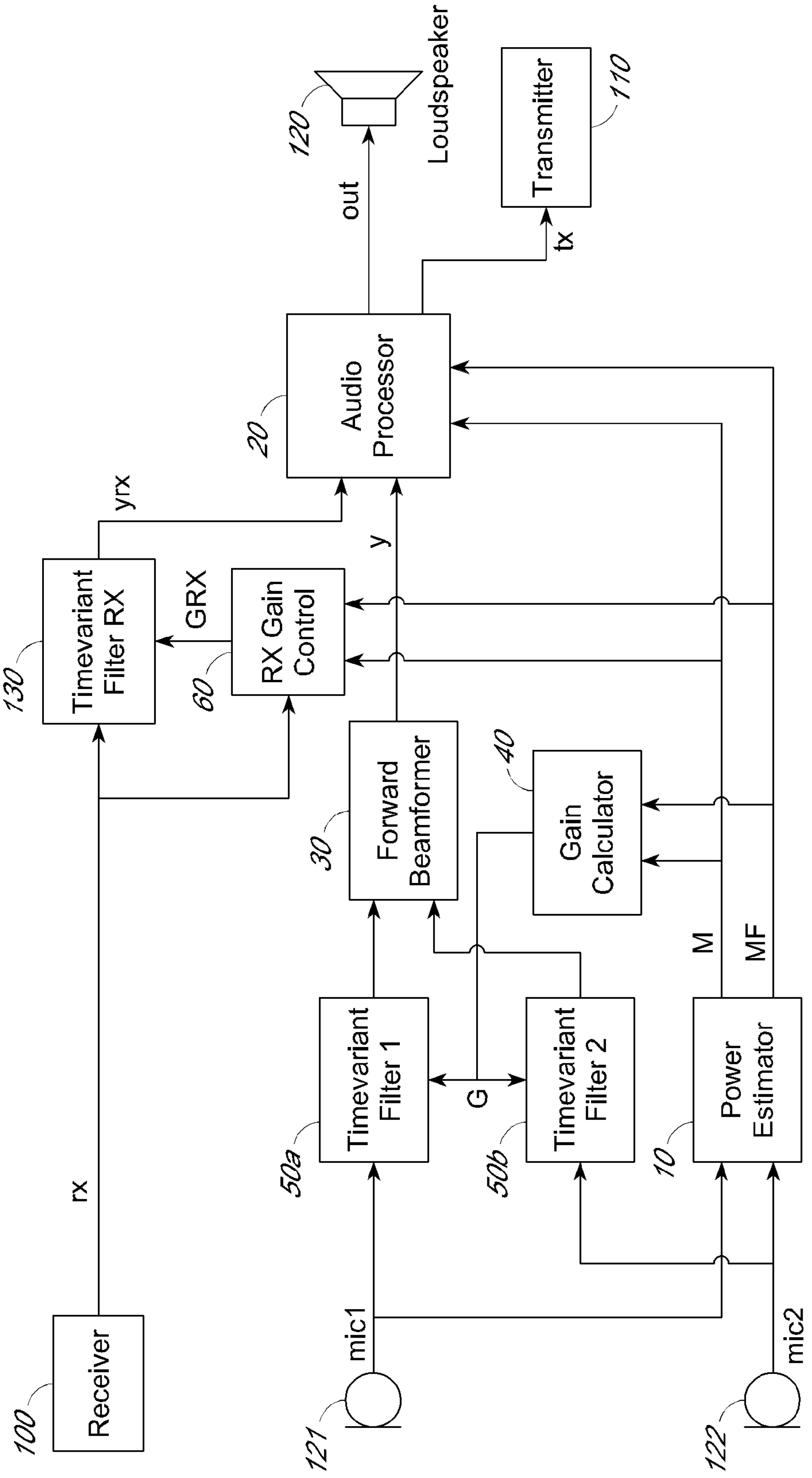
FIG. 2 illustrates yet an example embodiment of a signal processing device according to the invention for processing audio signals using linear time-variant filtering.
Figure 3:
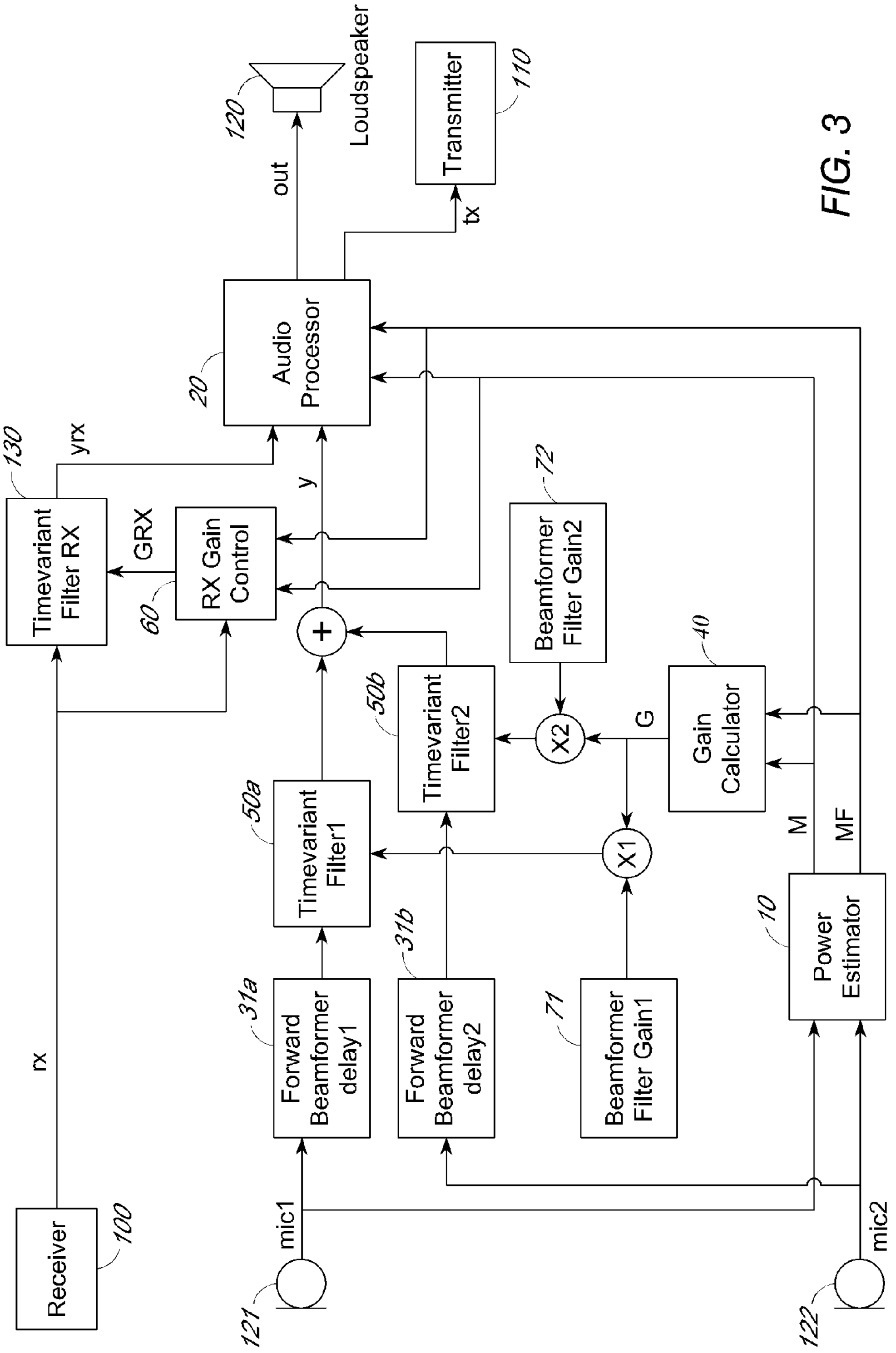
FIG. 3 illustrates still yet an example embodiment of a signal processing device according to the invention for processing audio signals using linear time-variant filtering.

FIGS. 2 and 3 show alternative embodiments of devices according to the invention. FIGS. 2 and 3 illustrates further example embodiments of a signal processing device and method according to the invention for processing audio signals. The implementation of FIG. 2 has interchanged the order of the time-variant filter 50 and the optional forward beamformer 30. This implementation requires at least two time-variant filters $\mathbf{50}_A$,$\mathbf{50}_B$ one for each microphone 121,122 and is thus split into a first time-variant filter $\mathbf{50}_A$ arranged to process the output signal from the first microphone 121 and a second time-variant filter $\mathbf{50}_B$ for processing the output signal from the second microphone 122. Both time-variant filters $\mathbf{50}_{A-B}$ are connected to a gain calculator 40 which provides gain signal G which, at least partially, controls the operation of the time-variant filters $\mathbf{50}_{A-B}$. As in FIG. 1, the gain calculator 40 is connected to the power estimator 10 for using the statistical estimates M,MF to calculate a gain G to be supplied to the filters.

In the implementation of FIG. 3 the signal from a first microphone 121 is passed to a first forward beamformer $\mathbf{31}_A$ generating a first beamformed signal which is passed to a first time-variant filter $\mathbf{50}_A$. The signal from a second microphone 122 is passed to a second forward beamformer $\mathbf{31}_B$ generating a second beamformed signal which is transferred to a second time-variant filter $\mathbf{50}_B$. The functionality of the time-variant filters $\mathbf{50}_A$,$\mathbf{50}_B$ and the corresponding forward beamformers $\mathbf{31}_A$,$\mathbf{31}_B$ may in practice be merged.

As in FIGS. 1 and 2 a gain calculator 50 is connected to a power estimator 10. The power estimator 10 is connected to both microphones 121,122 and performs the same function as in the examples of FIGS. 1 and 2 explained above. The output from the gain calculator 50 is split between two paths, a first path including a first multiplier X1 which is arranged to multiply the output of the gain calculator 50 with an output from a first beamformer filter gain unit 71, and a second path including a second multiplier X2 which is arranged to multiply the output from a second beamformer filter gain unit 72 with the output of gain calculator 50. The multipliers X1 and X2 operates as to multiply the frequency domain representation of the output of the gain calculator 50 with the frequency domain representation of the outputs of the first and second filter gain units 71, 72, respectively. The output of the first multiplier X1 is coupled to the first time variant-filter 50A, and the output of the second multiplier X2 is coupled to the second time-variant filter 50B. Finally, an output of the first time variant filter 50A and an output from the second time variant filter 50B are added in a summation device+whose output is coupled to the audio processor 20.

The optional forward beamformer 30 or $\mathbf{31}_A$,$\mathbf{31}_B$ may be implemented as an adaptive beamformer. The adaptive beamformer aims at reducing noise from disturbing noise sources maximally possible with linear beamforming. The adaptive beamformer works by moving the directional zero(s) of its directivity.

A two-microphone beamformer only implements a single directional zero therefore a two-microphone works best when only a single disturbance is present in the sound field. The two-microphone adaptive beamformer may track the location of the single disturbance ideally placing its directional zero at the location of the disturbance.

Figure 4:
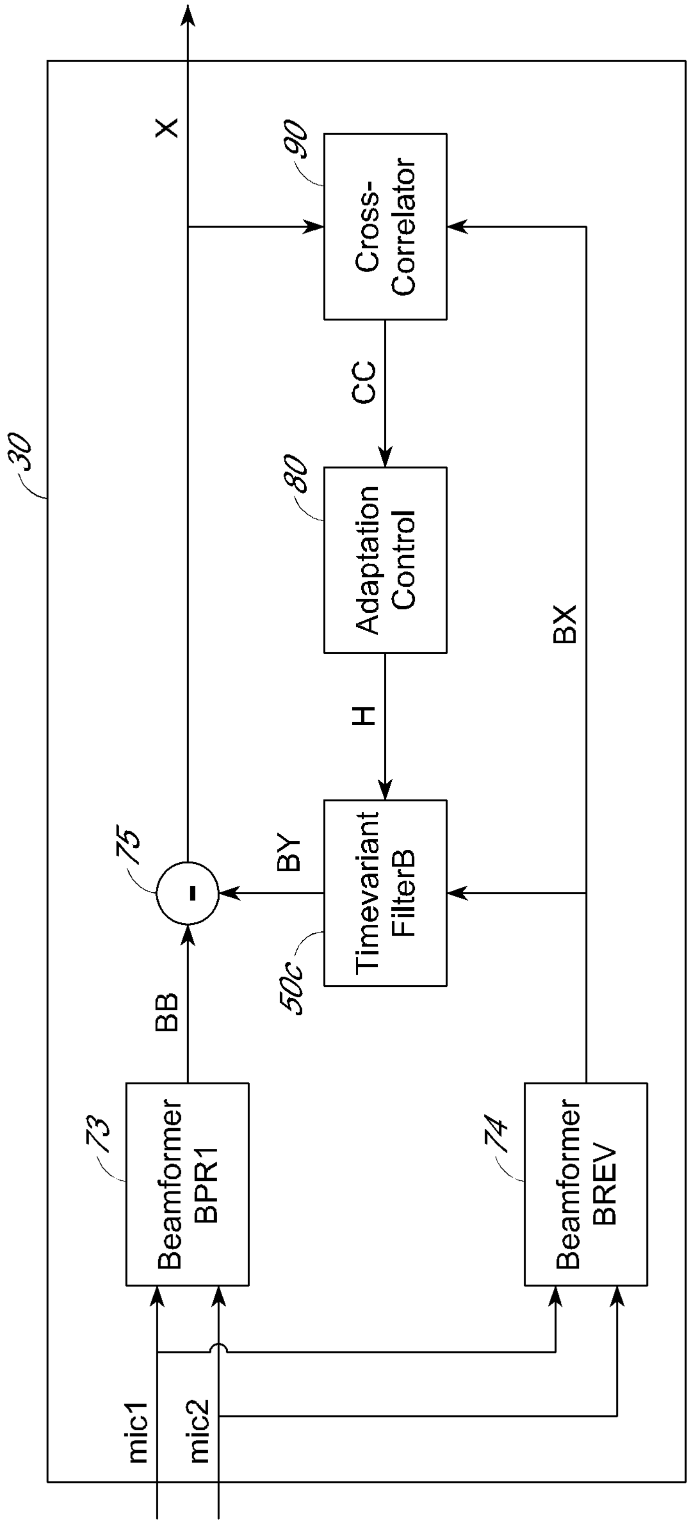
FIG. 4 illustrates an example embodiment of an adaptive beamformer optionally used in embodiments of the invention.

FIG. 4 shows a possible embodiment of an adaptive beamformer as may be included as the optional forward beamformer 30, 31 in embodiments of the invention. Each of the signals mic1,mic2 from the microphones are coupled to each of the beamformers 73,74.

The beamformer BPRI 73 on FIG. 4 is optional, it controls the primary directivity of the beamformer which is the directivity that the adaptive beamformer will settle to with no disturbing noise sources. The beamformer BREV 74 is designed such that its directional characteristic exhibit a zero at the target direction for the incoming target audio signal. Therefore the signal BX will not contain components from the target audio signal. The time-variant filter $\mathbf{50}_c$ filters the signal BX from the beamformer BREV 74 according to a response H provided by an adaption control 80. An output BY of the time-variant filter $\mathbf{50}_c$ and an output BB of the beamformer BPRI 73 is subtracted in a subractor 75 for generating the adaptive beamformer output signal X. The adaption control of the adaptive beamformer follows from a crosscorrelation 90 of the output signal X and the output BX of the beamformer BREV 74. The cross correlator 90 is arranged so as to generate an output CC coupled to an adaptation control block 80 which generates filter response H to the time-variant filter $\mathbf{50}_c$. The cross correlator 90 takes as inputs X and BX, the adaptive beamformer output and the output of the beamformer BREV, respectively.

Through the cross-correlator 90 and the adaption control 80 the control signal H is adapted such that the correlation between X and BX is at a minimum. The adaptation is preferably performed in the frequency domain. Equation (1) below shows a possible implementation of the adaptation process. In equation (1) $T_{ad}$ is the update interval, $\mu_{ad}$ is a constant controlling the adaptation speed, CC is a statistical estimate of the crosscorrelation of X and BX and PBX is a statistical estimate of the power of BX.

$$H(f,t)=H(f,t-T_{ad})+\mu_{ad}\cdot\frac{CC(f,t)}{PBX(f,t)} \tag{1}$$

The resulting effect is that the adaptive beamformer acts as to filter away components that are common to the BB and BX signals as well as any components that are found only in the BX signal. As the beamformer BREV 74 is designed such that the target signal is not present in the BX the result will be that adaptive beamformer filters disturbing noise optimally while it does not alter the target signal input content.

The Optimal Gain

The part of the system of FIG. 1 that performs the actual reduction of the noise content is the time-variant filter 50. In the frequency domain the function of the time-variant filter may be described by equation (2) below. Equation (2) reflects the fact that the frequency transformation to be used for the system analysis must be given a limited window length in the time domain in order to process speech and music signals which have spectral contents that change reasonably fast. Thus the signal spectra will be functions of time as well as of frequency as will the transfer response G of the time-variant filter 50. The frequency transformation used for the analysis may be a short-time DFT, a wavelet transform or similar.

$$Y(f,t)=G(f,t)\cdot X(f,t) \tag{2}$$

For the description of the optimal gain it will first be assumed that the optional forward beamformer 30 is not present. Later the implications of the presence of the optional forward beamformer 30 will be discussed. When the optional forward beamformer 30 is not present the signal x will be as in equation (3) below:

$$X(f,t)=\mathrm{MIC1}(f,t) \tag{3}$$

A model for the input to the system is then considered where the input consists of a mixture of wanted signal components and unwanted signal components. The sum of the wanted signal components will be denoted s in the time domain and S in the frequency domain and called target signal or simply signal. The sum of the unwanted signal components will be denoted n or N and called noise signal or simply noise. The input can then be modelled as the sum of target signal and noise components as follows.

$$\mathrm{MIC1}(f,t)=S(f,t)+N(f,t) \tag{4}$$

The ideal output of the time-variant filter 50 would be the following.

$$Y_{ideal}(f,t)=S(f,t) \tag{5}$$

With a single microphone input to the time-variant filter 50 it is not physically possible to achieve this by filtering only. The gain $G_{opt}$ shown in equation (6) is the best possible causal gain.

$$G_{opt}(f,t)=\sqrt{\frac{|S(f,t)|^2}{|S(f,t)|^2+|N(f,t)|^2}}=\sqrt{\frac{P_S(f,t)}{P_S(f,t)+P_N(f,t)}} \tag{6}$$

When $G_{opt}$ is applied the power spectrum of Y will equal that of the wanted signal S.

$$\begin{cases} Y_{opt}(f,t)=X(f,t)\cdot G_{opt}(f,t) \\ \quad =MIC1(f,t)\cdot G_{opt}(f,t) \text{ if } x=mic1 \end{cases} \tag{7}$$

$$\begin{cases} P_{Y\,opt}(f,t)=|X(f,t)\cdot G_{opt}(f,t)|^2 \\ \quad =P_X(f,t)\cdot\dfrac{P_S(f,t)}{P_{MIC1}(f,t)} \\ \quad =P_S(f,t) \text{ if } x=mic1 \end{cases} \tag{8}$$

$P_S$, $P_N$, $P_X$ and $P_{MIC1}$ denotes the powers of S, N, X and MIC1 respectively. In practice there would of course exist discrepancies due to block size and overlap and various system delays. Nevertheless if a reasonably accurate estimate $G_{opt}$ would be applied the power spectrum of y would closely approximate that of s. In terms of listening experience this would mean that for good signal to noise ratios ($P_S$>>$P_N$) the difference between s and y would be a minor phase distortion. In terms of speech communication the difference would hardly be perceptible. As the signal to noise ratio degrades and the signal and noise powers become comparable the amount of phase distortion will increase. But even when the phase distortion may indeed be perceptible the speech quality can still be sufficient to ensure intelligibility. In practice it will be desirable to replace the optimal gain of (6) above with that of the equation (9) below.

$$G_{opt}(f,t)=\sqrt{\frac{A_S^2\cdot P_S(f,t)+A_N^2\cdot P_N(f,t)}{P_S(f,t)+P_N(f,t)}}=\sqrt{\frac{A_S^2\cdot P_S(f,t)+A_N^2\cdot P_N(f,t)}{P_{MIC1}(f,t)}} \tag{9}$$

This will render an optimal y power as in equation 10 below.

$$P_{Y\,opt}(f,t)=A_S^2\cdot P_S(f,t)+A_N^2\cdot P_N(f,t) \text{ if } x=\mathrm{mic1} \tag{10}$$

This corresponds to the application of the gain $A_S$ to the wanted signal and the gain $A_N$ to the noise. In an even more general formulation of the optimal gain, see equation (11) below, account is taken for the situation where the input can be modelled as the sum of I different sources $S_i$ with powers $P_i$.

$$G_{opt}(f,t)=\sqrt{\frac{\sum_{i=1}^{I}A_i^2\cdot P_i(f,t)}{\sum_{i=1}^{I}P_i(f,t)}}=\sqrt{\frac{\sum_{i=1}^{I}A_i^2\cdot P_i(f,t)}{P_{MIC1}(f,t)}} \tag{11}$$

This will lead will lead to the following power of y:

$$P_{Y\,opt}(f,t)=\sum_{i=1}^{I}A_i^2\cdot P_i(f,t) \tag{12}$$

$$\text{if } x=mic1$$

$A_i$, $A_S$ and $A_N$ in the equations above could of course also be chosen as functions of frequency and/or time.

If the case is now considered where the optional forward beamformer 30 is present in the device then the option exists to keep the definition of the optimal gain as of equation (9) or (11) above. In this case the amount of noise reduction of the total system will be the sum of that of the forward beamformer 30 plus that of the time-variant filter 50. That this is the case can be appreciated when comparing the implementations of FIGS. 1 and 2. In the latter of the two otherwise equivalent embodiments of the device according to the invention the time-variant filter 50 has been inserted before the beamformer 30 such that it is each of the microphone outputs mic1,mic2 that are filtered with the frequency response G. It is easily understood that the two implementations must yield identical G responses and thus identical signal y and thus also identical system outputs. With this implementation in mind it is recognized that the noise reduction of the forward beamformer 30 must be additive to that of the time-variant filter 50.

It is also possible to modify the definition of the optimal gain to that of eqs. (13) or (14) below. If one of these is used then the total noise reduction of the system is that given by the definition itself. Thus, given the use of the optional forward beamformer 30, the use of definitions (13) or (14) possibly implies a lower total amount of noise reduction. But on the other hand the sound quality is possibly improved as the time-variant filter 50 need not work as aggressively as when the definitions of eqs. (9) or (11) are used.

$$G_{opt}(f,t)=\sqrt{\frac{A_S^2\cdot P_S(f,t)+A_N^2\cdot P_N(f,t)}{P_X(f,t)}} \tag{13}$$

$$G_{opt}(f,t)=\sqrt{\frac{\sum_{i=1}^{I}A_i^2\cdot P_i(f,t)}{P_X(f,t)}} \tag{14}$$

Note that when the optional forward beamformer 30 is used then eqs. (10) and (12) only hold when the definitions of eqs. (13) or (14), respectively, are used.

Identification of Signals

The new invention utilizes spatial information of the acoustic field in order to divide the incoming signal in I classes or groups which could be for example the two classes; target signal and noise. The acoustic field will consist of a number, possibly an infinity, of waves. Each of these waves will be characterized by a direction of propagation, amplitude, shape and damping. For the purpose of this document it will be assumed that the physical dimensions of the microphone assembly are small. In this case a simplification can be made in which a numerical gradient parameter summarizes the combined effects of wave shape and damping.

Given this simplification the acoustic field as seen by the acoustic system can be assigned a power density function defined in a reference point. The position of the acoustic inlet of microphone 121 could be chosen as a reference point. In spherical coordinates the power density will be denoted E(f, t,ψ,θ,γ). ψ and θ are the angular coordinates and γ is the numerical gradient parameter. γ=0 indicates a plane wave, γ<0 indicates a "normal spherical wave", i.e. one in which the sound pressure decrease along the path of propagation and γ>0indicates a concentrating wave, i.e. one in which the sound pressure increase along the path of propagation. The relation between the power density and the power of the sound pressure at the position of microphone 121 is given by equation (15) below. E{ } denotes expectation not to be confused with E( )—the energy density.

$$E\{P_{MIC1}(f,t)\}=\int_{-\infty}^{\infty}\int_0^{\pi}\int_0^{2\cdot\pi}E(f,t,\psi,\theta,\gamma)\,d\psi\,d\theta\,d\gamma \tag{15}$$

For the simple physical implementation using only two microphones 121,122 observations made by the system must be symmetric around the axis passing through the position of the acoustic inlet of the two microphones 121,122, the system is not able "to see" the angle ψ. Therefore a simplified power density Ed(f,t,θ, γ) may be defined by equation (16) below.

$$E\{P_{MIC1}(f,t)\}=\int_{-\infty}^{\infty}\int_0^{\pi}E_d(f,t,\theta,\gamma)\,d\theta\,d\gamma \tag{16}$$

$E_d$ relates to E as in equation (17) below.

$$E_d(f,t,\theta,\gamma)=\int_0^{2\cdot\pi}E(f,t,\psi,\theta,\gamma)\,d\psi \tag{17}$$

If it is assumed that the system will only be subject to plane acoustic waves (far-field waves) the power density may be further simplified in the general and the two-microphone case as shown by eqs. (18) and (19) below. Note however that the physics of the acoustic system itself may disturb plane waves to such a degree that they cannot be considered plane in the vicinity of the system. Note also that while the two-microphone implementation will never be able to sense the angle ψ it will still be able to sense the gradient along the axis of the two-microphone inlets.

$$E_0(f,t,\psi,\theta,\gamma)=E(f,t,\psi,\theta,0) \tag{18}$$

$$E\{P_{MIC1\_0}(f,t)\}=\int_0^{\pi}\int_0^{2\pi}E_0(f,t,\psi,\theta)\,d\psi\,d\theta \tag{19}$$

$$E_{d\_0}(f,t,\theta)=\int_0^{2\pi}E(f,t,\psi,\theta,0)\,d\psi \tag{20}$$

$$E\{P_{MIC1\_0}(f,t)\}=\int_0^{\pi}E_{d0}(f,t,\theta)\,d\theta \tag{21}$$

$P_{MIC1\_0}$ being the total power of x that is caused by plane acoustic waves solely.

More useful definitions of $E_0$ and $E_{d0}$ would be as given by eqs. (22) and (23) below, ϵ being a small constant allowing for some curvature of the (quasi-)plane wave.

$$E_0(f,t,\psi,\theta,\gamma)=\int_{-\varepsilon}^{+\varepsilon}E(f,t,\psi,\theta,\gamma)\,d\gamma \tag{22}$$

$$E_{d\_0}(f,t,\theta)=\int_{-\varepsilon}^{+\varepsilon}\int_0^{2\pi}E(f,t,\psi,\gamma)\,d\psi\,d\gamma \tag{23}$$

Having defined the power densities it is now possible to define or identify the total powers of the input signal source classes or groups. To do this the space is divided into regions bounded by [γmax, γmin], [θmax, θmin] and [ψmax, ψmin]. The space is divided in non-overlapping regions that unite to the full space. Each region is assigned to a single source class or group, the number of source classes or groups being I. Equation (24) below shows the general definition.

$$E\{P_i(f,t)\}=\begin{cases}\int_{\gamma min_i}^{\gamma max_i}\int_{\theta min_i}^{\theta max_i}\int_{\psi min_i}^{\psi max_i}E(f,t,\psi,\theta,\gamma)\,d\psi\,d\theta\,d\gamma & \text{for } 1\le i\le I-1\\ E\{P_M(f_l,t)\}_C-\sum_{i=1}^{I-1}E\{P_i(f,t)\} & \text{for } i=I\end{cases} \tag{24}$$

The general source class power definition may appear as fairly abstract. The concept will now be illustrated by examples.

Consider a hearing aid application where it is only desirable to estimate target signal and noise powers. In order to define those it is necessary to define a target direction and align that in the (ψ,θ,γ) space. For a hearing aid the target direction would be that of sounds impinging from the normal viewing direction of the user. This target direction is most sensibly assigned ψ=0 and θ=0. With these assumptions the signal and noise powers can be defined as in the following. $\theta_c$ is the cut-off angle, i.e. signals impinging from within +/−$\theta_c$ is treated as wanted signal, the rest is treated as noise.

$$E\{P_S(f,t)\} = \int_{-\infty}^{\infty}\int_0^{\theta_c}\int_0^{2\pi} E(f,t,\psi,\theta,\gamma)d\psi d\theta d\gamma \tag{25}$$

$$E\{P_N(f,t)\} = E\{P_{MIC1}(f,t)\} - E\{P_S(f,t)\} \tag{26}$$

Of course the "order of definition" could have been reversed as shown in the following.

$$E\{P_N(f,t)\} = \int_{-\infty}^{\infty}\int_{\theta_c}^{\pi}\int_0^{2\pi} E(f,t,\psi,\theta,\gamma)d\psi d\theta d\gamma \tag{27}$$

$$E\{P_S(f,t)\} = E\{P_{MIC1}(f,t)\} - E\{P_N(f,t)\} \tag{28}$$

Consider next the application of a headset or a close-talking microphone device. For this application the target direction is best chosen as the direction from mouth to device, this direction is assigned $\psi=0$ and $\theta=0$. For this application the signal can again be divided into 2 components, wanted signal and noise.

$$E\{P_S(f,t)\} = \int_{\gamma 0}^{\gamma 1}\int_0^{\theta_c}\int_0^{2\pi} E(f,t,\psi,\theta,\gamma)d\psi d\theta d\gamma \tag{29}$$

$$E\{P_N(f,t)\} = E\{P_{MIC1}(f,t)\} - E\{P_S(f,t)\} \tag{30}$$

$$\gamma 0 < \gamma 1 < 0 \tag{31}$$

In practice $\gamma 0$ could be set to −infinity.

In yet another example a hearing aid is considered. With this hearing aid application it is the objective to divide the input in 3 source classes: S1 with power P1 is the wanted "external" signal, S2 with power P2 is the users own voice while S3 with power P3 is the unwanted noise.

$$E\{P_1(f,t)\} = \int_{\gamma 1}^{\infty}\int_0^{\theta_{c0}}\int_0^{2\pi} E(f,t,\psi,\theta,\gamma)d\psi d\theta d\gamma \tag{32}$$

$$E\{P_2(f,t)\} = \int_{-\infty}^{\gamma 0}\int_0^{\theta_{c1}}\int_0^{2\pi} E(f,t,\psi,\theta,\gamma)d\psi d\theta d\gamma \tag{33}$$

$$E\{P_3(f,t)\} = E\{P_{MIC1}(f,t)\} - E\{P_1(f,t)\} - E\{P_2(f,t)\} \tag{34}$$

In general the present invention is useful in several applications, in particular hearing aids, where it is favourable to know the power of the input signals divided into the classes or groups: a) near field signals from within a certain beam, b) far field signals from within a certain beam and c) the rest. The equations (32) to (34) above apply to such cases.

Power Estimators

Figure 5:
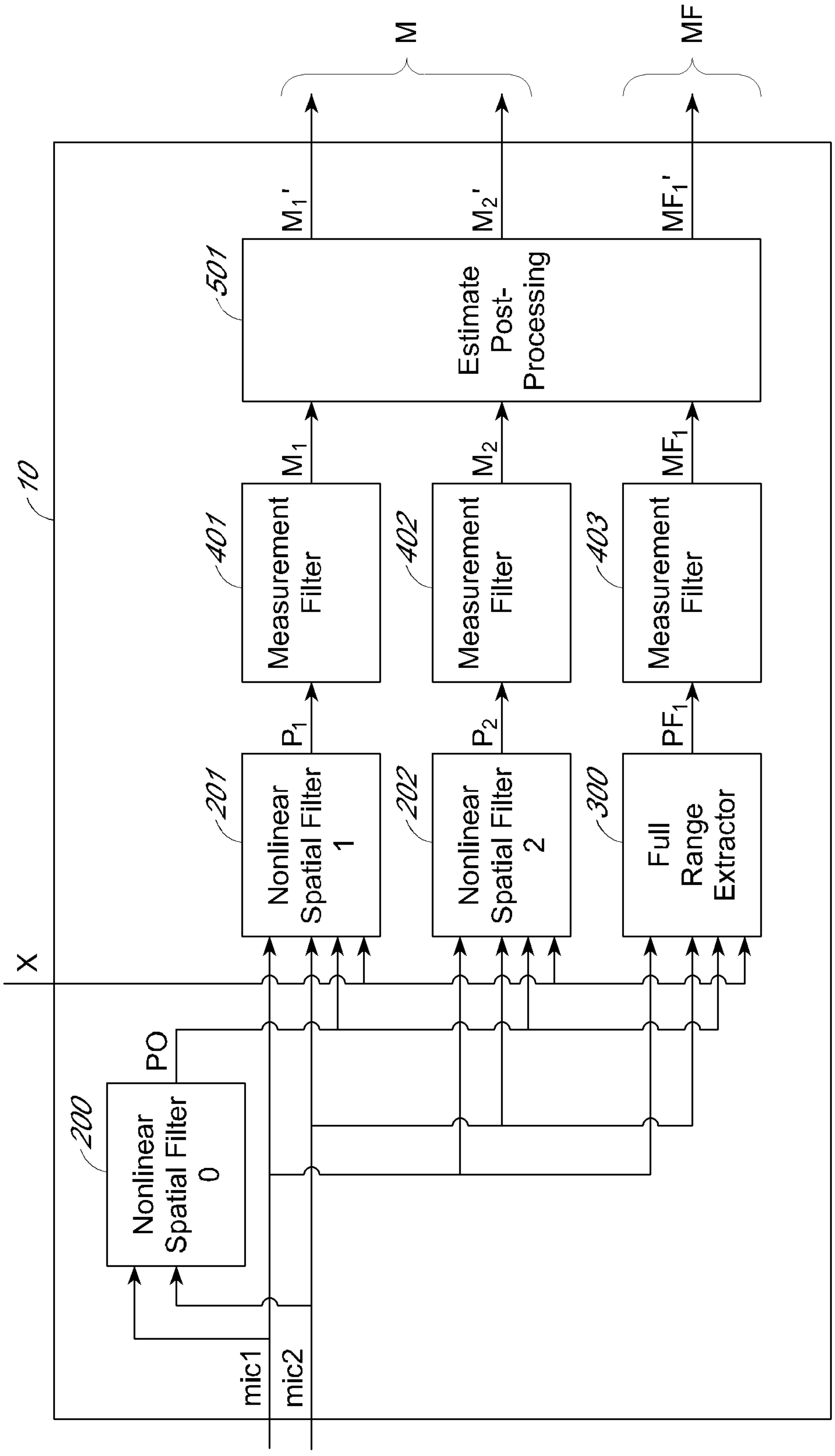
FIG. 5 shows an example design of the power estimator of the signal processing devices illustrated in FIGS. 1-3.

FIG. 5 shows an example implementation of the power estimators 10 used in the signal processing device and method according to the invention and illustrated on FIGS. 1 to 3. In the particular implementation of FIG. 5 the powers $P_1$ and $P_2$ are derived by nonlinear spatial filters 201 and 202 based on the inputs mic1, mic2 from the microphones. Measurement filters 401 and 402 compute statistical estimates of the corresponding power signal outputs $P_1$, $P_2$, respectively, from the nonlinear spatial filters 201 and 202. The measurement filters 401 and 402 will typically be realized in the form of low pass filters, they could for example average an input signal over a fixed period. A full-range extractor 300 extracts the total power $PF_1$ of the input signals. The measurement filter 403, equivalent or similar to 401 and 402, computes the statistical estimate of the total power. An optional estimate post-processing block 501 corrects the power estimates for effects caused by non-ideal stop-band or pass-band characteristics of the spatial filters 201-202 and performs additional post-processing.

The output X of the forward beamformer 30 is shown in the example embodiment on FIG. 5 to be connected as an input to the nonlinear spatial filters 201-202 and to the full-range extractor 300. This connection is optional.

FIG. 5 shows an optional spatial filter 200, using the microphone signals mic1,mic2 as inputs, and whose output P0 is connected to the nonlinear spatial filters 201-202 and the to the full range extractor 300. When present the optional spatial filter 200 serves the purpose of reducing the influence on the gain G of an input signal component that is effectively attenuated in the forward path by the forward beamformer 30. As the optional spatial filter 200 could be nonlinear its design must comply to less strict rules than the design of the forward beamformer.

FIG. 5 describes the signals $M_i$ and $MF_l$ as representing estimates of power or variance, also known as $2^{nd}$ order moment. In general the estimates M could be of any statistical measure of the energy of the signals, in particular $1^{st}$ to $4^{th}$ order moments. Moreover, FIG. 5 includes three paths $M_i$ and one path $M_F$. In general any number I>=1 of $M_i$ and any number L>=0 of $MF_l$ signals may be estimated. Two different estimates $M_i$ may estimate statistical properties of different source classes or groups or they may estimate different statistical properties of the same source class or group. The $MF_l$ signals may all be estimated from the same microphone output or they may be estimates of different microphone outputs.

Nonlinear Spatial Filter and Measurement Filter

The nonlinear spatial filters 201,202 serve the purpose of generating the power signals Pi of equation (24). The nonlinear spatial filters 201,202 could alternatively be named nonlinear beamformers. Equation (24) can be rewritten as equation (25) below. E{ } denotes expectation (not to confuse with the power density E( )).

$$\begin{cases} E\{P_i(f,t)\} = \int_{-\infty}^{\infty}\int_0^{\pi}\int_0^{2\pi} BI_i(f,t,\psi,\theta,\gamma)E(f,t,\psi,\theta,\gamma)d\psi d\theta d\gamma \text{ for } 1 \le i \le I-1 \\ E\{P_I(f,t)\} = E\{P_{MIC1}(f,t)\} - \sum_{i=1}^{I-1} E\{P_i(f,t)\} \\ BI_i = \begin{cases} 1 & \text{for } (\gamma\min_i < \gamma < \gamma\max_i) \wedge (\theta\min_i < \theta < \theta\max_i) \wedge (\psi\min_i < \psi < \psi\max_i) \\ 0 & \text{otherwise} \end{cases} \end{cases} \tag{35}$$

Thus, ideal spatial filters applied to the spatial power density would allow the integration that yields the individual $P_i$, to run over the "full space" in stead of over a region. The power density E is an abstract concept; it is not physically present as a signal in the system. But the microphone signals are present and it is possible to apply beamforming to them.

Figure 6:
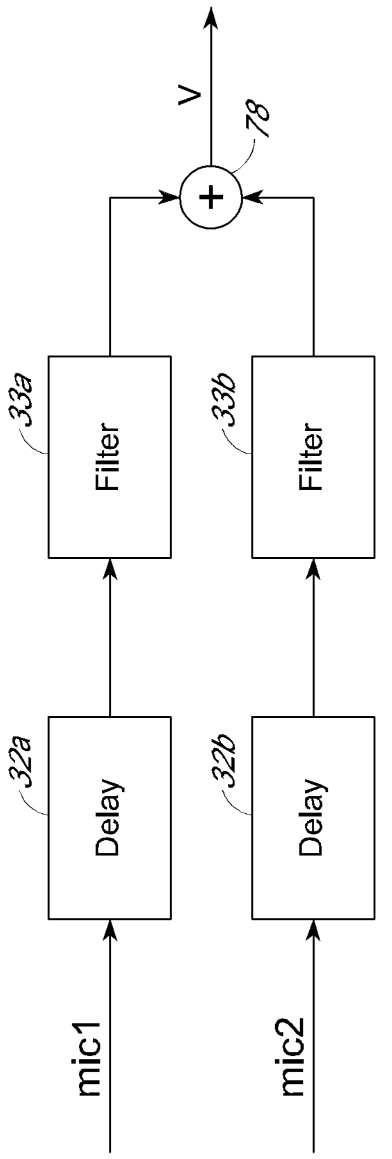
FIG. 6 shows a generic implementation of a linear beamformer used in the various aspects of the invention.

FIG. 6 shows a generic implementation of a linear beamformer used in various embodiments of the signal processing device and method according to the invention. The microphone signals mic1,mic2 are passed through optional delay blocks $\mathbf{32}_A$,$\mathbf{32}_B$, respectively, before being passed to the filters $\mathbf{33}_A$,$\mathbf{33}_B$, respectively. A summing device 78 sums the outputs from the filters 33 in order to provide an output V. The delay blocks 32 may implement integer sample delay but they could also be of multirate implementation in order to implement fractional sample delays. The filters $\mathbf{33}_A$,$\mathbf{33}_B$ provide gain and approximated delay and also perform any frequency response shaping needed. Beamformers come in many shapes and forms, the realization shown is only an example. The shown beamformer is a two-microphone implementation. The number of microphones supported may be increased by adding additional delay and filter branches, as appropriate.

The signal density e (e being a frequency domain variable, its time domain representation will not be used or analyzed in this document) of MIC1 can be introduced such that E is the magnitude squared of e as in equation (36) below.

$$E(f,t,\psi,\theta,\gamma)=|e(f,t,\psi,\theta,\gamma)|^2 \tag{36}$$

Using this density the beamformer output can be formulated as in equation (37) below.

$$V(f,t)=\int_{-\infty}^{\infty}\int_0^{\pi}\int_0^{2\pi}B(f,t,\psi,\theta,\gamma)\cdot e(f,t,\psi,\theta,\gamma)d\psi d\theta d\gamma \tag{37}$$

As the circuit of FIG. 5 utilizes non-linear signal processing the analysis of the beamformer output is more conveniently performed with a discrete signal model, as indicated by equation (38) below. With this model the sound field at the reference point is assumed to consist of K discrete waves $S_k$, the term $S_k$ will in the following denote both the wave and its value (sound pressure or equivalent voltage or digital value). The waves are characterized by the propagation parameters $\psi_k$, $\theta_k$ and $\gamma_k$ that in general are functions of frequency and time.

$$MIC1(f,t)=\sum_{k=1}^{K}S_k(f,t) \tag{38}$$

The general linear beamformer output can then be written as in equation (39) below.

$$V(f,t)=\sum_{k=1}^{K}S_k(f,t)\cdot B(f,t,\psi_k(f,t),\theta_k(f,t),\gamma_k(f,t)) \tag{39}$$

Having introduced the linear beamformer a possible expression for the output of the non-linear beamformers 201-202 of FIG. 5 can be given as in equation (40) below, where $V_{i,j}$ are the outputs of the individual linear beamformers. The functions $\chi$ and $\beta$ can be nonlinear functions, for example logarithmic or exponential function, raising to a power smaller than two, taking the absolute value etc. or a combination of such functions. The functions $\chi$ and $\beta$ could also contain linear elements. The functions $\chi$ and $\beta$ are distributed in equation (40) to allow for computational efficiency, they could be further distributed by defining sub-terms and functions of those within the product term $\Pi_j$.

$$P_i(f,t)=\chi\left(\prod_{j=1}^{J_i}\beta_{i,j}(V_{i,j}(f,t))\right) \tag{40}$$

Figure 7:
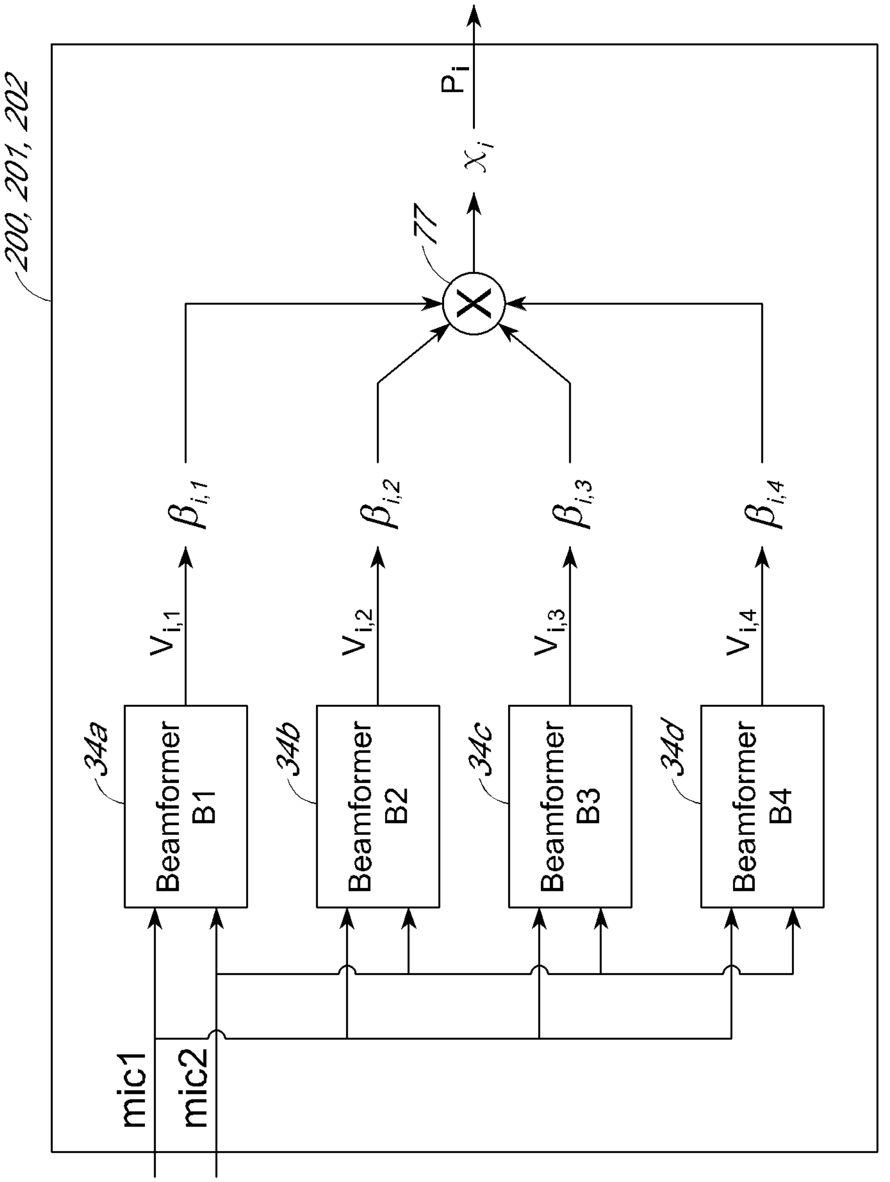
FIG. 7 shows an example of a non-linear spatial filter including four linear beamformers used in the various aspects of the invention.

FIG. 7 shows an example implementation of a nonlinear spatial filter including four linear beamformers $\mathbf{34}_{A\text{-}D}$, following equation (40) above strictly. In this example, the signals mic1,mic2 from the two microphones 121,122 are processed in parallel in the four linear beamformers $\mathbf{34}_{A\text{-}D}$. The four generated beamformed signals $V_{i,1}$-$V_{i,4}$ are passed through respective function blocks $\beta_{i,1}$-$\beta_{i,4}$. The signal multiplier device 77 multiplies, in frequency bands, the beamformed signals $V_{i,j}$ generated on the basis of said microphone signals. The output of the multiplier 77 is processed in function block $\chi$ for generating an output $P_i$ which could be either of the signals P1 or P2 of FIG. 5. The power estimator 10 may then process the result of the multiplication in order to generate, in frequency bands, the statistical estimate $M_i$ of the energy of a part of an incident sound field. In some embodiments the power estimator 10 may be adapted to transform the statistical estimate to a lower frequency resolution. The multiplier device may be designed to operate in the logarithmic domain in which case the $\beta$ and $\chi$ may contain provisions for logarithmic conversions.

As an example, the non-linear element $\beta_{i,1}$ could comprise an absolute value extracting device that estimates the absolute value of the beamformed signal $V_{i,1}$. Thus the power estimator 10 would analyze the result of said absolute value extraction in order to produce, in frequency bands, a statistical estimate of the energy of a part of an incident sound field.

Figure 8:
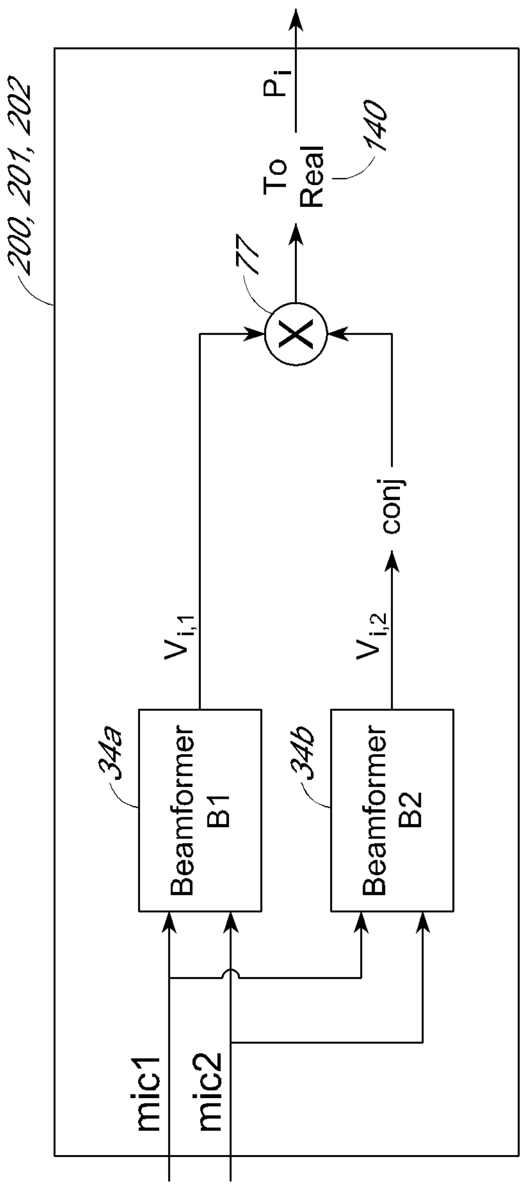
FIG. 8 shows an example of a non-linear spatial filter including two linear beamformers for use in the various aspects of the invention.
Figure 9:
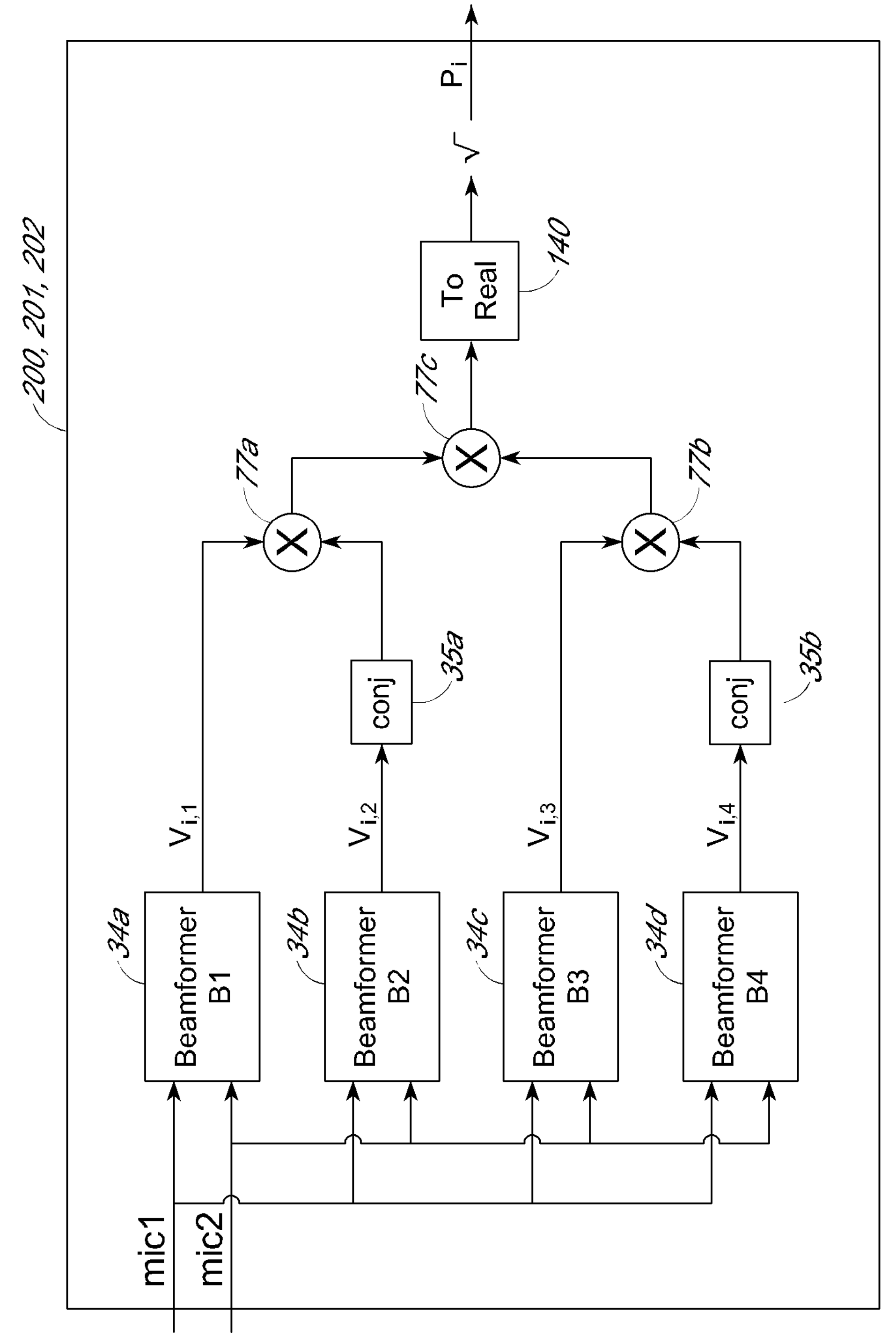
FIG. 9 shows another example of a non-linear spatial filter including four linear beamformers in a quad-arrangement with a multiplication function for use in the various aspects of the invention.

The example implementations of FIGS. 8 and 9 are included to explain the spatial filters further. The nonlinear spatial filter of FIG. 8 may be used in various embodiment of the signal processing device and methods according to the invention and includes a first $\mathbf{34}_A$ and a second beamformer $\mathbf{34}_B$, each connected so as to process the microphone signals mic1,mic2. The output $V_{i,2}$ of the second beamformer $\mathbf{34}_B$ is complex conjugated before it is multiplied 77 with the output $V_{i,1}$ of the first beamformer $\mathbf{34}_A$. Either the magnitude or the real value of the product is output as $P_i$. The implementation of FIG. 9 is quite similar but in this example four linear beamformers $\mathbf{34}_{A\text{-}D}$ are used, the outputs of two of these $V_{i,2}$,$V_{i,4}$ are complex conjugated in $\mathbf{35}_A$,$\mathbf{35}_B$ before multiplication with outputs $V_{i,1}$,$V_{i,3}$, respectively, of two of the other beamformers in two multipliers $\mathbf{77}_A$,$\mathbf{77}_B$. Then the outputs of the said two multipliers $\mathbf{77}_A$,$\mathbf{77}_B$ are multiplied in a third multiplier $\mathbf{77}_c$. The real value of the output of the third multiplier is extracted 140 and the square root $\sqrt{}$ is taken of this real-valued signal in order to be able to use the $P_i$ output as the base of a variance ($2^{nd}$ order moment) estimation.

Figure 10:
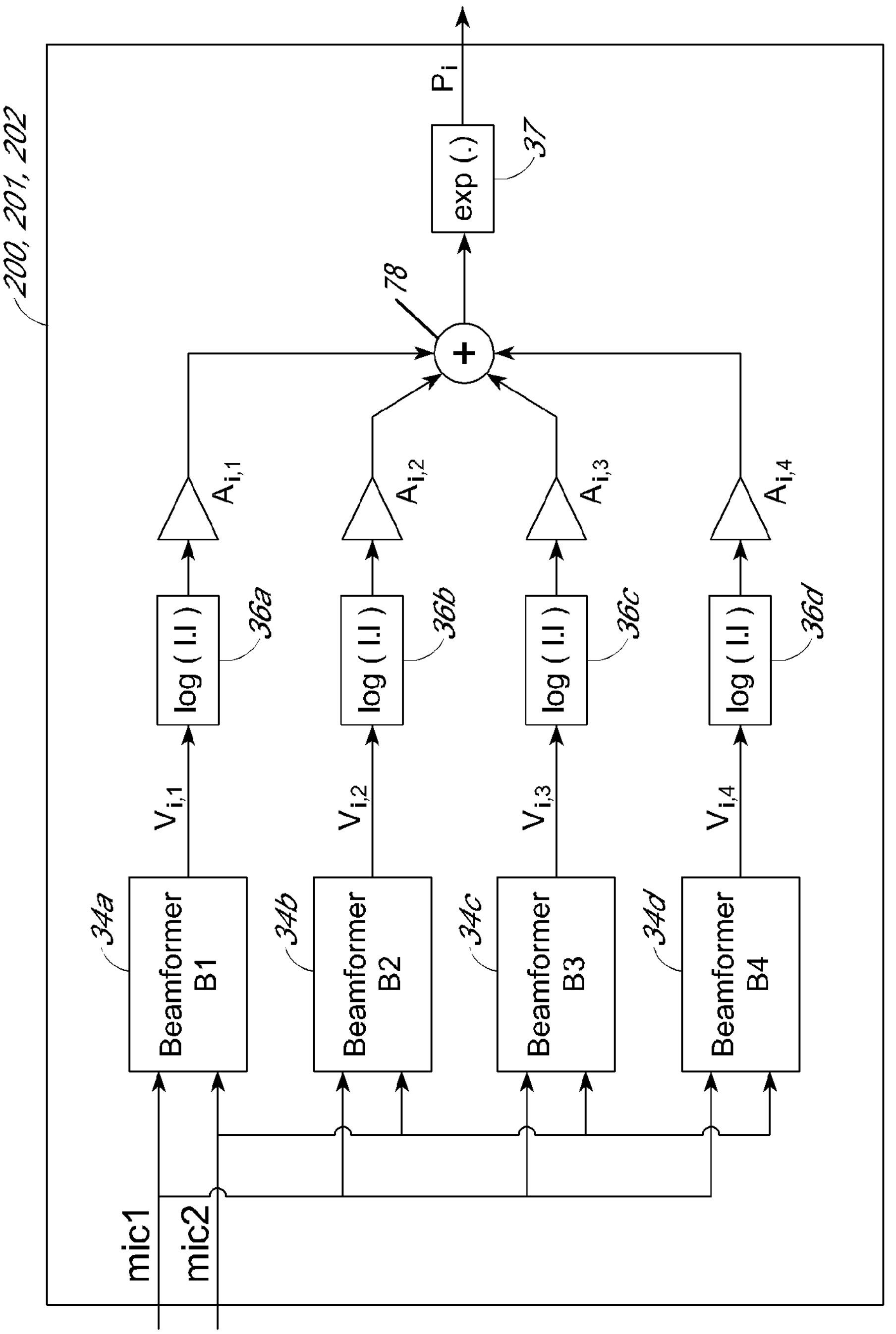
FIG. 10 shows another example of a non-linear filter including four linear beamformers in a quad arrangement and with their outputs converted to the logarithmic domain.

Yet a further possible implementation of the nonlinear spatial filter is shown on FIG. 10, where four linear beamformers $\mathbf{34}_{A\text{-}D}$ are arranged to process the microphone signals mic1,mic2 in parallel. The output signals $V_{i,1}$-$V_{i,4}$ of the beamformers are converted $\mathbf{36}_{A\text{-}D}$ to the logarithmic domain. Following individual amplification $A_{i,1\text{-}4}$ the beamformed, converted signals are summed in a summation device 78. In this way at least a second beamformer $\mathbf{34}_B$ processes the signals from the microphones 121, 122 and provides a second beamformed signal.

In the implementation shown on FIG. 10 the magnitude of the outputs of the linear beamformers $\mathbf{34}_{A\text{-}D}$ are converted to the log domain $\mathbf{36}_{A\text{-}D}$. Being in the log domain the $\pi$ operation of equation (40) is replaced by a summation. The summed log domain signal is divided by a number which is the half of the number of linear beamformer and converted back to the linear domain by an exponential function 37. With this processing the $P_i$ output is suitable for the estimation of a second order moment. Equation (41) below shows a generic formulation of embodiments that follow this principle. The pair log( )-exp( ) could be of any logarithm base, the base 2 logarithm is one choice. The sum $Ord_i$ of the $A_{i,j}$ constants control the order of the statistical estimate $M_i$ that will result from lowpassfiltering $P_i$.

$$P_i(f,t) = \exp\left(\sum_{j=1}^{J_i} A_{i,j}\cdot\log(V_{i,j}(f,t))\right) \tag{41}$$

$$Ord_i = \sum_{j=1}^{J_i} A_{i,j} \tag{42}$$

An analysis of the outputs $P_i$ of the implementation of FIG. 8 can be started by considering the output when the sound field only contains a single wave $S_1$. This would be as in equation (43):

$$P_i(f,t)=|S_1(f,t)\cdot B_{i,1}(\psi_1,\theta_1,\gamma_1)\cdot(S_1(f,t)\cdot B_{i,2}(\psi_1,\theta_1,\gamma_1))^*| \tag{43}$$

This can be rewritten as in equation (44):

$$P_i(f,t)=|S_1^2(f,t)|\cdot|B_{i,1}(\psi_1,\theta_1,\gamma_1)B_{i,2}(\psi_1,\theta_1,\gamma_1)| \tag{44}$$

The result is the product of the power of $S_1$ and a nonlinear beamformer gain. If another wave $S_2$ is added to the analysis the results will be as in equation (45) below.

$$P_i(f,t) = \left|\begin{pmatrix} S_1(f,t)\cdot B_{i,1}(\psi_1,\theta_1,\gamma_1) + \\ S_2(f,t)\cdot B_{i,1}(\psi_2,\theta_2,\gamma_2)\end{pmatrix}\cdot \begin{pmatrix} S_1(f,t)\cdot B_{i,2}(\psi_1,\theta_1,\gamma_1) + \\ S_2(f,t)\cdot B_{i,2}(\psi_2,\theta_2,\gamma_2)\end{pmatrix}^*\right| \tag{45}$$

If it is assumed that $S_1$ and $S_2$ are uncorrelated the mixing terms (involving S1 times S2) of $P_i$ will be attenuated by the measurement filter 401-402 of FIG. 5 such that the $M_i$ output approximately will be the sum of estimates of the second order moments of the waves $S_1$ and $S_2$, as given in equation (46) below.

$$M_i(f,t) \approx \hat{mom}_{S1}^2(f,t)\cdot|B_{i,1}(\psi_1,\theta_1,\gamma_1)B_{i,2}(\psi_1,\theta_1,\gamma_1)| + \hat{mom}_{S2}^2(f,t)\cdot|B_{i,1}(\psi_2,\theta_2,\gamma_2)B_{i,2}(\psi_2,\theta_2,\gamma_2)| \tag{46}$$

If further waves are added to the analysis it will be seen that, provided the waves are mutually uncorrelated and that the measurement filters average over a sufficiently long period, the mixing terms will be attenuated in the $M_i$ output such that the output will be sum of estimates of moments of the individual waves as in equation (47) below.

$$M_i(f,t) \approx \sum_{k=1}^{K} \hat{mom}_{Sk}^2(f,t)\cdot|B_{i,1}(\psi_k,\theta_k,\gamma_k)B_{i,2}(\psi_k,\theta_k,\gamma_k)| \tag{47}$$

This leads to a general formulation of equation (48) below for the implementations where the functions β and χ are constructed for second order moment outputs.

$$M_i(f,t) \approx \sum_{k=1}^{K} \hat{mom}_{Sk}^2(f,t)\cdot\sqrt[\frac{J_i}{2}]{\left|\prod_{j=1}^{J_i} B_{i,j}(\psi_k,\theta_k,\gamma_k)\right|} \tag{48}$$

This can be extended to the expression of equation (49) below.

$$M_i(f,t) \approx \int_{-\infty}^{\infty}\int_0^{\pi}\int_0^{2\pi} \sqrt[\frac{J_i}{2}]{\prod_{j=1}^{J_i}|B_{i,j}(f,t,\psi,\theta,\gamma)|}\, E(f,t,\psi,\theta,\gamma)\,d\psi\,d\theta\,d\gamma \tag{49}$$

An "effective beamforming response" can be expressed as in equation (50) below. The effective response is shown converted to the form that it would have when computing a 1st order moment, for easy comparison with linear beamforming. It is seen that the effective response is the geometric mean of the responses of the linear beamformers of the nonlinear spatial filter implementation.

$$Beff_i(f,t,\psi,\theta,\gamma) = \sqrt[J_i]{\prod_{j=1}^{J_i}|B_{i,j}(f,t,\psi,\theta,\gamma)|} \tag{50}$$

Thus an effective beamforming response Beff can be tailored as the geometric mean of a set of linear beamformer responses. The design task can be compared to that of the task of designing a normal linear filter or that of designing a linear beamformer with a free number of microphones and free spacing. But the fact that Beff is the geometric mean of the component responses does impose a limit to the achievable stop-band attenuation.

Figure 11:
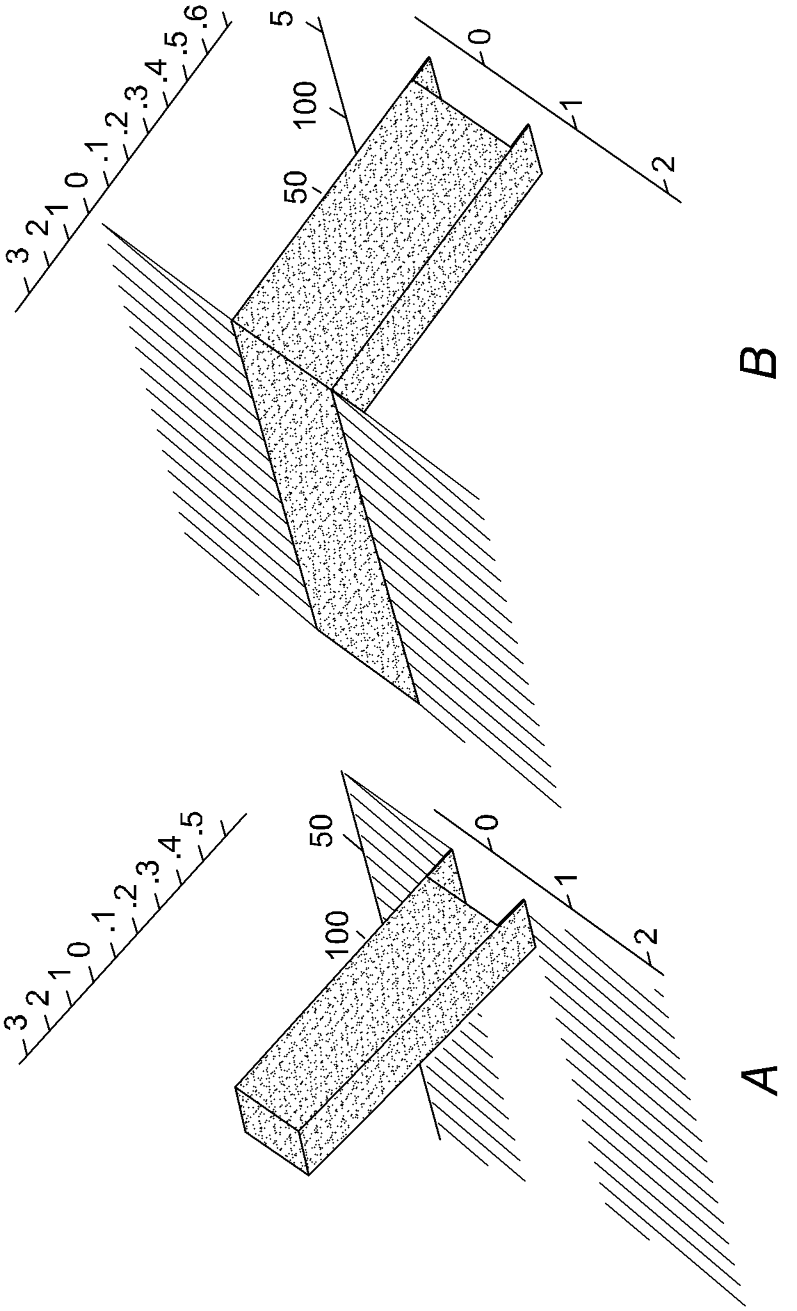
FIG. 11 illustrates possible target responses for an effective beamforming response, $B_{eff}$.

FIG. 11 illustrates two possible target responses for Beff, a) shows a possible target response for extracting the power of the target or utility signal, while b) shows a possible target response for extracting the noise power. The response of b) is equal to 1 minus the response of a). The hatched part of the responses corresponds to values of the wave gradient that are normally not expected in practice. Therefore, these parts of the responses could be declared as don't care simplifying the task of design of a nonlinear spatial filter to approximate the response. FIG. 11 shows the target responses as functions of the angle θ in the range [0° . . . 180°] and the gradient γ in dB. This representation is suitable for two-microphone applications that are symmetrical around the θ-axis. For applications including three or more microphones or including a directional microphone, the target responses will depend upon an additional independent variable.

As has been described above, for example in (39) to (41), it is possible to process the output of linear beamformers nonlinearly and in this way achieve performance improvements as compared to the use of linear beamforming only. Nevertheless the performance of the non-linear spatial filter will depend upon the characteristics of the linear beamformers $\mathbf{34}_{A\text{-}D}$ of the non-linear spatial filter. To illustrate the capabilities of a linear beamformer in the case where there are two microphones, which is the most favourable in terms of various cost measures, FIGS. 12-14 show characteristics of example implementations of such 2-microphone linear beamformers suitable for the application as $\mathbf{34}_{A\text{-}D}$.

Note that for the case where the number of microphones is two a single zero at a specific angle $\theta_0$ and a specific gradient $\gamma_0$ is possible with a linear beamformer, the response being symmetric around the axis connecting the microphones, i.e. the same response for all values of $\psi$.

FIG. 12 shows typical example characteristics for two-microphone implementations of a first-order beamformer, in dBs versus degrees, for various locations of the zero, all with plane wave location ($\gamma$=0). FIG. 12 illustrates various two-microphone linear beamformer plane wave responses as a function of $\theta$. FIG. 13 shows typical example characteristics for two-microphone implementations using a first-order beamformer, in dB versus degrees, for various degrees of gradient mismatch. The frequency is 1 kHz, and the microphone spacing is 10 mm. FIG. 13 illustrates response for a super-cardiod type beamformer as a function of $\theta$ for various degrees of mismatch between the zero location and the incoming wave in the $\gamma$ plane. FIG. 14 shows typical example characteristics for two-microphone implementations using a first order beamformer, in dB versus gradient. Lower curves are at zero angle (90°), middle curves at 45°, upper curves at 0°. The frequency is 1 kHz, and the microphone spacing 10 mm. The spatial zero is at three different positions. FIG. 14 illustrates the response of three different dipoles, on plane wave dipole and two near field dipoles, as a function of the gradient of the incoming wave.

As is described in this document the non-linear spatial filter processes the output signals from a number (at least one) of linear beamformers non-linearly or linearly to produce the signal $P_i$. In the following the notation "n-beamformer non-linear spatial filter" will be used to signify that the non-linear spatial filter includes n linear beamformers $\mathbf{34}_{(A\ldots)}$.

FIG. 15 shows typical example characteristics for two-microphone implementations using a 2-beamformer non-linear spatial filter, in dB versus degrees, for various gradients of incoming wave. Spatial filter zeros at (70°, 0) and (135°, 0). 1 kHz, and 10 mm microphone spacing. The example characteristics of FIG. 15 can be achieved with the implementation of the non-linear spatial filter of FIG. 8.

FIG. 16 typical example characteristics for a two-microphone 3-beamformer non-linear spatial filter, in dB versus degrees, for various gradients of incoming wave. Spatial filter zeros at (70°, 0), (115°, 0) and (145°, 0). The frequency is 1 kHz, and the microphone spacing is 10 mm.

FIG. 17 shows typical example characteristics for a two-microphone 4-beamformer non-linear spatial filter, in dB versus degrees, for various gradients of incoming wave. The spatial filter zeros are at (70°, 0.8 dB), (65°, −0.25 dB), (135°, −0.75 dB) and (140°, 0.25 dB). The frequency is 1 kHz, and the microphone spacing is 10 mm. The example characteristics of FIG. 17 can be achieved with the implementation of the non-linear spatial filter of FIG. 9.

In general four types of regions must be taken into account when designing a nonlinear spatial filter: pass-band regions, stop-band regions, transition band regions and don't care regions.

In the pass band the gain should be constant over the full region. The pass-band region should cover the required span of angles of the incoming wave but it should also cover a span of gradient values of the incoming wave. The gradient span should take near field/far field requirements into account but it should also accommodate for microphone sensitivity mismatch and it should take the wave disturbance into account that occurs when the acoustic device is head-worn or even when the physical dimensions of the device is such that the device itself disturbs the sound field.

In the stop-band region the spatial filter should attenuate as much as possible. The stop-band region should also take a gradient span into account that accommodates for microphone mismatch and disturbance of the sound field due the physical dimensions of the device and the head of the user of the device.

The transitions bands are regions that are necessary between the stop and pass-bands. In the transition bands generally only an upper bound is imposed to the spatial filter response.

The don't care regions cover the parts of the ($\psi$,$\theta$,$\gamma$) space where incoming waves are not expected. The use of don't care regions may be necessary to take into account as the beamformer response may be unbounded as $\gamma$ approaches +−infinity.

For optimal performance it is desirable to control the stop-band, pass-band and don't care regions such that the stop-bands and pass-bands are as narrow as possible in the $\gamma$ direction. For a device intended for use under free field conditions the pass and stop-band should normally be centered around $\gamma$=0. But for a head-worn device it may be advantageous to take into account a predicted disturbance of incoming plane waves by a typical head.

FIG. 18 shows one example of how a plane wave $\gamma$ trajectory of a headworn device could look. FIG. 18 illustrates an imagined example curve illustrating a disturbance of incoming plane waves. The disturbance causes the gradient $\gamma$, as seen by the device in the reference point, to diverge from 0, the divergence being dependent upon the incoming angle. The pass and stop-bands could be designed to cover a $\gamma$ range centered on such a trajectory.

Furthermore for some regions in the ($\psi$,$\theta$) sound incidence may be impossible. An example would be hearing aids worn more or less deep within the concha. For such hearing aids sound incidence within a region centered around $\theta$=0° and/or a region centered around $\theta$=180° is impossible. It would of course make sense to make these impossible regions don't care regions when designing the hearing aid spatial filter.

The example implementations above have shown that is possible to tailor the spatial response with the formulation of equation (40) and the various embodiments have been described. The examples so far have shown limited capabilities in terms of stop-band rejection.

FIG. 19 illustrates an example implementation of a combination of nonlinear spatial filter and a general nonlinear network which may be used in some embodiments of the various aspects of the invention. FIG. 19 illustrates how including a general nonlinear network 150 offers a greater flexibility in the process of tailoring the response and thus may facilitate better stop-band rejection. In FIG. 19 the microphone signals mic1,mic2 are coupled to four beamformers $\mathbf{34}_{A\text{-}D}$, for beamforming of the microphone signals. The outputs $V_{I,1\text{-}4}$ of the linear beamformers $\mathbf{34}_{A\text{-}D}$ are transferred to the general nonlinear network 150 for processing there. The microphone signals mic1, mic2 may in addition be coupled directly to the general non-linear network 150, as indicated. Further, the output X of the nonlinear beamformer 30 and the output P0 of the nonlinear spatial filter 200 may be provided to the general nonlinear network 150 as illustrated on FIG. 19.

FIG. 20 illustrates an example of a general non-linear network 150 that may be used in some embodiments of the various aspects of the invention. The example of a general nonlinear network 150 shown in FIG. 20 shows a number of branches $OP_i$ and a number of nodes $N_i$. A branch can take its input from any input $V_{i,1\text{-}4}$ of the general nonlinear network 150 or from any of the nodes of the general nonlinear network or from a constant source, the latter constant source may be time and/or frequency dependent. The branches $OP_i$ output to a node $N_i$ or to the output P of the general nonlinear network. A branch $OP_i$ may perform operations on its input. The following operations are allowed:

TABLE 1

| Allowed branch operations in the general nonlinear network. |
|---|
| multiplication of a signal with a constant (may be frequency and/or time dependent) |
| application of linear or nonlinear functions (log, exp, 1/x, $x^a$ etc.) |

The nodes may perform any of the following operations on its inputs:

TABLE 2

| Allowed operations in the general nonlinear network. |
|---|
| addition of signals |
| subtraction of signals |
| multiplication of signals |
| division of signals |

The general nonlinear network 150 should be designed such that when the input to the system consists of a single wave $S_1$ then the output $P_i$ of the network 150 should be of the form of equation (51) below.

$$P_i(f,t) \approx a + b \cdot foo(S_1(f,t))^c \quad (51)$$

In equation (51) a, b and c are constants and the function foo( ) is a member of the subset of equation (52) or a similar function.

$$\begin{cases} foo(x) = x \\ foo(x) = |x| \\ foo(x) = \mathrm{real}(x) \\ foo(x) = \mathrm{imag}(x) \end{cases} \quad (52)$$

An important tool in tailoring the spatial response is shown by the following example where $P_i$ is chosen according to equation (53) below. (53) implements a generic formulation of an "inverted beamformer". The α and β constants control the order of the P signal. $V_{i,1}$ is the output of a linear beamformer 34.

$$P_i(f,t) = \sqrt[\beta]{|\mathrm{MIC1}(f,t)|^{\alpha} - |V_{i,1}(f,t)|^{\alpha}} \quad (53)$$

The reason for using the term "inverted beamformer" is that the signal $P_i$ of (53) will exhibit a directivity that is nonzero at the location of the zeroes of the directional response of the beamformer 34 producing the signal $V_{i,1}$ of (53) while the signal $P_i$ will exhibit zeroes at the location where the magnitude of the directional response of the beamformer 34 is unity.

FIG. 21 illustrates an example embodiment of a non-linear spatial filter in the form of an "inverted beamformer". On FIG. 1 the microphone signals mic1, mic2 are in one path first processed in a beamformer $\mathbf{34}_A$ then into a first absolute value extracting device 180 of the general nonlinear network 150, and in another path the microphone signals mic1,mic2 are transferred directly to a second absolute value extracting device 180 of the general nonlinear network 150. An output $P_i$ of the general nonlinear network is formed as a difference between the outputs of the first and second absolute value extracting devices. The example of FIG. 21 corresponds to α and β constants of value 1.

FIG. 22 illustrates typical example directivity characteristics, db versus degrees, of a 2-microphone 1-beamformer non-linear spatial filter using an inverted beamformer configuration according to FIG. 21 for various values of the exponent α of (53). The frequency is 1 kHz, and the microphone spacing is 10 mm. In the example the linear beamformer $\mathbf{54}_A$ is a cardioid type. It seen that the width of the main lobe of the directivity increases as α increases. In particular it can be noticed that very narrow main lobes can be achieved for exponents α smaller than 1. Furthermore it is noticed that exponents of value 2 or larger cause the main lobe to be very wide. Thus it seems most feasible to exploits exponents of value 1 or smaller. For special cases exponents in the range 1 to 2 may apply.

FIG. 23 illustrates an example implementation of a general nonlinear network utilizing signals from several beamformers. The output $P_i$ of this general nonlinear network follows (54) below. It is seen that this can be viewed as incorporating four inverted beamformers.

$$P_i = \sqrt{\prod_{j=1}^{4} |MIC1(f,t)| - |V_{i,j}(f,t)|} \quad (54)$$

FIG. 24 shows the directivity, in dB versus degrees for various gradients of the incoming wave, of a 2-microphone nonlinear spatial filter following equation (54) where the linear beamformer outputs $V_{i,j}$ are dipoles. The example uses a microphone spacing of 10 mm and the responses shown are for 1 kHz. It is seen that with this technique it is possible to use broadfire microphone configurations with very small microphone spacing. An example use could be hearing aids with broadfire configurations.

In an embodiment two hearing aids combine such that their respective microphones form a broadfire array consisting of two microphones, one microphone each from left and right hearing aid. A signal link between the two hearing aids is provided, this could a signal wire but the link could also be wireless, for example a Bluetooth link.

In a variation of this embodiment each hearing aid is equipped with 2 microphones in endfire configurations.

In further embodiments the processing of the general linear network is such that the signals $P_i$ can be described by either (55) or (56) below. (55) and (56) are equivalent but in (56) the multiplication and root extraction operations are implemented in the logarithmic domain. The order $Ord_i$ of the statistical moment $M_i$ derived from $P_i$ is given by (57). $M_i$ is obtained by lowpassfiltering $P_i$ (blocks 401 or 402 etc.).

$$P_i = A_i \cdot \prod_{j=1}^{J_i} \sqrt[\beta_{i,j}]{|MIC1(f,t)|^{\alpha_{i,j}} - |V_{i,j}(f,t)|^{\alpha_{i,j}}} \quad (55)$$

$$P_i = A_i \cdot \exp\left(\sum_{j=1}^{J_i} \frac{1}{\beta_{i,j}} \cdot \log(|MIC1(f,t)|^{\alpha_{i,j}} - |V_{i,j}(f,t)|^{\alpha_{i,j}})\right) \quad (56)$$

$$Ord_i = \sum_{j=1}^{J_i} \frac{\alpha_{i,j}}{\beta_{i,j}} \quad (57)$$

In an embodiment signal $P_1$ is generated by the nonlinear spatial filter 201. Lowpassfilter 401 extracts the statistical estimate of energy $M_1$ by lowpassfiltering $P_1$. Furthermore the blocks 300 and 403 of the embodiment generates the statistical estimate $MF_1$ of the energy of the MIC1 signal. In the block 501 the estimate of energy $M_2$ is generated as $MF_1$ minus $M_1$. P1 is generated according to (56) above with $J_1=8$, the embodiment employing eight linear beamformers 34$_A$-34$_H$ in the nonlinear spatial filter 201. The embodiment uses two microphones with a spacing of 10 mm.

FIG. 25 shows an example plane wave directivity of the statistical estimate $M_1$ of this embodiment. FIG. 26 shows an example plane wave response for the statistical estimate $M_2$ of the embodiment. The graphs shows the plane wave responses in dB versus the angle of incidence in degrees. It is seen that the estimate $M_1$ has good passband gain in the region from 60 to 180 degrees and good stopband rejection in the region 0 to 30 degrees while $M_2$ shows good passband gain in the region 0 to 30 degrees and good stopband rejection in the region 60 to 180 degrees. Thus $M_2$ is a good estimate of the signal energy while $M_1$ is a good excellent estimate of the noise energy.

In an embodiment targeted for headset or telephone applications 2 microphones are used at a spacing of 5 mm. The target application use a compact physical design such that the microphones will placed at a distance of app. 100 mm from the opening of the mouth of the during normal use. The embodiment contains a nonlinear spatial filter 201 that generates signal $P_1$. 4 linear beamformers 34$_A$-34$_D$ are used and $P_1$ is generated according to (56) above where the exponents $\alpha_{i,j}$ all are set to 0.25. FIG. 32 shows typical example characteristics of the signal $P_1$ of the embodiment in dB versus wave gradient in dB for various angles of incidence of the incoming wave. It is seen that the passband is centered around the incoming voice from the mouth of the user that will show a gradient of app. −0.4 dB and an angle of incidence of app. 0 degrees while the stopband effectively blocks far field waves with incoming gradients of app. 0 dB. One characteristic of the spatial filter of equation (53) is that in a large region around $\gamma=0$ the filter produces lower output for larger $\gamma$ mismatch. This is opposed to the behavior of the previous (47) type that produces larger output for larger mismatch. Thus the two types can be combined to produce a spatial filter with very small sensitivity towards $\gamma$ mismatch.

FIG. 27 shows example directivity characteristics where the spatial filters of FIGS. 16 and 17 are augmented with a zero at (180, 0) of the type of equation (53) (with $\alpha_{i,j}=1$) in dB versus degrees, for various gradients of the incoming wave.

Full Range Extractor

FIG. 28 illustrates a generic example of a full range extractor 300 as previously indicated, e.g. in FIG. 5. All inputs to the general nonlinear network 150 shown, i.e. the microphone signals mic1, mic2, the spatial filter output P0 and the beamformer output X are optional but, of course, at least one input should be present in order that the general nonlinear network 150 may be able to generate an output signal PF representing the total power of the input signals. The general nonlinear network 150 of FIG. 28 is equivalent to that of FIG. 20. In one embodiment the function of the full range extractor 300 can be described by equation (58) below.

$$PF_1(f,t)=|\mathrm{MIC1}(f,t)|^2 \tag{58}$$

In yet an embodiment the full range extractor can be described by (59) below.

$$PF_1(f,t)=|X(f,t)|^2 \tag{59}$$

In still an embodiment the first full range extractor can be described by (60) below.

$$PF_1(f,t)=|\mathrm{MIC1}(f,t)\cdot X(f,t)| \tag{60}$$

Use of Forward Beamformer or Common Spatial Filter:

The optional forward beamformer 30 could be static but may also be adaptive. An adaptive beamformer can be very effective with regards to the task of attenuating an interference caused by a single disturbance of the sound field. Therefore a single interference may be effectively removed from x while it is still present in mic1 and mic2. As the interference is effectively removed from the forward signal it would be advantageous to prevent it from influencing the gain response used for the time-variant filter 50 of FIG. 1. This will be accomplished if the interference is removed from all the signals $P_i$ and $PF_I$. This can be accomplished if the optional X input to the nonlinear spatial filter 200 and the full range extractor 300 is implemented, or if the optional nonlinear spatial filter 200 of the power estimators is implemented. In either case an additional zero (or zeros) with location(s) equivalent to that of the forward beamformer 30 is inserted to the effective beamforming response of the nonlinear spatial filters and the full range extractor.

In an embodiment the first P and PF power signals are extracted according to the following. $V_j$ are the outputs of linear beamformers acting on the microphone outputs.

$$\begin{cases} P_1(f,t)=\left(\prod_{j=1}^{J}|V_j(f,t)|^{\alpha_j}\right)\cdot|X(f,t)|^{\alpha_0} \\ PF_1(f,t)=|MIC1(f,t)|^{2-\alpha_0}\cdot|X(f,t)|^{\alpha_0} \\ \alpha_0+\sum_{j=1}^{J}\alpha_j=2 \end{cases} \tag{61}$$

In another embodiment the first P and PF power signals are extracted according to the following. $V_j$ are the outputs of linear beamformers acting on the microphone outputs.

$$\begin{cases} P_1(f,t)=\left(\prod_{j=1}^{J}|V_j(f,t)|^{\alpha_j}\right)\cdot P_0^{\alpha_0} \\ PF_1(f,t)=|MIC1(f,t)|^{2-2\cdot\alpha_0}\cdot P_0^{\alpha_0} \\ 2\cdot\alpha_0+\sum_{j=1}^{J}\alpha_j=2 \end{cases} \tag{62}$$

In another embodiment the first P and PF power signals are extracted according to the following. $V_j$ are the outputs of linear beamformers acting on the microphone outputs.

$$\begin{cases} P_1(f,t)=\left(\prod_{j=1}^{J}|V_j(f,t)|^{\alpha_j}\right)\cdot P_0^{\alpha_0} \\ PF_1(f,t)=|X|^2 \\ 2\cdot\alpha_0+\sum_{j=1}^{J}\alpha_j=2 \end{cases} \tag{63}$$

Wind Noise

A common problem with directional microphones and beamformers are their sensitivity to wind-noise. Wind-noise is caused by edges or other physical features of the device that cause turbulence in the presence of strong wind. As the wind-noise is generated very close to the microphone inlets wind-noise is near-field.

Wind-noise can be modelled as a number of discrete noise sources all mutually uncorrelated. Wind-noise can with the new invention be dealt with by defining a source region class for each of the regions in the incidence space that correspond to source generation at the physical features on the device that may cause wind noise. Thus the optimal gain of (11) or (14) will depend on the powers of the wind-noise signals as $P_i$ measurements in addition to the $P_i$ measurements for the target signal and the acoustic noise of the environment.

In one embodiment a source group is defined for each microphone inlet for wind-noise generated at the respective inlet in addition to the source groups for the target signal and the environment noise. For each source group a nonlinear spatial filter is applied. The nonlinear spatial filters for the target signal and environment noise groups include spatial response zeros for incidence from each of the microphone inlets.

As described above unwanted wind-noise contribution to the $M_i$ estimates can be dealt with by the application of spatial zeros at wind-noise positions. But it is also possible to allow the $M_i$ estimates to contain errors due to wind-noise and correct for these errors in a postprocessing stage. This concept is described in the following.

Equation (64) provides a model for the microphone input in presence of wind-noise for a N-microphone device. $W_m$ are the mutually uncorrelated wind-noises and $S_n$ is the non-wind-noise acoustical signal at the positions of microphone n. $N_W$ is the number of wind-noise sources and R is the transfer response noise from the source position of the particular wind-noise source to the microphone position.

$$MIC_n(f,t) = S_n(f,t) + \sum_{m=1}^{N_W} R_{n,i}(f)\cdot W_m(f,t) \tag{64}$$

A model that only contains a single noise source for every microphone inlet will suffice for a good first order model of the wind-noise behavior. If it also assumed that the damping from one microphone inlet to the next is large then equation (64) may be further simplified to equation (65).

$$MIC_n(f,t)=S_n(f,t)+W_n(f,t) \tag{65}$$

As the wind-noises are mutually uncorrelated and they also are uncorrelated with the acoustical input the expectation of the power of the microphone signals can be modelled as follows.

$$E\{|MIC_n(f,t)|^2\} = E\{|S_n(f,t)|^2\} + \sum_{m=1}^{N_W} R_{n,m}(f)\cdot E\{|W_m(f,t)|^2\} \tag{66}$$

The model of equation (66) can be modified to that of equation (67) where κ is a factor that depends upon both S and the position of microphone n relative to microphone 1 (the reference position).

$$E\{|MIC_n(f,t)|^2\} = \kappa_n(f,t)\cdot E\{|S(f,t)|^2\} + \sum_{m=1}^{N_W} R_{n,m}(f)\cdot E\{|W_m(f,t)|^2\} \tag{67}$$

FIG. 29 illustrates an example of a power estimator 10 for generating statistical power estimates, similar to the one in FIG. 5, but where a wind-noise detector 410 has been inserted for additional processing of the signals mic1,mic2 from the microphones. The wind-noise detector 410 provides an output signal that is supplied to a wind-noise correction block 430 inserted between the measurement filters 401-403 and the estimate post-processing module 501 of FIG. 5. The wind noise detector 410 is coupled to the micro-phone outputs for being able to process the microphone signals mic1,mic2 to compute statistical estimates of energy of the individual wind-noise sources and of the non wind-noise acoustical input. Statistical estimates MW1,MW2,MS provided by the wind noise detector 410 are supplied to a wind-noise correction block 430 that corrects the estimates $M_i$ and $MF_i$ being output from the measurement filters 401-403 for errors that have been induced to the estimates by wind-noises. The wind-noise correction block 430 optionally outputs corrected $M_i$ and/or $MF_I$ components, denoted $M_i$" and $MF_I$", that reflect the wind-noise power and/or its influence on the full power, to the estimate post-processing module 501. The estimate post-processing module 501 further processes the wind-noise corrected components, $M_i$" and $MF_I$" to generate post processor outputs $M_i$' and $MF_1$'. $M_i$' and $MF_1$' are the statistical estimates M and MF, described previously. Note that the wind-noise detector 410 may detect any number larger than or equal to 1 of wind-noise estimates $MW_m$. Likewise the wind-noise detector 410 may detect more than one estimate of energy of signal MS.

FIG. 30 shows an example of a wind-noise detector 410 suitable for use in various embodiments of the invention. The wind-noise detector 410 may use a model of the wind-noise generation process as described above. Signals mic1,mic2 from microphones are transferred to a first set of power or magnitude calculation units $\mathbf{37}_{C,D}$ providing a first set of output signals $PMIC_1$ and $PMIC_2$, respectively, and to a set of beamformers $\mathbf{38}_{A,B}$ followed by a second set of power or magnitude calculation units $\mathbf{37}_{A,B}$ providing a second set of output signals $P_A$ and $P_B$. The output signals $P_A$, $P_B$, $PMIC_1$, $PMIC_2$ are processed in respective measurement filters 406-409. The outputs of two measurement filters 406,407 denoted MA and MB are summed to generate a sum signal MAB which is supplied to the wind-noise estimator 420. The outputs of two other measurement filters 408,409, denoted MMIC1 and MMIC2, respectively, are also supplied to the wind noise estimator. The wind-noise detector 410 may be adapted to compute the estimates $MMIC_n$ of the expectations of the powers $\mathbf{37}_{A-D}$ of the microphone signals mic1,mic2. The wind-noise detector may detect any number $N_m$ larger than or equal to 2 of beamformers $\mathbf{38}_{A\ldots}$. $N_m$ should be equal to or larger than the number of wind-noise sources of the wind-noise model used. Estimates $M_A$, $M_B$ . . . of the expectations of the power of the beamformer outputs are calculated and summed to the estimate MAB. The figure shows a single MAB but several estimates $MAB_{xy}$ may be derived. Each $MAB_{xy}$ should be the sum of power estimates of at least two different beamformers.

The wind-noise estimator block 420 uses the power estimates $MMIC_n$ and $MAB_{xy}$ to generate estimates $MW_r$ of the power of the individual wind-noise sources and $M_S$ of the power of the acoustical input at the reference position.

To enable wind-noise detection the beamformers 38$_A$, 38$_B$ must be designed with particular directional responses in order to enable wind-noise detection. The following requirement will enable wind-noise detection when fulfilled. The requirement of equation (68) says that the sum of the magnitude squared of the beamformer responses of the beamformers contributing to $MAB_{xy}$ should be constant for all angles of incidence and for all wave gradients. The term $B_{xy}$ represents the set of beamformers contributing to the particular sum $MAB_{xy}$. $q_{xy}(f)$ is a function depending solely upon the frequency, not upon parameters of wave incidence.

$$\sum_{z \in B_{xy}} |B_z(f, \psi, \theta, \gamma)|^2 \approx q_{xy}(f) \text{ for all } (\psi, \theta, \gamma) \tag{68}$$

In practice it is impossible to fulfil equation (68) for all values of the wave gradient γ. Fortunately, the simplification that the acoustical input is plane wave is permissible in many cases. This leads to the relaxed formulation of the criterion shown in equation (69).

$$\sum_{z \in B_{xy}} |B_z(f, \psi, \theta, \gamma)|^2 \approx q_{xy}(f) \text{ for all } (\psi, \theta),\ \gamma_0 < \gamma < \gamma_1 \tag{69}$$

In one embodiment two microphones and two beamformers A, B are used and a single MAB is derived. The beamformers 38$_A$, 38$_B$ are chosen as reverse cardioids with sub-optimal delays. $k_w$ is a positive constant larger than one and $\tau_0$ is given by equation (71) where dmic is the microphone spacing and c is the speed of sound.

$$\begin{cases} P_A(f, t) = |MIC1(f, t) - MIC2(f, t - k_w \cdot \tau_0)|^2 \\ P_B(f, t) = |MIC2(f, t) - MIC1(f, t - k_w \cdot \tau_0)|^2 \end{cases} \tag{70}$$

$$\tau_0 = \frac{dmic}{c} \tag{71}$$

MAB is derived as the sum of $M_A$ and $M_B$. $M_A$ and $M_B$ are the results of lowpass filtering $P_A$ and $P_B$ respectively. In a variation of this embodiment $k_w$ is chosen as approximately 4.

Given equations (69) or (68) and (67) above the MMIC and MAB estimates can be modelled as follows. $\rho_{xy,m}$ is the response of beamformer sum xy for sources originating at the position where wind-noise m is generated, it must be found by an analysis of the beamformers.

$$MAB_{xy}(f, t) \approx q_{xy}(f, t) \cdot E\{|S(f, t)|^2\} + \sum_{m=1}^{N_W} \rho_{xy,m}(f) \cdot E\{|W_m(f, t)|^2\} \tag{72}$$

$$MMIC_n \approx \kappa_n(f, t) \cdot E\{|S(f, t)|^2\} + \sum_{m=1}^{N_W} R_{n,m}(f) \cdot E\{|W_m(f, t)|^2\} \tag{73}$$

$$\rho_{xy,m}(f) = \frac{\partial E\{|MAB_{zy}(f)|^2\}}{\partial E\{|W_m(f)|^2\}} \tag{74}$$

Equations (72) and (73) constitute $N+N_{XY}$ equations with $1+N+N_W$ unknowns. $N_{XY}$ is the number of sum estimates MAB, the unknown are $E\{S\}$, $\kappa_n$ and $E\{W_m\}$. In general this set of equations will be underestimated. Fortunately it can be assumed that the external acoustical sources are all in the far-field. This assumption will cause the sound pressure level, caused by non-wind-noise sources, to be identical at all microphone inlets under the additional assumption that the microphone spacing is small.

$$\kappa_n(f,t) \approx 1 \tag{75}$$

The set of equations (72), (73) and (75) can be solved for S and $W_m$. The solution leads to the defition of the estimates MS and $MW_m$ of the wind-noise detector 410 shown in (76) below. The result is of the following form. cmic, cab, dmic and dab are sets of frequency dependent constants.

$$\begin{cases} MS(f, t) = \sum_{n=1}^{N} cmic_n(f) \cdot MMIC_n(f, t) + \sum_{r=1}^{N_{XY}} cab_r(f) \cdot MAB_r(f, t) \\ MW_m(f, t) = \sum_{n=1}^{N} dmic_{n,m}(f) \cdot MMIC_n(f, t) + \sum_{r=1}^{N_{XY}} dab_{r,m}(f) \cdot MAB_{r,m}(f, t) \end{cases} \tag{76}$$

In a two-microphone embodiment with a wind-noise detector based on two beamformers described above the wind-noise model can be written as in equation (77) below.

$$\begin{cases} MAB(f, t) \approx q_1 \cdot f^2 \cdot E\{|S(f, t)|^2\} + \rho_1 \cdot E\{|W_1(f, t)|^2\} + \rho_2 \cdot E\{|W_2(f, t)|^2\} \\ MMIC_1(f, t) \approx E\{|S(f, t)|^2\} + R_{1,1} \cdot E\{|W_1(f, t)|^2\} + R_{1,2} \cdot E\{|W_2(f, t)|^2\} \\ MMIC_2(f, t) \approx E\{|S(f, t)|^2\} + R_{2,1} \cdot E\{|W_1(f, t)|^2\} + R_{2,2} \cdot E\{|W_2(f, t)|^2\} \end{cases} \tag{77}$$

The solution of (77) leads to the definition of (78) for the wind and signal noise estimators. aw, bw, cw and dw are sets of constants.

$$
\begin{cases}
MS(f,t) = \frac{aw_{1,1}}{bw_{1,1}+cw_{1,1}\cdot f^2}\cdot MAB(f,t)+\frac{aw_{1,2}}{bw_{1,2}+cw_{1,2}\cdot f^2}\cdot MMIC_1(f,t)+\frac{aw_{1,3}}{bw_{1,3}+cw_{1,3}\cdot f^2}\cdot MMIC_2(f,t)\\
MW_1(f,t) = \frac{aw_{2,1}}{bw_{2,1}+cw_{2,1}\cdot f^2}\cdot MAB(f,t)+\frac{aw_{2,2}+dw_{2,2}\cdot f^2}{bw_{2,2}+cw_{2,2}\cdot f^2}\cdot MMIC_1(f,t)+\frac{aw_{3,3}+dw_{2,3}\cdot f^2}{bw_{2,3}+cw_{2,3}\cdot f^2}\cdot MMIC_2(f,t)\\
MW_2(f,t) = \frac{aw_{3,1}}{bw_{3,1}+cw_{3,1}\cdot f^2}\cdot MAB(f,t)+\frac{aw_{3,2}+dw_{3,2}\cdot f^2}{bw_{3,2}+cw_{3,2}\cdot f^2}\cdot MMIC_1(f,t)+\frac{aw_{3,3}+dw_{3,3}\cdot f^2}{bw_{3,3}+cw_{3,3}\cdot f^2}\cdot MMIC_2(f,t)
\end{cases}
\quad (78)
$$

In some embodiments of the invention the diameter of the microphone sound inlets are 1.5 mm and the microphone spacing is 10 mm. With these physical dimensions the wind-noise may be modelled as in equation (79) below and the wind and signal power estimates can be derived as in equation (80).

$$
\begin{cases}
MAB(f,t) \approx 0.00072\cdot f^2\cdot E\{|S(f,t)|^2\}+2\cdot E\{|W_1(f,t)|^2\}+2\cdot E\{|W_2(f,t)|^2\}\\
MMIC_1(f,t) \approx E\{|S(f,t)|^2\}+E\{|W_1(f,t)|^2\}+0.13\cdot E\{|W_2(f,t)|^2\}\\
MMIC_2(f,t) \approx E\{|S(f,t)|^2\}+0.13\cdot E\{|W_1(f,t)|^2\}+E\{|W_2(f,t)|^2\}
\end{cases}
\quad (79)
$$

$$
\begin{cases}
MS(f,t) = \frac{-1}{3.93-0.52\cdot 10^{-6}\cdot f^2}\cdot MAB(f,t)+\frac{1.97}{3.93-0.52\cdot 10^{-6}\cdot f^2}\cdot MMIC_1(f,t)+\frac{1.97}{3.93-0.52\cdot 10^{-6}\cdot f^2}\cdot MMIC_2(f,t)\\
MW_1(f,t) = \frac{0.98}{3.93-0.52\cdot 10^{-6}\cdot f^2}\cdot MAB(f,t)+\frac{2-0.52\cdot 10^{-6}\cdot f^2}{3.93-0.52\cdot 10^{-6}\cdot f^2}\cdot MMIC_1(f,t)+\frac{-2+0.88\cdot 10^{-8}\cdot f^2}{3.93-0.52\cdot 10^{-6}\cdot f^2}\cdot MMIC_2(f,t)\\
MW_2(f,t) = \frac{0.98}{3.93-0.52\cdot 10^{-6}\cdot f^2}\cdot MAB(f,t)+\frac{-2+0.88\cdot 10^{-8}\cdot f^2}{3.93-0.52\cdot 10^{-6}\cdot f^2}\cdot MMIC_1(f,t)+\frac{2-0.52\cdot 10^{-6}\cdot f^2}{3.93-0.52\cdot 10^{-6}\cdot f^2}\cdot MMIC_2(f,t)
\end{cases}
\quad (80)
$$

The MW and MS thus are estimates of the power (second order moments) of the wind-noise and signal components of the microphone acoustical input to the device. Note that it is possible to extend the wind-noise detector 410 to produce estimates of other statistical moments or cumulants of the acoustical input if the beamformers 38$_A$, 38$_B$ . . . and the power blocks 37$_{A-D}$ of FIG. 35 are modified accordingly.

It should be noted that the wind-noise detector of FIG. 30 could be viewed as a special embodiment of a nonlinear spatial filter with more that one output. Note that the processing of the wind-noise estimator block 420 of FIG. 30 is linear. Therefore measurement filters 401-404 can be moved from the inputs of the wind-noise estimator 420 to its outputs without changing the functionality of the wind-noise detector. With the measurement filters 401-404 placed at the output the similarity to the nonlinear spatial filter is obvious.

The optional wind-noise correction block 430 of FIG. 29 receives the MW and MS outputs from the wind-noise detector block 430 and uses these to apply corrections to the $M_i$ and $MF_i$ estimates. The corrections run differently for the 2 groups of power estimates, the correction of the $M_i$ estimates will be described first.

In the presence of wind-noise the $M_i$ estimates may contain an error component for each wind-noise source. As the wind-noises are mutually uncorrelated and uncorrelated with the external acoustical signal the error components will to the first approximation simply be additive components. Therefore the error correction can be done via the following principle.

$$
M_i''(f,t) = M_i(f,t) - \sum_{m=1}^{N_W} \beta_{i,m}(f)\cdot MW_m(f,t) \quad (81)
$$

In (81) $\beta_{i,m}$ is the sensitivity of the $M_i$ output towards the power of wind-noise source m. It is found by an analysis of the nonlinear spatial filter of the $M_i$ path.

$$
\beta_{i,m}(f) = \frac{\partial E\{|M_i(f)|^2\}}{\partial E\{|W_m(f)|^2\}}\text{â} \quad (82)
$$

More than one scheme for the correction of the $MF_i$ estimates exists. The first scheme attempts to let the time-variant filter 50 of FIG. 1 perform noise reduction for external acoustical noises only and not wind noises. This scheme is suitable when the device does not contain the optional forward beamformer 30 or when the wind-noise sensitivity of this can be neglected. With this scheme the $MF_i$ estimates are corrected for wind-noise errors along the line described for $M_i$ estimates.

$$MF_l''(f,t) = MF_l(f,t) - \sum_{m=1}^{N_W} \beta F_{l,m}(f) \cdot MW_m(f,t) \tag{83}$$

$$\beta F_{l,m}(f) = \frac{\partial E\{|MF_l(f)|^2\}}{\partial E\{|W_m(f)|^2\}} \tag{84}$$

If on the other hand the device does contain a forward beamformer 30 and it is desirable to compensate for the wind-noise sensitivity of this then $MF_l$ should reflect the wind-noise power contained in the output x of the forward beamformer 30. This can be achieved by modifying the correction gain $\beta F_{i,m}$ of (84) or by omitting the wind-noise correction step for the $MF_l$ estimates.

In one embodiment equations (72) and (73) above are used to compensate for errors of the $M_i$ estimates. The $MF_1$ estimates on the other hand receives no wind-noise corrections.

In one variation of this embodiment the $MF_1$ estimate is based upon low-pass filtering of the $PF_1$ signal defined in (59). In one embodiment the wind-noise correction block 430 generates $M_i$ signals as given by equation (85) below as part of the M output.

$$\begin{cases} M_{i1}''(f,t) = MW_1(f,t) \\ M_{i2}''(f,t) = MW_2(f,t) \\ M_{i3}''(f,t) = MW_1(f,t) + MW_2(f,t) \end{cases} \tag{85}$$

Estimate Postprocessing

The optional estimate postprocessing of FIGS. 4 and 29 receives the $M_i$ and the $MF_l$ estimates or optionally the $M_i''$ and the $MF_l''$ estimates and produces the $M_i'$ and the $MF_l'$ estimates.

Non-ideal stop-band or pass-band characteristics of the spatial filters may cause errors of the $M_i$ and the $MF_l$ estimates. This can be explained as a spillover of energy from one input class (corresponding to a specific region in incidence space) to the estimates of energy of other classes. The corrections defined in equation (86) below attempts at minimizing the errors. These corrections will not eliminate the errors fully but can reduce them. a, b, c and d are sets of constants. The values of a, b, c and d may be frequency dependent.

$$\begin{cases} M_i'(f,t) = \sum_{j=1}^{I} a_{i,j}(f) \cdot M_j(f,t) + \sum_{l}^{L} b_{i,l}(f) \cdot MF_l(f,t) \\ MF_l'(f,t) = \sum_{i=1}^{I} c_{l,i}(f) \cdot M_i(f,t) + \sum_{i}^{L} d_{l,i}(f) \cdot MF_i(f,t) \end{cases} \tag{86}$$

An optional nonlinearity can be applied to prevent negative power estimates etc.

$$\begin{cases} M_i'(f,t) = \max\left( \sum_{j=1}^{I} a_{i,j}(f) \cdot M_j(f,t) + \sum_{l}^{L} b_{i,l}(f) \cdot MF_l(f,t), 0 \right) \\ MF_l'(f,t) = \max\left( \sum_{i=1}^{I} c_{l,i}(f) \cdot M_i(f,t) + \sum_{i}^{L} d_{l,i}(f) \cdot MF_i(f,t), 0 \right) \end{cases} \tag{87}$$

Note that that M'' and MF'' may replace M and MF in equations (81) and (82) in the presence of the optional wind-noise correction.

It may be desirable to post-process moment estimates to produce cumulant estimates or similar. The processing of equations (86) and (87) is capable of extraction of cumulants if the constants are adjusted accordingly and $M_i$ contains all the relevant moment estimates of different orders. For example both $1^{st}$ and $2^{nd}$ order moments are required to derive the $2^{nd}$ order cumulant.

The number of estimates $M_i'$ and $MF_l'$ may be different from the number of estimates $M_i$ and $MF_l$. The reason for this is that the postprocessing stage can be used to derive additional statistical estimates. The additional estimates could be cumulants derived from moments or they could be estimates for additional regions in incidence space. The number of estimates $M_i'$ and $MF_l'$ will be denoted $I_G$ and $L_G$ respectively.

In an embodiment two estimates $M_i$ are input to the estimate postprocessing block 501. These estimates are denoted $M_S$ and $M_N$ respectively. The output of the postprocessing block 501 is the following.

$$\begin{cases} M_S' = M_S \\ M_N' = M_N \\ MF' = M_S + M_N \end{cases} \tag{88}$$

In some embodiments according to the invention one estimate $M_i$ and one estimate $MF_l$ are input to the estimate postprocessing block 501. These estimates are denoted $M_1$ and $MF_1$ respectively. The output of the postprocessing block 501 is the following.

$$\begin{cases} M_1' = M_1 \\ M_2' = MF_1 - M_1 \\ MF_1' = MF_1 \end{cases} \tag{89}$$

Further, in some embodiments according to the invention two estimates $M_i$ are input to the estimate postprocessing block 501. These estimates are denoted $M_1$ and $M_2$ respectively. $M_1$ is an estimate of the first order moment of a particular incidence region and $M_2$ is an estimate of the second order moment for the same region. The output of the postprocessing block 501 contains the following.

$$\begin{cases} M_1' = M_1 \\ M_2' = M_2 \\ M_3' = M_2 - M_1^2 \end{cases} \tag{90}$$

In a further embodiment one estimate $M_i$ and one estimate $MF_l$ are input to the estimate postprocessing block 501. These two estimates are denoted $M_1$ and $MF_1$ respectively. The output of the postprocessing block is the following.

$$\begin{cases} M_1' = a_1 \cdot M_1 + b_1 \cdot MF_1 \\ MF_1' = c_1 \cdot M_1 + d_1 \cdot MF_1 \end{cases} \tag{91}$$

Gain Calculator

The gain calculator 40 receives the signals $M_i$ and $MF_l$ that may be estimates of statistical moments, cumulants or similar. In the most basic form $M_i$ and $MF_l$ are estimates of signal power or variance.

In the following it will be assumed that $M_i'$ and $MF_l'$ are moment or cumulant or similar postprocessed estimates as needed. In (92) $M_i'$ and $MF_l'$ could be replaced by $M_i$ and $MF_l$ or $M_i''$ and $MF_l''$ as required depending upon the presence of the optional wind-noise correction 430 and/or the estimate postprocessing 501.

Optionally, the gain calculator 40 may contain a pre-processing stage in which the $M_i'$ and $MF_l'$ (or $M_i$ and $MF_l$ or $M_i''$ and $MF_l''$ as required) signals are transformed in order to alter the frequency resolution. If the gain calculator 40 does contain the optional preprocessing stage then the outputs $M_i'''$ and $MF_l'''$ of this stage will replace $M_i'$ and $MF_l'$ in (92) below.

In some embodiments the estimates $M_i'$ and $MF_l'$ may be smoothed over frequencies by applying a moving average filter in the frequency domain. In yet some embodiments the signals of and $M_i'''$ and $MF_l'''$ are implemented with fewer frequency bands than are $M_i'$ and $MF_l'$. Sets of adjacent frequency bands of $M_i'$ and $MF_l'$ are collected to single bands in $M_i'''$ and $MF''_l'$. For each frequency band of $M_i'''$ and $MF_l'''$ the signal value is taken as the sum of the signal values of the corresponding frequency bands of $M_i'$ and $MF_l'$.

With the optionally postprocessed and/or preprocessed estimates a set of gains can be calculated from equation (92) below.

$$G_l(f,t) = \sqrt[O_l]{\frac{\sum_{i=1}^{I_G} (A_{i,l}(f))^{O_l} \cdot M_i'(f,t)}{MF_l'(f,t)}} \tag{92}$$

$A_{i,k}$ controls the gain of the system for signals of the various regions of the space of sound incidence. $A_{i,k}$ could be constant but could also be controlled by various parameters such as S/N ratios, user controls etc. In particular they may be also be frequency dependent. $O_l$ corresponds to the order of the statistical estimates $M_i$ and $MF_l$.

The resulting G to be input to the time variant filter 50 of FIG. 1 is calculated using equation (93) wherein goo( ) is a linear or nonlinear function.

$$G(f,t)=goo(\ldots,G_l(f,t),\ldots) \tag{93}$$

In some embodiments of the invention a single estimate $MF_1'$ is derived and G is calculated as in equation (94) below.

$$G(f,t) = \sqrt{\frac{\sum_{i=1}^{I_G} A_i(f)^2 \cdot M_i'(f,t)}{MF_1'(f,t)}} \tag{94}$$

In some further embodiments a single estimate $MF_1'$ is derived and G is calculated as in equation (95) below.

$$G(f,t) = \frac{\sum_{i=1}^{I_G} A_i(f)^2 \cdot M_i'(f,t)}{MF_1'(f,t)} \tag{95}$$

In still further embodiments according to the invention two gains $G_1$ and $G_2$ are calculated. The resulting G is calculated from equation (96) as follows.

$$G(f,t)=\min(G_1(f,t),G_2(f,t)) \tag{96}$$

In some embodiments one gain $G_1$ is calculated. The resulting G is calculated as follows. $G_{min}$ is a constant.

$$G(f,t)=\max(G_{min},G_1(f,t)) \tag{97}$$

In yet some further embodiments four estimates $MF_l'$ are derived and two gains $G_l$ are calculated. The resulting G is calculated as follows.

$$G(f,t) = \begin{cases} G_1(f,t) & \text{if } MF_3'(f,t) > MF_4'(f,t) \\ G_2(f,t) & \text{otherwise} \end{cases} \tag{98}$$

In some embodiments four estimates $M_i'$ are derived and two gains $G_l$ are calculated. The resulting G is calculated as follows.

$$G(f,t) = \begin{cases} G_1(f,t) & \text{if } M_3'(f,t) > M_4'(f,t) \\ G_2(f,t) & \text{otherwise} \end{cases} \tag{99}$$

In some embodiments two microphones are used and $PF_1$ is derived as given by equation (100) below. $MF_1$ is derived by lowpass-filtering $PF_1$. Wind-noise power estimates are derived as described by equation (78) and wind-noise correction 430 includes the processing given by equation (101). $\beta_1$ and $\beta_2$ are the square of the transfer response from wind-noise sources $W_1$ and $W_2$ respectively to signal X. The Estimate postprocessing includes the processing of equation (102).

$$PF_1(f,t) = |X(f,t)|^2 \tag{100}$$

$$\begin{cases} M_1''(f,t) = MF_1(f,t) - \beta_1(f)\cdot MW_1(f,t) - \beta_2(f)\cdot MW_2(f,t) \\ M_1''(f,t) = MF_1(f,t) \end{cases} \tag{101}$$

$$\begin{cases} MF_1'(f,t) = MF_1''(f,t) \\ MF_1'(f,t) = M_1''(f,t) \\ MF_2'(f,t) = MF_1''(f,t) - M_1''(f,t) \end{cases} \tag{102}$$

The Gain calculator calculates gain $G_1$ according to (103). $G_1$ is the optimal gain in the presence of wind-noise only, i.e. when disregarding other acoustical noises. $A_S$ is the gain applied to signal components and $A_W$ is the gain applied to wind-noise.

$$G_1(f,t) = \sqrt{\frac{A_S^2 \cdot M_1'(f,t) + A_W^2 \cdot M_2'(f,t)}{MF_1'(f,t)}} \tag{103}$$

In a variation of the embodiment the processing of equations (101) and (102) are replaced with that of (104) and (105) respectively.

$$\begin{cases} M_1''(f,t) = MF_1(f,t) - M_2''(f,t) \\ M_2''(f,t) = \beta_1(f)\cdot MW_1(f,t) + \beta_2(f)\cdot MW_2(f,t) \\ MF_1''(f,t) = MF_1(f,t) \end{cases} \tag{104}$$

$$\begin{cases} M_1'(f,t) = M_1''(f,t) \\ M_2'(f,t) = M_2''(f,t) \\ MF_1'(f,t) = MF_1''(f,t) \end{cases} \tag{105}$$

In some embodiments of the invention two microphones are used and the forward beamformer is also used. These embodiments use the techniques described in the "Wind noise" section to derive $MW_1$ and $MW_2$ that are estimates of the power of the wind noise generated at the locations of the respective microphone inlets. Furthermore $MF_1$ is generated as an estimate of the full power of the output X of the forward beamformer 30. Furthermore the embodiment includes a first nonlinear spatial filter 201 and a measurement filter 401 that estimates a first statistical estimate $M_1$ of the power of that part of the incoming sound field that constitute the wanted input signal. In the wind-noise correction stage 430 the following estimates are generated.

$$\begin{cases} M_1''(f,t) = M_1(f,t) \\ M_2''(f,t) = \beta_1(f)\cdot MW_1(f,t) + \beta_2(f)\cdot MW_2(f,t) \\ M_3''(f,t) = MF_1(f,t) - M_1''(f,t) - M_2''(f,t) \end{cases} \quad (106)$$

In equation (104) $\beta_1$ and $\beta_2$ are the squares of the gains with which the forward beamformer amplifies noise from the wind-noise sources of the two microphones, respectively. Thus $M_2''$ is an estimate of the power of the wind noise components of X and $M_3''$ is an estimate of the power of noise components of X that is not due to wind-noise. A gain $G_1$ is derived as follows.

$$G_1(f,t) = \sqrt{\frac{(A_S(f))^2\cdot M_1''(f,t) + (A_W(f))^2\cdot M_2''(f,t) + (A_N(f)^2)\cdot M_3''(f,t)}{MF_1(f,t)}} \quad (107)$$

Thus $A_S$ is the signal gain, $A_w$ is the wind-noise gain and $A_N$ is the gain for noises that are not wind-noises.

Beamformer Implementation

The new invention includes the generation of a number of different linear beamformed signals. Within the frequency domain or within filterbanks of narrow bandwidth those beamformed signals may be generated with a minimum of overhead taking the fact into account that the beamformed signals may be allowed to contain a certain portion of aliasing as they are only used for measurement purposes.

FIG. 31 illustrates a simple method to generate a number of different beamformed signals with the help of two cardioid signals, a normal cardioid and its reverse. The depicted method use "orthogonal" cardiods to produce a number of different beamformed signals. FIG. 31 shows that signals mic1,mic2 from the microphones are supplied to a forward cardioid module 450 and to a reverse cardioid module 460. Then the outputs fc,rc of the respective cardioid modules 450,460 are transferred to several parallel weighting stages, in this case three parallel weighting stages where the two cardoid outputs in each stage are weigthed by weights $w_{i,1}$, $w_{i,2}$, respectively, and summed in a pairwise manner, to provide a number of beamformed output signals v1,v2,v3. Each beamformed signal $v_i$ is simply a linear mixture of the cardioids fc and rc. If the weights $w_{i,1}$ and $w_{i,2}$ sum to 1 then the resulting beamformer response will have its zero at $\gamma=0$.

Near Field Enhancements

In general it will be very tough to design nonlinear spatial filters with the same pass-band in the $(\psi,\theta)$ domain while differing pass-bands in the $(\gamma)$ domain. Therefore the following enhanced implementation may desirable when the device needs to discriminate between near and far inputs. Consider an implementation that has its pass-band of power $P_1$, $M_1$ controlled by $([0,2\pi][0,\theta_1],[\gamma_1,\gamma_2])$. The implementation further derives powers $P_2 \ldots P_I$ that all exhibit zeros in the $([\ldots],[0,\theta_1],[\gamma_1,\gamma_2])$ region but the zeros at located at different $\gamma$ values. The minimal of the estimates $M_2 \ldots M_I$ must be found in the path that has its zero at the $\gamma$ value where the most energy is present in the sound field. Whence in a first approximation all of $M_1$ could be attributed to that $\gamma$ range.

In a further enhancement the $M_2 \ldots M_I$ could be further analyzed to distribute the $M_1$ power over the full $[\gamma_1, \gamma_2]$ range.

Additional Use of Power Estimates

The power (statistical moment) estimates M and $M_F$ may be useful for other purposes than the control of the time-variant filter 50 of FIG. 1. It may for example be used as an instrument in the control of the gain in the signal path from the receiver 100 output rx through the audio processor 20 to an output out for the loudspeaker 120. This RX gain can be raised if the device is working in a noisy environment.

In an embodiment the audio processor 20 could use an estimate $M_{NOISE}$ of the power of the noise of the acoustic environment according to equation (108) below, where arx and brx are a set of constants.

$$M_{NOISE}(f,t) = \sum_{i=1}^{I} arx_i\cdot M_i(f,t) + \sum_{l=1}^{L} brx_l\cdot MF_l(f,t) \quad (108)$$

The audio processor 20 could generate the loudspeaker output out as the sum of the rx input amplified and the signal y amplified.

$$YRX(f,t)=G_{RX}(f,t)\cdot RX(f,t) \quad (109)$$

$$\mathrm{OUT}(f,t)=A_{OUT}(f,t)\cdot(YRX(f,t)+Y(f,t)) \quad (110)$$

The optional time-variant filter RX 130 of FIG. 1 is responsible for applying the gain $G_{RX}$ to the rx input. The optional RX Gain control block 60 of FIG. 1 is in turn responsible for the derivation of the gain $G_{RX}$. Note that the time-variant filter RX 130 could alternatively be placed in the path between the audio processor and the loudspeaker 120.

The implementation of the RX Gain control 60 is equivalent to that of the gain calculator 40. But the purpose of the time-variant filter RX 130 is not to reduce the noise content of the rx input, it is rather to amplify the rx input in function of the ambient level of acoustic noise, in order that the acoustic level of the signal contained in the rx input exceeds that of the ambient noise in the ear of user of the device. The following text describes the part of the functioning of the RX Gain control 60 that differs from the functioning of the gain calculator 40. Note that the RX Gain controller 60 optionally takes the rx signal as input in order to optionally measure the level of this signal. The RX gain could in some embodiments of the invention be controlled as given by equation (111) below. crx is a constant.

$$G_{RX}(f,t)=\sqrt{\frac{M_{NOISE}(f,t)+crx}{crx}} \tag{111}$$

In some embodiments of the invention the RX gain is derived as in equation (112). HRX is a frequency response that approximates the transfer response of the loudspeaker and it's coupling to the ear of the user. In (112) (and (114)) MX is an estimate of the energy of the output X of the forward beamformer 30. MX could be taken as one of the MF components directly or be a linear combination of MF components.

$$G_{RX}(f,t)=\sqrt{\frac{M_{NOISE}(f,t)+|HRX(f)|^2\cdot MX(f,t)}{|HRX(f)|^2\cdot MX(f,t)}} \tag{112}$$

In some embodiment the estimate $M_{NOISE}$ is smoothed over frequency to allow for a coarse frequency resolution in the RX gain control 60, while in some embodiments the gain $G_{RX}$ is smoothed over frequency to allow for a coarse frequency resolution in the RX gain control 60.

In some embodiments of the invention the transform leading from $P_{NOISE}$ allow $G_{RX}$ is controlled in function of user input for example via a button control, while in still some embodiments the RX gain $G_{RX}$ is a function of an estimate of the power of the RX input as well as an estimate of the power of the noise of the acoustic environment.

In equations (111) and (112) the estimates MNOISE and HRX are second order statistical estimates of energy. The estimates could alternatively be implemented as first or third order estimates. Equations (113) and (114) show variations of the embodiments based on first order statistical estimates:

$$G_{RX}(f,t)=\frac{M_{NOISE}(f,t)+crx}{crx} \tag{113}$$

$$G_{RX}(f,t)=\frac{M_{NOISE}(f,t)+|HRX(f)|\cdot MX(f,t)}{|HRX(f)|\cdot MX(f,t)} \tag{114}$$

Computational Implementation

The invention describes devices and methods that require s substantial amount of computation. The blocks 10, 20, 30, 40, 50, 60 and 130 with subblocks require the execution of computations. There exist numerous possible physical implementations of these blocks. The computations are preferably performed in the digital domain.

In one embodiment the acoustic device contains at least one processing unit. At least a part of the blocks 10, 20, 30, 40, 50, 60 and 130 is implemented as program code executing on the processing unit.

In a variation of this embodiment the mentioned program code reside in read-only-memory, ROM.

In a further variation of this embodiment the mentioned program code reside in random-access-memory, RAM. The program is loaded into the RAM from non-volatile memory type when the device is powered.

In one embodiment at least a part of the blocks 10, 20, 30, 40, 50, 60 and 130 is implemented with dedicated digital logic and memory.

REFERENCES

1 Boll, S., "Suppression of acoustic noise in speech using spectral subtraction", IEEE Transactions on Acoustics, Speech and Signal Processing, volume 27, 1979, page 113-120.

2 Ephraim, Y., Malah, D, "Speech enhancement using a minimum-mean square error short-time spectral amplitude estimator", IEEE Transactions on Acoustics, Speech and Signal Processing, volume 32, 1984, page 1109-1124

3 Maisano, J., "A method for analyzing an acoustical environment and a system to do so", U.S. Pat. No. 0,694,7570

4 Maisano, J., Hottinger, W., "A method for electronically beam forming acoustical signals and acoustical sensor apparatus", PCT patent application WO99/09786.

5 Maisano, J., Hottinger, W., "Method for electronically selecting the dependency of an output signal from the spatial angle of the acoustic signal impingement and hearing aid apparatus", PCT patent application WO99/04598.

6 Goldin A., "Noise canceling microphone array", European patent application EP1065909.

7 Rasmussen, Erik W., "Sound Processing System Including Forward Filter That Exhibits Arbitrary Directivity And Gradient Response In Single Wave Sound Environment", PCT patent application WO03015457.

8 Roeck, Hans-Ueli, "Method for providing the transmission characteristics of a microphone arrangement and microphone arrangement", PCT patent application WO00/33634.

9 H. Saruwatari, S. Kajita, K. Takeda and F. Itakura, "Speech enhancement using nonlinear microphone array with complementary beamformin", Proc. ICASSP 99, vol. 1, pp. 69-72, 1999.

10 H. Saruwatari, S. Kajita, K. Takeda and F. Itakura, "Speech enhancement using nonlinear microphone array with noise adaptive complementary beamformin", Proc. ICASSP 2000, pp. 1049-1052, 2000.

The invention claimed is:

1. A signal processing device for processing microphone signals from at least two microphones, comprising a combination of:

a power estimator for processing the signals from the microphones in order to generate in frequency bands a first statistical estimate of the energy of a first part of an incident sound field, said power estimator comprising a first nonlinear spatial filter including:

two first linear beamformers for processing the microphone signals and providing two first beamformed signals and a signal multiplier device for multiplying in frequency bands said beamformed signals;

whereby the power estimator processes the result of said multiplication in order to generate in frequency bands said first statistical estimate; and a gain controller for processing said first statistical estimate in order to generate in frequency bands a first gain signal; and a time-variant filter for processing an input to the signal processing device in dependence of said generated first gain signal.

2. The signal processing device according to claim 1, further comprising a forward beamformer for processing the microphone signals and wherein the output of said forward beamformer is input to said time-variant filter.

3. The signal processing device according to claim 2, wherein said forward beamformer is an adaptive beamformer.

4. The signal processing device according to claim 1, comprising a non-linear element arranged to perform a non-linear operation on a first of said first beamformed signals and wherein said multiplier device is adopted to multiply the output of said non-linear element with the second of said first beamformed signals.

5. The signal processing device according to claim 1, wherein the power estimator is adapted to generate in frequency bands a second statistical energy estimate related to the total energy of the incident sound field and wherein said first gain signal is generated in function of said first and second statistical estimates.

6. The signal processing device according to claim 1, wherein the power estimator further comprises a second non-linear spatial filter for processing the signals from the microphones, and wherein the power estimator is adapted to generate in frequency bands a second statistical estimate of the energy of a second part of the incident sound field and wherein said first gain signal is generated in function of said first and second statistical estimates.

7. The signal processing device according to claim 1, wherein the power estimator is adapted to generate in frequency bands a second statistical estimate related to the total energy of an input received through a transmission channel and wherein said first gain signal is generated in function of said first and second statistical estimates.

8. The signal processing device according to claim 1, wherein the power estimator is adapted to generate in frequency bands a second statistical estimate of the energy of a second part of said incident sound field and wherein said first gain signal is generated in function of a weighted sum of first and second statistical estimates.

9. The signal processing device according to claim 1, wherein said multiplier device operates in the logarithmic domain.

10. The signal processing device according to claim 1, adapted to transform said first statistical estimate to a lower frequency resolution prior to generating said first gain signal.

11. The signal processing device according to claim 1, wherein the power estimator is adapted to generate in frequency bands a second statistical estimate of the energy of a second part of the sound field, wherein the main contributor to said second part of the sound field is a wind generated noise source.

12. The signal processing device according to claim 11, wherein said first gain signal is generated in function of a weighted sum of first and second statistical energy estimates.

13. The signal processing device according to claim 1, wherein the main contributor to said first part of the sound field is a wind generated noise source.

14. The signal processing device according to claim 1, further comprising a beamformer for processing the signals from the microphones;

and wherein the power estimator is adapted to generate in frequency bands a second statistical estimate related to the total energy of the output of said beamformer.

15. The signal processing device according to claim 1, wherein the power estimator is adapted to generate in frequency bands a third statistical estimate related to the total energy of the sound field and wherein said first gain signal is generated in function of said first, second and third statistical estimates.

16. The signal processing device according to claim 1, comprising a multitude of beamformers for processing the signals from the microphones, and wherein a second statistical estimate of energy of a second part of the sound field is generated in function of the output signals from several beamformers.

17. The signal processing device according to claim 1, comprising a multitude of beamformers for processing the signals from the microphones, and wherein a second statistical estimate related to the total energy of the sound field is generated in function of the output signals from several beamformers.

18. The signal processing device according to claim 4, wherein said non-linear operation of said non-linear element can be approximated with raising to a power smaller than two.

19. The signal processing device according to claim 18, wherein said power estimator further comprises a signal multiplier device for multiplying in frequency bands said result of said non-linear operation with a second signal generated on the basis of said signals from the microphones, and said first statistical estimate of the energy of said first part of an incident sound field is generated in frequency bands in function of the result of said multiplication.

20. The signal processing device according to claim 1, wherein said first statistical estimate of energy is an estimate of the energy of the sound waves that are impinging to the device with angles of incidence within a limited region of the incidence space.

21. The signal processing device according to claim 1, wherein said first statistical estimate of energy is an estimate of the energy of the sound waves that are impinging to the device with wave gradients within a limited region of the incidence space.

22. A method for processing signals from at least two microphones in dependence of a first sound field, said method comprising:

processing signals from the microphones to provide two first beamformed signals;

multiplying in frequency bands said two first beamformed signals to provide a nonlinearly beamformed signal;

processing said nonlinearly beamformed signal in order to generate in frequency bands a first statistical estimate of the energy of a first part of said sound field;

processing said generated first statistical estimate in order to generate in frequency bands a first gain signal in dependence of said first statistical estimate; and processing at least one of the microphone signals in dependence of said generated first gain signal.

23. The method according to claim 22, wherein said first statistical estimate of energy is an estimate of the energy of the sound waves that are impinging on the device with angles of incidence within a limited region of incidence space.

24. The method according to claim 22, wherein said first statistical estimate of energy is an estimate of the energy of the sound waves that are impinging on the device with wave gradients within a limited region of incidence space.

25. The method according to claim 22, comprising performing a non-linear operation which can be approximated with raising to a power smaller than two on a first of said two beamformed signals, and wherein said first statistical estimate of the energy of said first part of an incident sound field is generated in function of the result of said non-linear operation.

* * * * *